US012152864B2

(12) United States Patent
Martinage

(10) Patent No.: US 12,152,864 B2

(45) Date of Patent: Nov. 26, 2024

(54) CONFIGURABLE THREE-DIMENSIONAL TARGET

(71) Applicant: Bernard Martinage, Fernandina Beach, FL (US)

(72) Inventor: Bernard Martinage, Fernandina Beach, FL (US)

( * ) Notice: Subject to any disclaimer, the term of this patent is extended or adjusted under 35 U.S.C. 154(b) by 0 days.

(21) Appl. No.: 17/238,603

(22) Filed: Apr. 23, 2021

(65) Prior Publication Data

US 2021/0381809 A1 Dec. 9, 2021

Related U.S. Application Data

(60) Provisional application No. 62/705,469, filed on Jun. 29, 2020, provisional application No. 62/704,142, filed on Apr. 23, 2020.

(51) Int. Cl.
*F41J 1/00* (2006.01)
*B31D 5/04* (2017.01)

(52) U.S. Cl.
CPC . *F41J 1/00* (2013.01); *B31D 5/04* (2013.01)

(58) Field of Classification Search
CPC ....... F41J 1/00; F41J 1/10; B31D 5/04; B65D 5/02–14; G09F 1/06–08
See application file for complete search history.

(56) References Cited

U.S. PATENT DOCUMENTS

| | | | | |
|---|---|---|---|---|
| 1,368,483 A * | 2/1921 | Carter | G09F 1/02 | 40/124.191 |
| 2,353,359 A * | 7/1944 | Rasmussen | G09F 1/06 | 40/538 |
| 4,463,997 A * | 8/1984 | Densen | B65D 5/48 | 312/265.5 |
| 5,593,162 A * | 1/1997 | Minuskin | F41J 1/00 | 273/409 |
| 6,618,969 B1 * | 9/2003 | Rogers | G09F 1/06 | 40/124.16 |

OTHER PUBLICATIONS

Action Target 3D Target, designed by Clint Smith, copyright 1993, https://www.slideshare.net/818group/3d-targets-action-target-3d-targets-are-trusted-by-the-best, published Feb. 25, 2013; http://store.actiontarget.com/3d-target.html, archived by the Internet Archive on Mar. 13, 2013 (Year: 2013).*

* cited by examiner

*Primary Examiner* — Laura Davison

(74) *Attorney, Agent, or Firm* — RC Trademark Company

(57) ABSTRACT

A target for use in firearm training or target practice. In one embodiment the target is constructed out of a unitary sheet of carboard having anterior and posterior sides, and a plurality of interlocking members. The cardboard can be folded along a center line to bring the anterior and posterior side of the carboard into an overlapping alignment. Once in overlapping alignment the interlocking members of the carboard can be mated to produce a three-dimensional emulation.

18 Claims, 48 Drawing Sheets

CONFIGURABLE THREE-DIMENSIONAL TARGET

RELATED APPLICATIONS

This application claims priority to U.S. Provisional Patent Application 62/704,142 filed Apr. 23, 2020 and claims priority to U.S. Provisional Patent Application 62/705,469 filed Jun. 29, 2020, each of which is incorporated herein by reference.

FIELD OF INVENTION

The present invention is in the technical field of targets useful in training or practice and, in one application, more particularly, the invention relates to disposable targets for use in indoor and outdoor firearm training.

BACKGROUND OF THE INVENTION

Conventional targets used in firearm training have comprised flat sheets of paper or poster board with a printed “silhouette” that represents the torso and head of a human target. Other printed sheet targets have displayed various styles of “bullseyes” printed on sheets of paper or poster board. Regardless of what is printed on the conventional target, the representation is two-dimensional and only capable of recording a single reference point of impact for each firing that passes through conventional target. The arrangement does not enable a person to readily determine the trajectory of the firing before or after initial impact.

Conventional targets can be mounted on flat surfaces, such as wall or stands, or may be hung via a cord or clip arrangement typical in shooting ranges. However, the durability of these targets is relatively low and, depending on the shooting accuracy, large areas of damage can be created. Once a large portion of the target is damaged, it is no longer able to indicate the points of entry in the damaged areas.

Existing three-dimensional targets have been in the form of elaborate human emulations or analogs. These are expensive and cumbersome to assemble or transport. Some human analog targets have resembled mannequins but have required large amounts of space for storage. Daily or routine use of human analog targets, such as at firing ranges, has not been economical because high frequencies of use can quickly destroy both the usefulness and appearance of the targets. Thus, there is a need for providing three dimensional targets which are relatively light, easily transportable and of greater durability to better meet the needs for training and practice.

SUMMARY OF THE INVENTION

According to a first series of embodiments of the invention, a target is provided with one or more unitary sheets. In the illustrated examples a single unitary sheet is predefined shape has vertical and horizontal dimensions, with each dimension extendable along a common plane. The sheet is of suitable structural stiffness to define folds therein and convert the sheet into a self supporting three dimensional emulation of portions of a human-like figure. The emulation at least partly consists of the sheet which, when folded along one or more fold lines, defines a front body panel and a rear body panel each positioned on a different side of a first fold line. The first fold line is formed along a midsection of the sheet. The defined front and rear body panels each include one or more sheet cuts to enable conversion of the sheet from a flat configuration into the three dimensional emulation. The target, when configured with the cuts, and prior to conversion into the three dimensional emulation, provides a simulated torso section which extends vertically from a lowermost horizontal edge of the sheet, and horizontally along the front body panel in a first horizontal direction away from the first vertical fold line to a first outer torso edge and horizontally along the rear body panel in a second horizontal direction opposite the first horizontal direction, and away from the first vertical fold line to a second outer torso edge. The target further includes one or more configurable torso joints that facilitate assembly of, or impart improved stabilization of the shape to, the torso section.

Among the first series of embodiments, each torso joint extends between the front and rear body panels. The sheet may comprise a layer of corrugated material and may comprise cardboard. The target may include a head emulation section positioned vertically above the simulated torso section and positioned in a portion of the sheet extending (i) horizontally along the front panel and (ii) horizontally along the rear panel. The target may also include a simulated nose extending away from the head emulation section and providing an indication of a direction along which the head emulation section faces. When the target is converted into the self supporting three dimensional emulation, the head emulation section has a shape having a three dimensional first arc-like contour, defining a space partly or fully surrounded by the three dimensional first arc-like contour.

Also, according to the invention, in a second series of embodiments, a target is formed with at least a first two dimensional unitary sheet having vertical and horizontal dimensions, each dimension extendable along a common plane. The sheet is of suitable structural stiffness to define cuts and folds therein to convert the sheet into a self-supporting three dimensional emulation of portions of a human-like figure. The emulation consists of at least the first unitary sheet and, with material composing the target, is cut, or folded along one or more fold lines. Opposing front and rear body panels are defined therein. Each panel is defined with or includes one or more cuts or folds providing a pattern to enable conversion of the first unitary sheet into the three dimensional emulation. The sheet, when configured as the three dimensional emulation, displays a torso section and a head section and, prior to conversion from the two dimensional sheet to the three dimensional emulation, the portion of the target including the head section has defined therein first and second head subsections spaced apart from one another. The first head subsection includes a strip of sheet material cut to be rolled along a horizontal direction to form a three dimensional structure positioned to present an arc-like shape above the torso section when the target is in an upright posture.

Also, among the second series of embodiments, the target may be configured as the three dimensional emulation and disposed in the upright posture, with the arc-like shape presenting a head emulation and the torso section presenting a torso emulation. At least a portion of the torso section and the strip of material in the first head subsection may be formed on the unitary sheet.

According to a third series of embodiments, a target for use in firearm training and practice includes a simulated head section, a simulated torso section, and a simulated pelvis section formed on one or multiple unitary sheets convertible to a three-dimensional upright presentation. The simulated head section comprises a first three dimensional contour. The simulated torso section comprises a second three dimensional contour. The simulated pelvis section is convertible between a contour that matches the contour of the simulated torso section and a stand section that holds weighted material that stabilizes use of the target when impacted by projectiles during training and practice activities. Among the third series of embodiments, when the pelvis section is converted to the stand section, the stand section is secured by at least one connection of interlocking features formed on the same sheet. The target may include a first set of interlocking features and at least a second set of interlocking features. Also, the simulated head section, the simulated torso section and the simulated pelvis section may all formed on one unitary sheet configurable into a three dimensional figure.

In still another series of embodiments a target is provided for use in firearm training. The target can be assembled from a plurality of components, including a front panel and a back panel; a simulated head section including a first head subsection extending along the back panel. The first head subsection extends above the front or back panel and includes opposing first and second segments at opposing ends of the first head subsection. An orientation flap is insertable among a plurality of orientation slots formed on the first head subsection. The simulated head section provides a three dimensional contoured presentation created by inserting the orientation flap into one of the plurality of orientation slots and interlocking the opposing first and second segments to each other along the back panel.

A method is also provided for configuring a target formed with at least a first unitary sheet having vertical and horizontal dimensions. Each dimension is extendable along a common plane. The sheet is of suitable structural stiffness to define cuts and folds therein to convert the sheet into a self-supporting three dimensional emulation of portions of a human-like figure. According to the method, cuts and folds are provided in at least the first unitary sheet to define opposing front and rear body panels. The panels include some of the cuts or folds, defining a pattern by which the first unitary sheet can be converted into a torso section of the three dimensional emulation. The cuts and folds include a first slit and a first flap having a length extending along the vertical direction. The first flap is positioned along the sheet to enable mating insertion of the first flap into the first slit, and the first slit extends vertically from a lowest end point to an upper most point. The first flap is formed along a vertical edge of the torso section and includes a recess, in the form of a slot, formed along the vertical edge and extending vertically upward from a lowermost portion of the first flap, with the lower end of the slit positioned vertically higher than the lowermost portion of the first flap. While inserting the first flap into the first slit, the first flap is urged, in a vertically upward direction against a modest spring-like resistant force, raising the lowermost portion thereof above the lowest end point of the first slit so that the lowermost portion of the first flap can be inserted within the first slit. This places the recess above and in line with the slit and allows the spring-like force to urge the first flap vertically downward, positioning the recess to extend vertically below the lowest end point of the first slit and allowing the entire length of the flap to pass into the slit to effect a mating connection.

BRIEF DESCRIPTION OF THE DRAWINGS

The following figures illustrate one or more embodiments of a kinetic target and component features thereof, where like reference numerals designate like or corresponding parts throughout the several views. Vertical and horizontal directions and orientations of kinetic target embodiments, and components thereof, are described with reference to the exemplary, fully configured kinetic target of FIG. 3, and shown in FIGS. 3 and 5 in an upright or standing position above a horizontal ground plane, H. Features and advantages of the kinetic target will become better understood when the following detailed description is read with reference to the following drawings, where.

Figure 3:
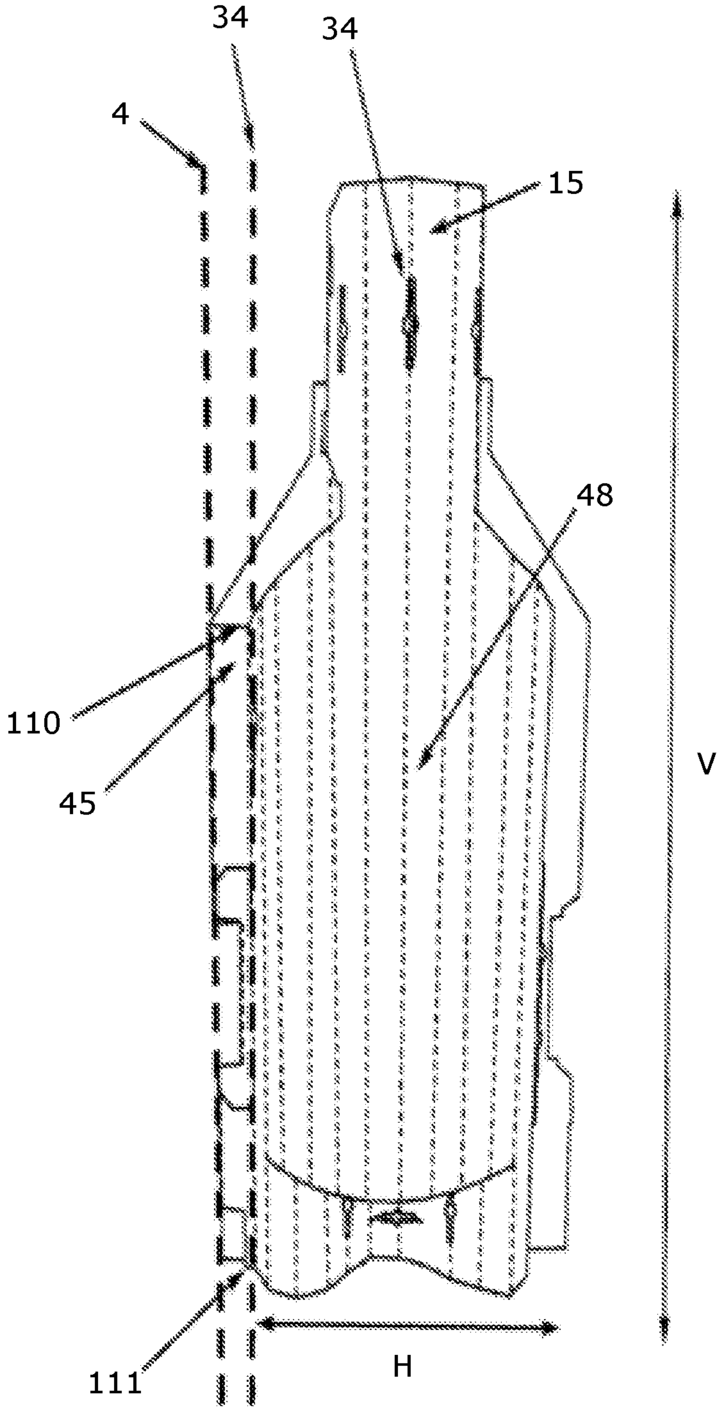
FIG. 3 is a front elevation view of the kinetic target occupying an upright position.

To the extent features are illustrated schematically, details, connections and components of an apparent nature may not be shown, or may not be drawn to scale, to emphasize other features of the invention. Suggested dimensions of features are only exemplary. The figures illustrate one or more embodiments of a kinetic target and component features thereof. Vertical and horizontal directions and orientations of the kinetic target embodiments and component features thereof are described with reference to the exemplary, fully configured kinetic target, shown in an upright or standing position. See FIG. 3, in which the head extends in a vertical direction, V, above the torso. The horizontal direction, H, along the underlying horizontal ground plane is also shown in FIG. 3.

DETAILED DESCRIPTION OF THE INVENTION

Referring now to the drawings, the present invention provides an apparatus and related learning methods with which the trajectory of a projectile, such as a bullet, or a ray of penetrating light can be traced within a target-shooting training environment.

The term cut as used herein refers to the various types of cutting penetrations useful for forming a target according to disclosed embodiments. Cuts may completely penetrate through a sheet of material and include other types of penetrations including perforations suitable for manually severing portions of a sheet from one another. The term knock-out refers to an area of a sheet defined with cuts (e.g., partial spaced-apart cuts or perforations) which can be manually removed from the sheet.

The term stable with regard to a target means that the target, as a three dimensional emulation, e.g., of a person, is capable of maintaining a pose or posture for continued functional use as designed, e.g., with a head section and a torso section, notwithstanding receiving repeated impacts from the shooting of projectiles at the target. In some embodiments Vertical and horizontal as used herein refer to orthogonal directions parallel with a common plane, including orthogonal directions each along one of two different orthogonal planes along which a structure may extend. Vertical dimension means a dimension measured along a vertical direction, and horizontal dimension means a dimension measured along a horizontal direction.

The term sheet refers to sheet material of sufficient stiffness to undergo cuts or folds for configuration as a self-supporting three dimensional target which, when so assembled, and while postured in an upright stance, retains structural integrity and dimensional features after receiving repeated impacts from the shooting of projectiles, e.g., bullets. In disclosed embodiments.

To limit movement of the target along a ground plane while receiving the impacts, the structure may be held in place with added weight. By adding weight to a lower portion of the target, near the ground, the target can be prevented from falling over from an upright position.

With reference to a sheet comprising a front body panel and a rear body panel, according to the invention, the term midsection means a portion of the sheet extending in opposite horizontal directions from the first vertical fold line 4.

With reference to a target according to the invention, a two dimensional configuration refers to a sheet along a flat plane from which the target is disposed and along which horizontal and vertical directions define orientations of features created in the target with cuts and folds.

Emulation means a simulated appearance which need not be realistic but can be suggestive of an object, or a single object feature, and perceived as representative of the object. A sheet of paper may be considered an airplane emulation if it is folded to exhibit three dimensional wings or demonstrable gliding features suggestive of wings used in flight, even though airplane flight may require wings of different shape to effect powered flight. When used in reference to a body part, emulation means a portion of a structure that presents one or plural characteristics suggestive of the body part. By way of example, head emulation refers to a structure suggestive of a head, e.g., having some likeness to at least one feature common to some human heads, such as an arc-like contour which may extend over less than, or as much as, a 360 degree arc; or an appearance emulating a human head based on a contour, (e.g., a triangular-like profile) alone or in combination with ears, or a facial shape somewhat suggestive of a human head of a face. More generally, a head emulation may be based on features often associated with and somewhat suggestive of human heads such as presence of facial hair, eyes, hats, ears, pigtails, eye glasses, etc. With respect to kinetic targets according to the invention, an intended emulation of a human or an anthropomorphic figure may become more apparent by presentation of a combination of features associated with multiple associated body parts, such the three-dimensional presentation of a torso shape, shoulders, a head shape, and a nose shape. Taken individually the foregoing may each be referred to as a body part emulation although the combination of these shape emulations may be more clearly suggestive of a target emulating a human body.

Pointing direction refers to a direction along which a portion of a target emulating a head appears to be pointing based on the pointing direction of a feature positioned on a head emulation, e.g., a nose emulation, mounted to project in a direction beyond and away from the head emulation.

In one example embodiment and with reference to the line of sight between the observing person and the target, forward facing refers a pose emulated by the target where, based on the pointing direction of a nose emulation, it would appear to the observer that the target head has an apparent pointing direction toward the person, i.e., along the person's line of sight to the target, so that the observing person can perceive the head section of the three-dimensional target as facing the person, i.e., in a head-on pose.

Forward facing refers to the pose of a body emulation of a target, or an emulation of a portion of a body with respect to an appearance observed by a person. A forward facing head emulation is an emulation where line of sight, between the target and the person observing the target is aligned with the direction along which the head emulation appears to be pointing. For a head emulation comprising an arc-like surface, an impression of the direction along which the emulation appears to be pointing may be based, for example, on positioning of eyeglasses, a mouth, a nose or ears about the head emulation to be suggestive of an intended pointing direction. This is a useful for embodiments of the invention when presenting the direction along which a head may be pointing relative to a torso and, specifically, altering the appearance of a target from a forward facing pose of the entire target body emulation to that of a forward facing head emulation which appears turned with respect to the underlying torso. This enables presentment of the target, turned at an angle with respect to the observer, while the head is forward facing with respect to the observer.

In the context of a target according to the invention, three dimensional refers to a target which, when viewed by an observer, has observable length, breadth, and depth. This is to be contrasted with a training target of the type formed out of a single sheet and exhibiting no more dimensionality than characteristic of the flat sheet extending only along a flat plane. With reference to a three-dimensional target, upright posture means the presentation of a configuration where a head section is above a torso section.

Figure 1A:
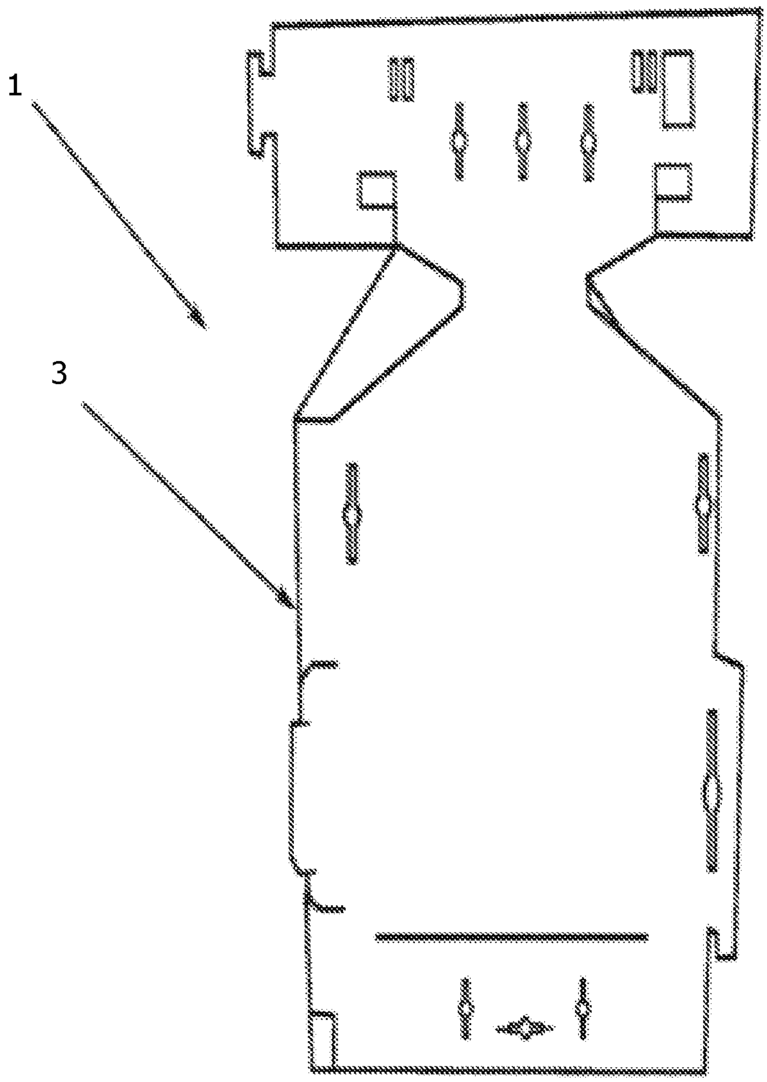
FIG. 1*a* is a plan view of a kinetic target in the form of a folded, flat cardboard sheet in a horizontal position above a ground plane according to an embodiment of the invention.

The illustrated embodiments comprise a single sheet of material, but alternate embodiments can be assembled from several independent pieces of material, including segments of sheets and hardware to provide three dimensional emulations of, for example, human-like or anthropomorphic figures. An exemplary embodiment of the present invention is shown in FIG. 1*g* with sample dimensions and, unlike other figures in this application, is drawn to scale. Referring to FIG. 1*a*, in one embodiment, a kinetic target 1 consists of a single sheet 3 of corrugated cardboard, also referred to as corrugated paperboard, known to exhibit orthotropic behaviors. The sheet 3 as shown in FIG. 1*a* is presented in a folded configuration suitable for carrying and local storage.

In other embodiments, in lieu of using a single cardboard sheet, the target may comprise one sheet or multiple sheet segments of cardboard or another material, such as a plastic or a laminate such as, for example, a layer of foam clad with a vinyl or other material to create a semi-rigid board, As used herein, semi-rigid boards include corrugated cardboard, e.g., a multi-layer material where the central layer is corrugated or fluted, with this central layer bonded to an outer layer or skin on both sides, although it may be possible to practice the invention with a fluted layer bonded on only one side to a skin. Other embodiments may also include fastening mechanisms separate and apart from the sheet, including the type which penetrate multiple panels of material to attach the panels to one another. The single sheet of corrugated cardboard 3 may have a thickness on the order of 0.125 inch (3.175 mm) but other thicknesses will be found suitable. Another view of kinetic target 1, shown in an expanded but still flat configuration is illustrated in FIG. 1*b*.

Figure 1B:
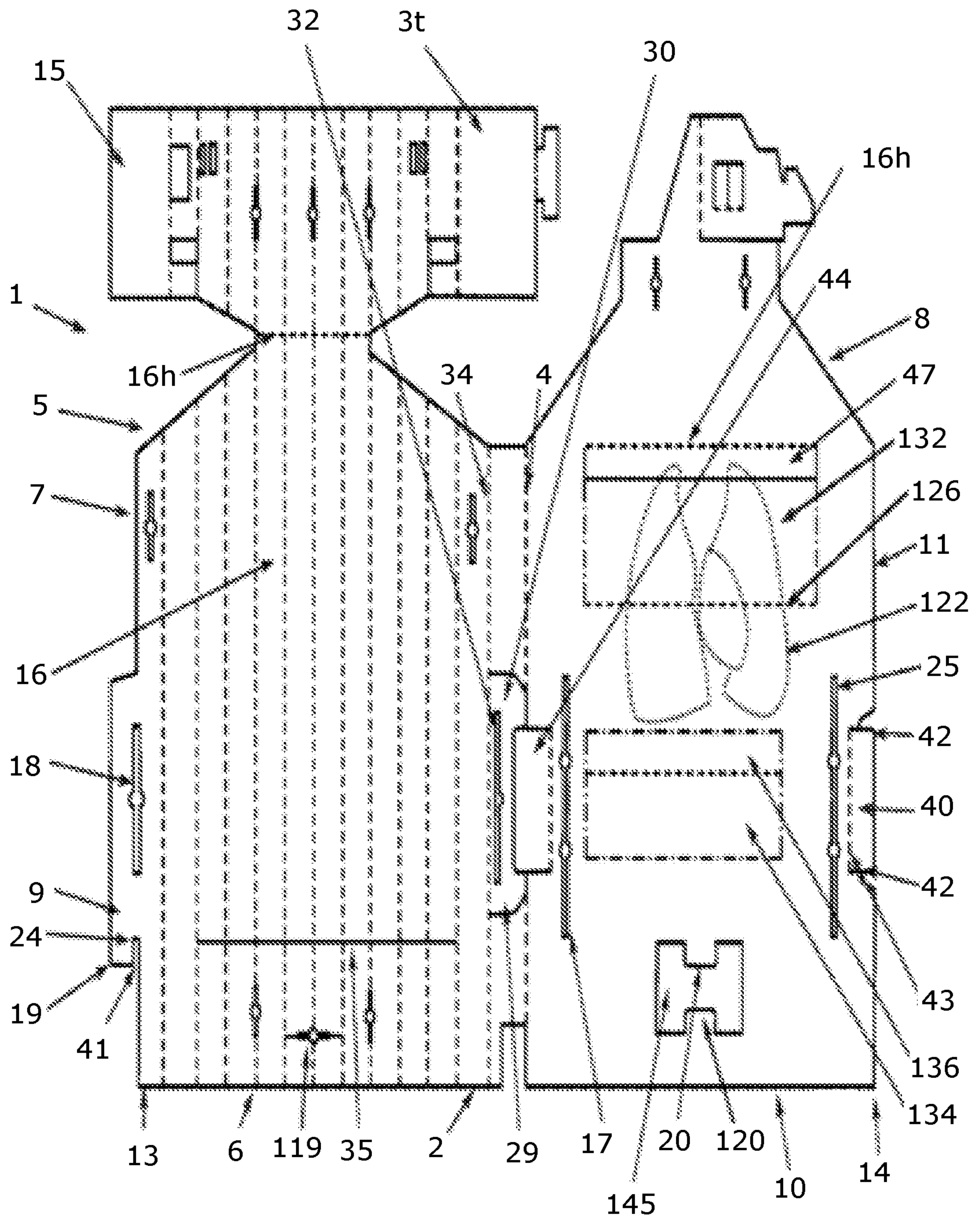
FIG. 1*b* is an elevation view of the front of the kinetic target with the sheet in an unfolded state prior to configuration for use.

Referring to the embodiment of the target 1 shown in FIG. 1*b*, the target is fabricated from a generally rectangular cardboard stock, shown after imparting numerous cuts. The target 1 retains substantial portions of the top horizontal edge 3*t* and bottom horizontal edge 2 as defined in the original stock. A plurality of the kinetic targets 1 are stackable while in the flat expanded configuration for easy storage or transportation in large quantities. The kinetic target 1 has an anterior side 13 to the left of a central fold line 4 and posterior side 14 to the right of the central fold line 4. Thus, there are two panels or halves connected along the central fold line 4. When configured for use as a three dimensional target, the target 1 is folded along the central line 4 with the anterior side 13 providing a front body panel 5 and the posterior side 14 providing a back or rear body panel 8 of the kinetic target 1.

For the illustrated embodiments, when the kinetic target 1 is configured as shown in FIG. 3, the central fold line 4 extends in vertical directions and the corrugated folds of the cardboard 3, i.e., ridges, r, and grooves, g, also extend along the vertical direction (i.e., parallel to the central fold line 4 and perpendicular to the horizontal direction, H). The same vertical and horizontal orientations with respect to the ground plane are referenced with respect to the central fold line 4 as extending in vertical directions, even when the kinetic target 1 is not shown in the vertical orientation of FIG. 3. In other embodiments, the corrugation grooves may be in horizontal orientations.

The front and back body panels 5, 8 comprise an interlocking head section 15 and a torso section 16 which interlocks with the head section. See FIG. 1*b*. The torso section includes a neck and shoulder subsection 16NS. See FIG. 8*a*. The neck and shoulder subsection 16NS is a transition region between the head section 15 and the torso section 16. A demarcation between the head section 15 and the neck and shoulder section 16NS is indicated by horizontal line 16*h*. See FIG. 8*a*.

The portion of the torso section 16 formed in the front panel 5 extends in a horizontal direction from the central fold line 4 to an outer torso edge 7 along the front panel 5. See FIG. 1*b*. Similarly, the portion of the torso section 16 formed in the back body panel 8 extends in a horizontal direction from the central fold line 4 to an outer torso edge 11 along the back body panel 8. See also FIG. 1*b*. The torso edges 7 and 11 each extend along a line parallel with the central fold line 4. A flap 9 formed along the outer edge 7 of the torso section 16 extends away from the torso section 16 and away from the outer torso edge 7. The flap 9 can be generally rectangular in shape with an optional sloped upper edge 118 that decreases along the width, 107 of the flap 9, along the horizontal direction away from the edge 7. See FIGS. 1*b* and 1*e*. Inclusion of the recess 41 and the sloped upper edge 118 along the flap 9 can facilitate ease of assembly of the torso joint 98 while retaining minimal clearance between the flap 9 and the slit 25 after the flap is fully inserted into the slit. This reduces play that would result in a looser fit in the joint. The design of the flap 9 is suitable for sustaining an interlocking arrangement of the torso joint 98 that has limited movement within the flap/slit joint. This, in turn, limits movement between the front and back panels 5, 8 and holds the panels more tightly fixed in place when the kinetic target 1 is fully configured. See FIG. 1*e*.

Figure 2A:
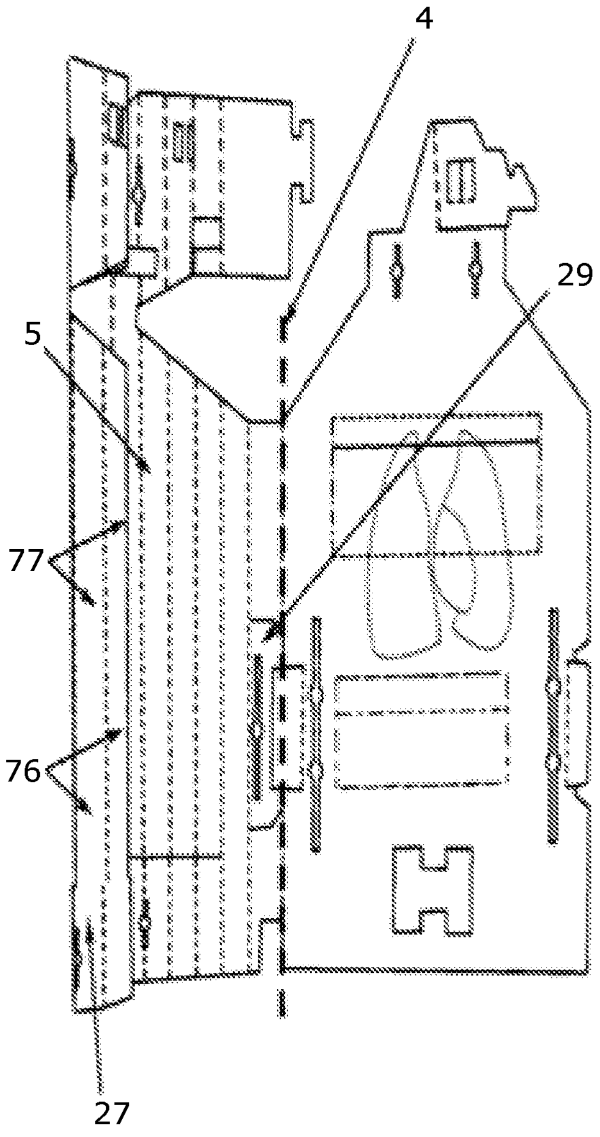
FIG. 2*a* is perspective view of the kinetic target from above a partially rolled front panel during the process of configuration into a three dimensional emulation.
Figure 2B:
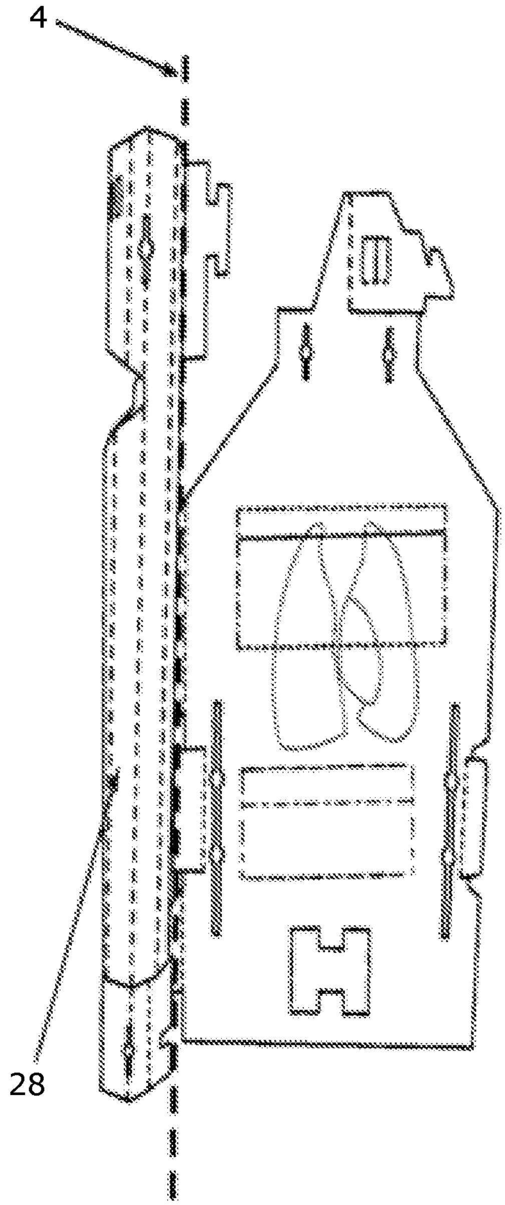
FIG. 2*b* is a perspective view of the kinetic target from above with the front panel fully rolled up.

Referring to FIGS. 2*a* and 2*b*, when initiating the process for configuring the kinetic target 1, the front panel 5 may advantageously be rolled up toward the central fold line 4 by beginning a rolling action along the edge 7 in the horizontal direction and toward the central fold line 4. As the rolling process traverses the corrugations, it creates folds along some of the vertically oriented ridges, r, perforations or grooves, g, of the cardboard, this resulting in additional vertical fold lines 76 and segments 77 approximating the width, 107, of the flap 9. As illustrated in an interim stage shown in FIG. 2*a*, the front panel 5 is formed into a partial roll 27, e.g., when approximately half of the horizontal length of the front panel 5 is rolled. The front panel 5 is formed into a more complete roll 28 when rolled nearly up to the central fold line 4, e.g., up to a cut region in the cardboard corresponding to an interior flap 29. See FIGS. 1*b*, 2*a* and 2*b*. Rolling of the front panel 5 may plastically deform the front panel 5 such that an arc-like shape is retained in front panel 5 after it is unrolled. In other embodiments, e.g., in sheets which do not include ridges and grooves, the front panel 5 can be pre-folded or creased such that the front panel 5 will automatically fold along pre-determined segment lines or perforations and create such an arc-like shape in the front panel 5 when it is unrolled.

A feature of the described embodiment of the kinetic target 1 is that it can be assembled without the use of any adhesive or any fasteners other than those integrally formed with cuts or folds made in the single sheet of cardboard 3 to create pairs of mating parts, each pair referred to as a joint comprising at least one pair of features: e.g., a projection and a recess. The projection may be a flap and the recess may be an opening or a slit cut through the sheet). Each projection may result from one or more cuts made in or through the cardboard sheet 3. The projection and recess in a pair may lap, one over the other, or may be fit together in a mating fashion analogous to a tongue and groove. Generally, a first cardboard projection is formed with one or more cuts in a first portion of the cardboard (e.g., in the front panel and a first recess cut is formed in a second portion of the cardboard (e.g., in the back body panel 8). Insertion of the projection into the recess serves to provide a joint comprising at least the projection recess pair. However, assembly of the kinetic target 1 may be further stabilized by providing some of the joints with an additional interlocking mechanism which facilitates holding the projection—recess pair in a fixed position. The interlocking function may be affected with one or multiple additional cuts about the projection—recess pair that limit movement of the projection relative to the recess, e.g., by interlocking precut sections of the cardboard adjacent the joint. The additional interlocking mechanism may comprise a second projection/recess pair.

With an arc-like shape formed in the front panel 5, the kinetic target 1 is folded along the central fold line 4 so that the outer torso edges 7 and 11 of the front and back panels 5, 8, can be brought together to create a three-dimensional shape. Mating sections, joined by projection—recess pairs cut into each of the panels 5, 8 are secured with an interlocking mechanism to maintain alignment of the panels and assure a bilateral symmetry when viewing the kinetic target 1 from the front. See FIG. 3. In one example, interlocking is, in part, effected with resilient, spring-like properties of the single unitary cardboard sheet.

In the following example, a first torso joint 98 is initially formed with the flap 9 and a slit 25 (referred to as the first torso slit) formed in the back body panel 8 near the torso edge 11. See FIG. 5 for illustration of two completed torso joints 98 and 99, as explained below. The flap 9 has a length, 108, of about 9¾ inches (24.8 cm) extending upward in the vertical direction from a lower-most, bottom position 19. See FIGS. 1*b* and 1*e*. The flap 9 has a width, 107, of about 3.5 inches (8.9 cm) in the horizontal direction, serving as a joint projection. The slit 25 serves as the mating recess to receive the flap 9 and through which nearly the full width, 107, of the flap 9 is received for engagement. The slit 25 is shown positioned an exemplary distance of approximately 5 cm (2 inches) from the torso edge 11 and has a length extending in the vertical direction about ¼ to ½ inch (6.35 to 12.7 mm) longer than 108 to frictionally hold the apex of sloped upper edge 118. This enables the full length of the flap 9 to protrude through the slit 25.

The exemplary kinetic target 1, as shown in FIG. 1*b*, has substantially vertical and horizontal sides and edges along the periphery. Although the invention does not require such an orthogonal configuration for sides and edges or projections and recesses, the relationships between pairs of projections and corresponding recesses are described in the context of vertical and horizontal directions for ease of illustrating interlocking mechanisms.

The cardboard sheet 3 into which the exemplary kinetic target 1 is cut includes a horizontal lower-most or bottom edge 2 of the cardboard sheet 3. See FIG. 1*b*. Although not required, the bottom edge 2 follows a straight line in a horizontal direction. The bottom edge 2 comprises a front panel torso bottom edge 6 and a back panel torso bottom edge 10.

Still referring to FIG. 1*b*, the first torso joint 98 may include a first interlocking mechanism based, in part, on resilient spring action associated with properties of the corrugated cardboard 3. A vertical cut is made between the flap 9 and the torso section 16 to create a recess 41 between the flap 9 and the torso section 16, e.g., along the outer torso edge 7. The recess 41 may be collinear with a vertical fold line extending between the flap 9 and the portion of the torso section 16 formed in the front panel 5. The recess 41 is of a length which, for example, severs approximately ½ to ¾ inch (6.35 to 12.7 mm) of the flap 9, extending from the bottom position 19 of the flap to a termination point 24. See FIGS. 1*b* and 1*e*. The remainder of the flap 9 is attached for hinge-like movement about the adjoining portion of the outer torso edge 7.

Figure 1C:
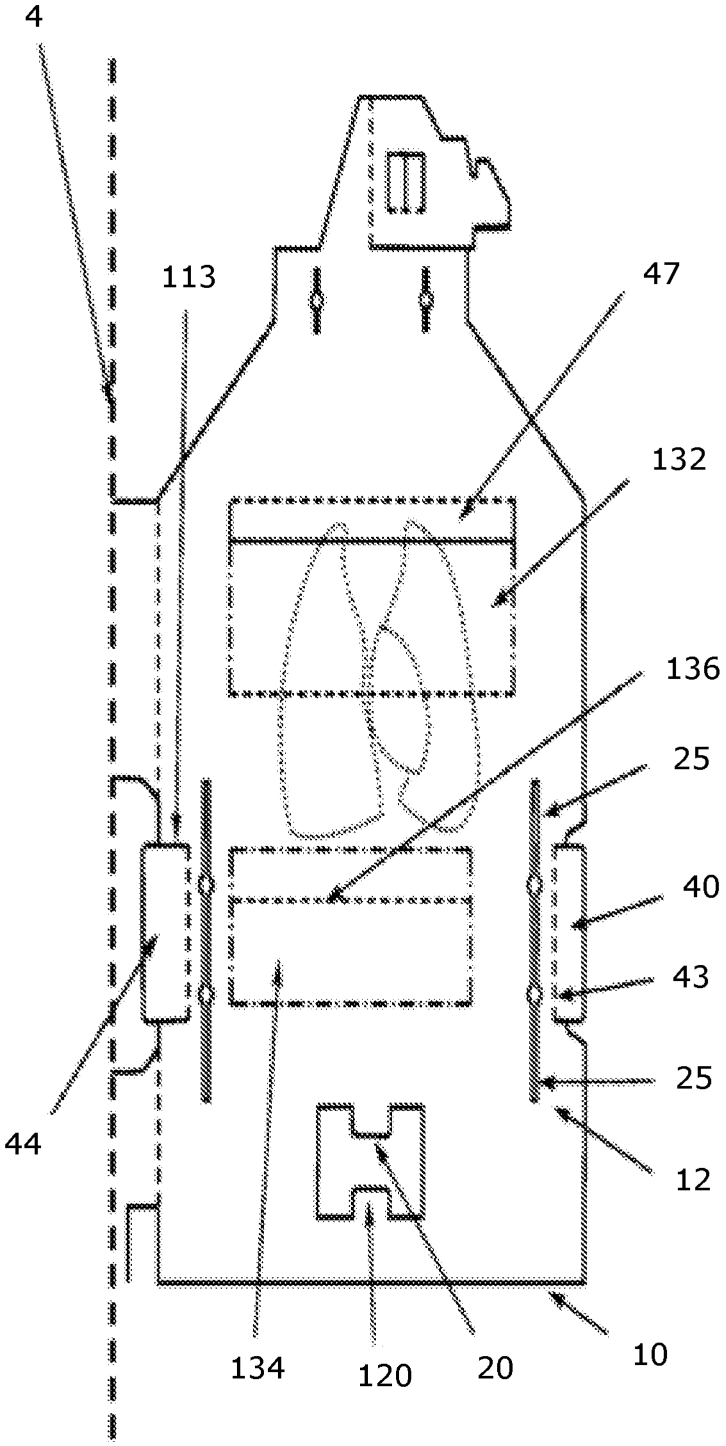
FIG. 1*c* is a partial elevation view along a rear section of the kinetic target while in a flat, unfolded configuration.
Figure 5:
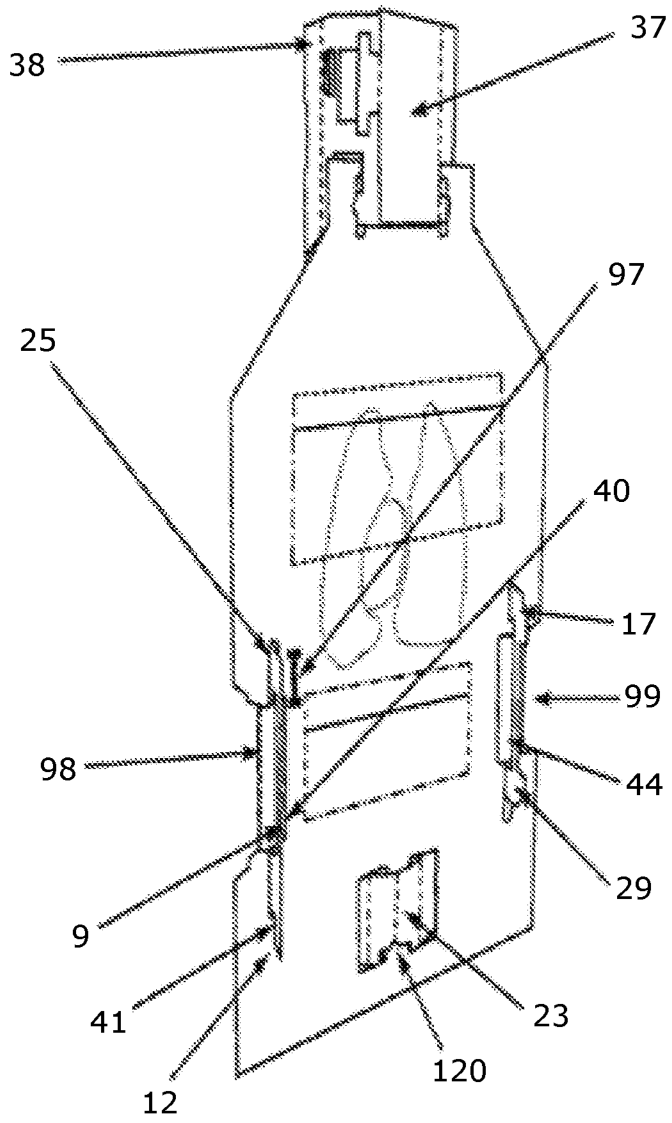
FIG. 5 is a rear elevation view of the kinetic target positioned in a standard and upright orientation.
Figure 6D:
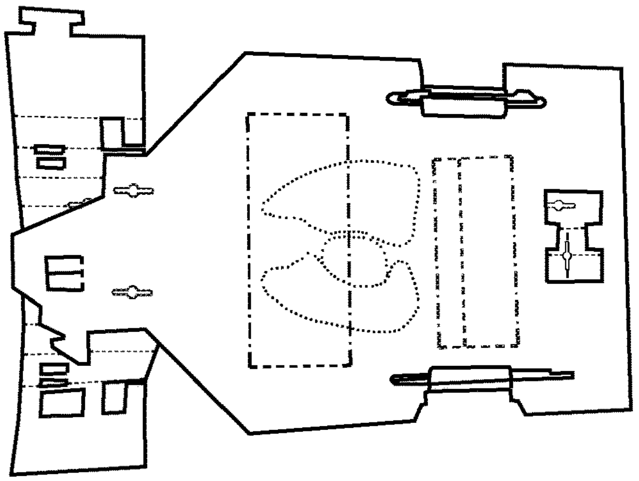
FIG. 6*d* is an elevation view of the back of a kinetic target depicting the configured first and second torso joints.
Figure 6C:
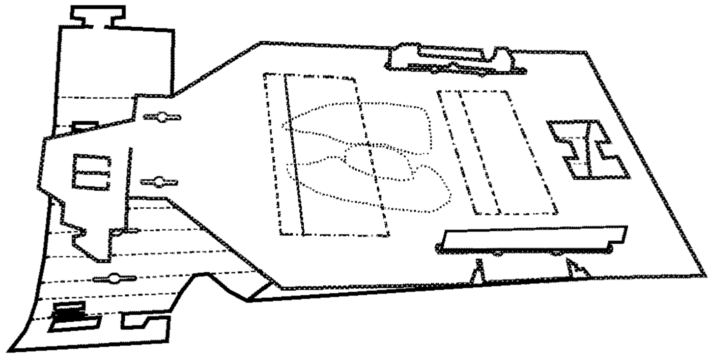
FIG. 6*c* is a rear elevation view of the kinetic target depicting relaxation about the flap of the first torso joint.
Figure 6B:
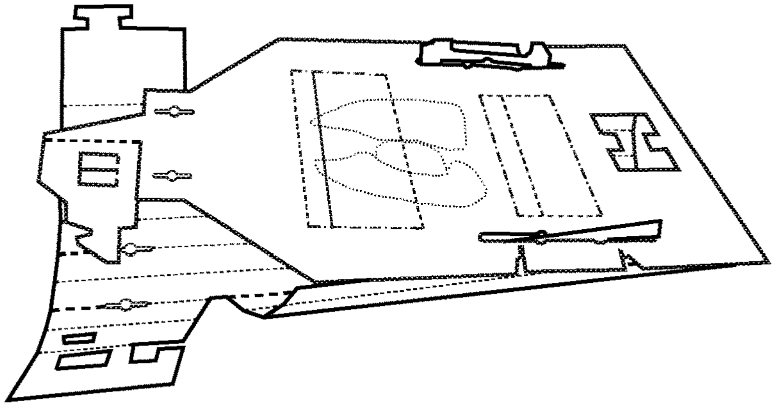
FIG. 6*b* is a rear elevation view of the kinetic target depicting the insertion of the flap of a first torso joint.
Figure 6A:
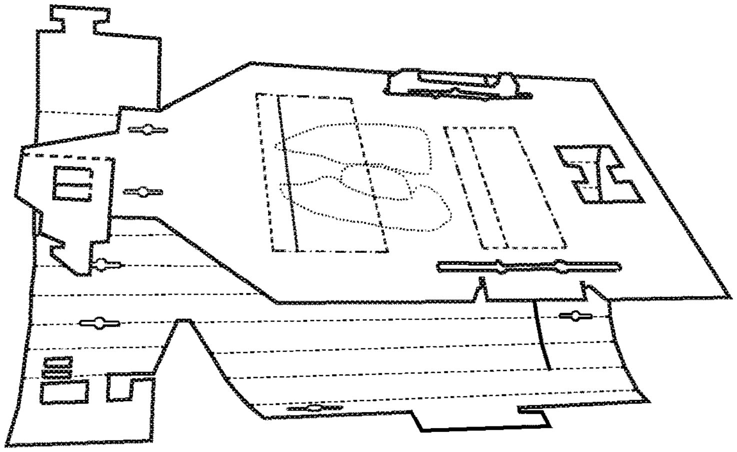
FIG. 6*a* is an elevation view of the kinetic target depicting the insertion of the flap of a second torso joint.

Referring to FIGS. 1*b*, 1*c*, and le, the vertical distance 109, between the termination point 24 of the recess 41 and the torso bottom edge 6 along the front panel 5, is nominally 5.5 inches (14 cm) and the distance between the lower end point 26 of the slit 25 and the torso bottom edge 10 is also about 5.5 inches (14 cm). Thus, the termination point 24 and the lower end point 26 of the slit 25 are collinear points along the same horizontal line. A region 12 of the cardboard sheet 3, in the portion of the torso section on the back panel 8 (which region extends vertically downward, from the lower end point 26 at the bottom of the slit 25, toward the torso bottom edge 10), serves as a projection 12 insertable within the recess 41. After the kinetic target 1 is folded along the central fold line 4, insertion of the flap 9 into the slit 25 is one in a sequence of steps by which the flat cardboard sheet is reconfigured into the shape shown in FIG. 3. For insertion, the flap 9 is urged vertically upward approximately ½ to ¾ inch (6.35 to 12.7 mm), i.e., the length of the recess 41, against a modest spring-like resistant force, so that the entire length of the flap 9 can pass through the slit 25 and the flap 9 is inserted through the slit 25 to create a first mating engagement. After insertion, the flap 9 is allowed to move vertically downward, diminishing some of the spring force. This movement displaces the recess 41 in the downward direction, causing the recess 41 to extend about the projection 12. With this downward movement the termination point 24 of the recess 41 comes into contact with the projection 12 at the lower end point 26 of the slit and the apex of sloped upper edge 118 of the flap 9 is in contact with the uppermost end point of the vertical slit 25. See FIG. 5. With the projection 12 inserted within the recess 41 (as shown in FIG. 5), there is a second mating engagement which further secures the first torso joint 98 and limits relative movement between the front and rear panels 5, 8. This interlock, effected with downward movement of the flap 9 under a modest spring-like force, displaces the flap recess 41 downward and along the projection 12 until the termination point 24 contacts the bottom of the slit 25. This positioning under a static force facilitate securement of the first torso joint 98 when the kinetic target 1 incurs an impact.

The first torso joint 98 may include a second interlocking mechanism, in addition to, or as an alternative to, the first interlocking mechanism, providing insertion of still another projection into a recess in the form of a slit. Referring to FIG. 1*b*, the flap 9 includes a vertical slit 18 (also referred to as the second torso slit 18) positioned above the termination point 24 of the recess 41. The portion of the torso 16 formed on the back body panel 8 includes a second flap 40 formed along a pair of vertically spaced-apart horizontal cuts 42 each extending inward about 1.5 inches (3.81 cm) from the outer torso edge 11 toward the central fold line 4 to provide a projection for insertion within the slit 18. To facilitate insertion the second flap 40 is foldable along a vertical line 43 positioned between the slit 25 and the outer torso edge 11. The vertical line 43 is shown positioned ½ inch (1.27 cm) away from the slit 25.

Figure 1D:
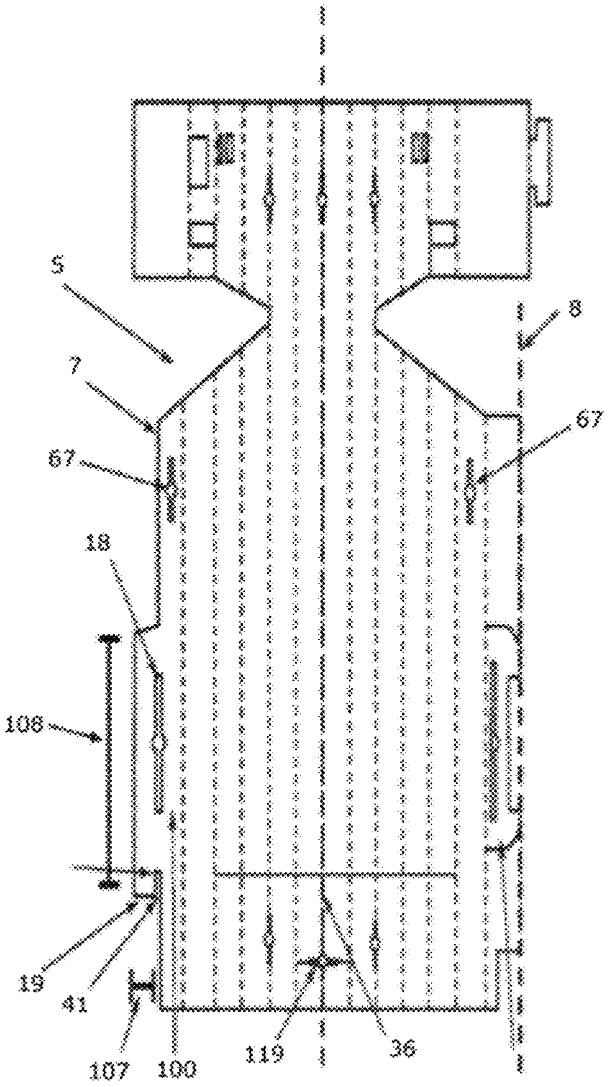
FIG. 1*d* is an elevation view along a front section of the kinetic target while in a flat, unfolded configuration.
Figure 1E:
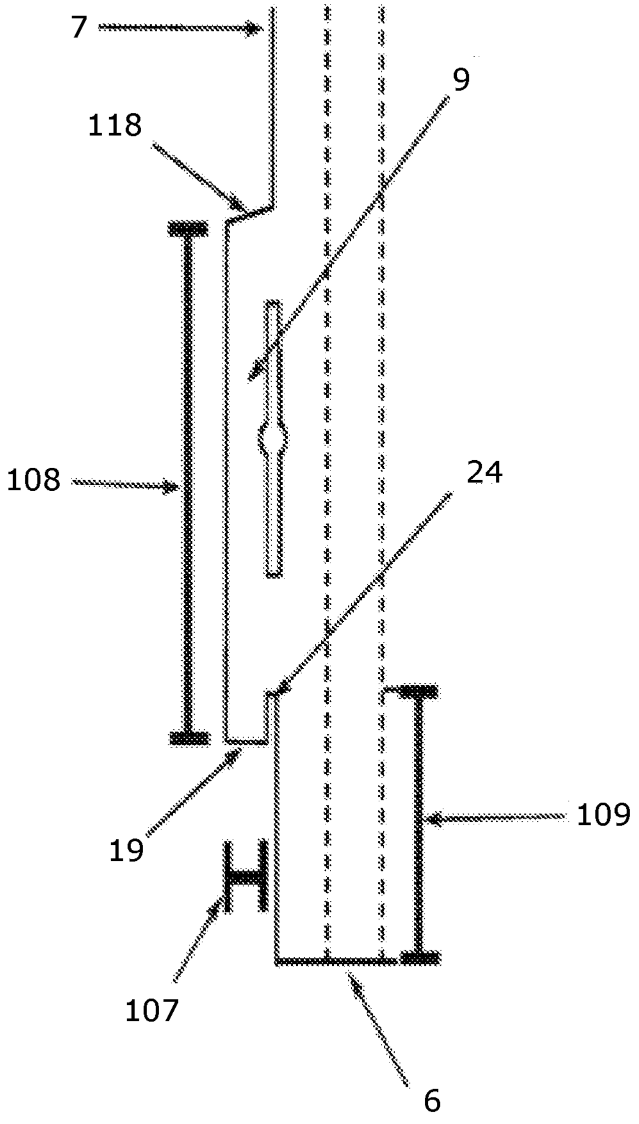
FIG. 1*e* is an enlarged partial view taken along a side of the kinetic target while in the unfolded configuration.

Although not shown in FIGS. 1*b* and 1*d*, the slit 18 may be horizontally offset with respect to the recess 41 and positioned farther from the outer torso edge 7 than the recess 41; but in other embodiments the slit 18 may be collinear with the recess 41, as seen in FIG. 1*d* The slit 18 and the second flap 40 each have similar vertical lengths, 100, e.g., 4⅜ inch (11.11 cm) but the slit 18 may be sized slightly longer (e.g., ½ inch (0.125 cm) longer) to provide a modest clearance which facilitates ease of insertion of the second flap 40 therethrough. See FIG. 1*d* The second flap 40 may, for example, have a nominal length of 3 to 5 inches (7.6 to 12.7 cm), with the slot 18 having a similar or slightly greater length. The second flap 40 may be inserted through the slit 18 by first folding the second flap 40 along the vertical fold line 43, e.g. at about half the width of the second flap 40, e.g., 0.75 inch (1.9 cm) inward from the outer torso edge 11, along a corrugation ridge or groove. See FIGS. 6*a-d*.

Incorporating both the first and second interlocking mechanisms within the first torso joint adds stability and integrity to the joints. The mating connection formed with the flap 9 and slit 25 reduces movement about the torso joint along the vertical direction, while the mating connection formed with the flap 40 and the slit 18 reduces movement of the torso joint about a horizontal plane, e.g., less vertical movement between components of the mating connection(s) and less horizontal movement between components of the mating connection(s). By way of an example, applicable also to other flap/slit mating connections, the vertical movement about a vertically oriented mating connection shown in the figures or about the joint 98, with one or both of the interlocking mechanisms in place, can be limited to less than a percentage of the vertical length of the first or second flap 9, 40 where the percentage ranges from twenty percent to less than two percent, including any of less than fifteen percent, less than ten percent, and less than five percent; or can be limited to less than any of one cm, four mm, three mm, two mm and one mm. Moreover, movement along a horizontal plane, between the portions of a torso section connected by the joint or mating mechanism can be limited to less than a percentage of the horizontal width of the first or second flap 9, 40 where the percentage ranges from twenty percent to less than two percent, including less than fifteen percent, less than ten percent, less than five percent and less than 2 percent; or less than any one of 5 mm or 4 mm or 2 mm. For the example embodiment shown in FIGS. 3 and 5, a second torso joint 99 is provided, which further facilitates imparting a consistent and stable 3-dimensional shape to the torso section 16, less vertical movement between components of the mating connection(s) and less horizontal movement between components of the mating connection(s). An interior projection, in the form of a flap 29, is cut into the front panel 5, alongside the central fold line 4; and a complementary recess, in the form of a slit 17 (also referred to as the third torso slit 17), is cut into the back body panel 8 parallel with and about 2 inches (5 cm) from the central fold line 4. See FIGS. 1*b* and 1*f*. The flap 29 is shaped by cutting out a pattern in the form of a backward-facing (reverse direction) letter "C" 30 having a vertical height of, for example, 8.5 inches (21.6 cm). This cut leaves a recess in the form of a vertical slot 32 along the interior of the flap 29. The slot 32 extends, for example, 5¼ inches (13.3 cm) in a vertical direction. The flap 29 has a length along the vertical direction of 8½ inches (21.6 cm) and the slit 17 has a similar length in the vertical direction which may be slightly (e.g., 6.35 mm (0.125 inch)) larger.

Figure 1F:
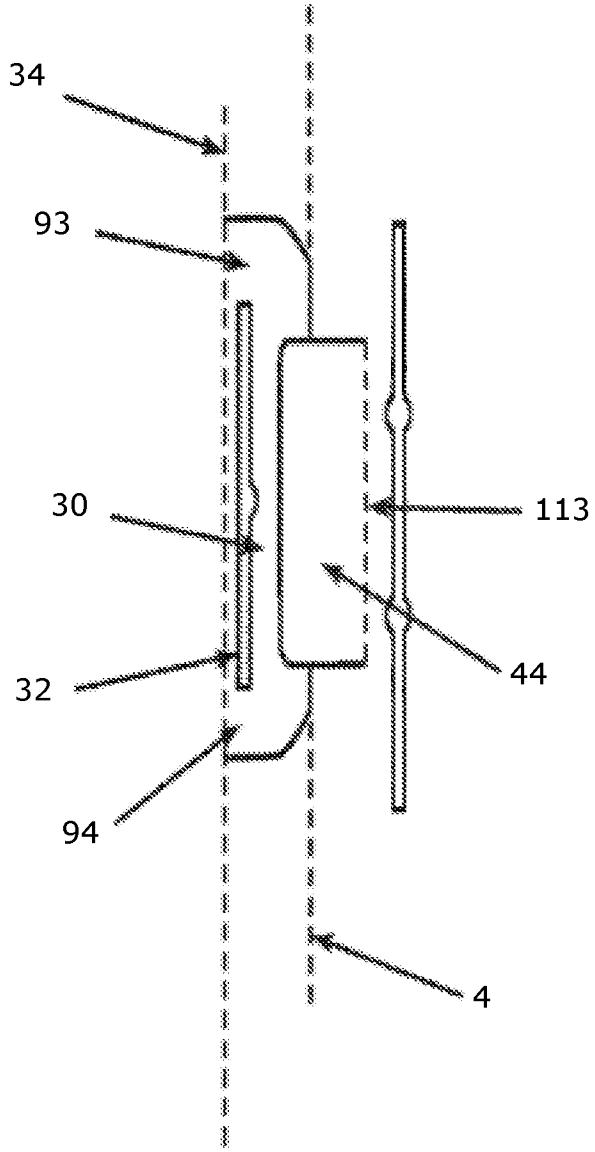
FIG. 1*f* is an enlarged partial view taken along a middle section of the unfolded kinetic target while in the unfolded configuration.
Figure 1G:
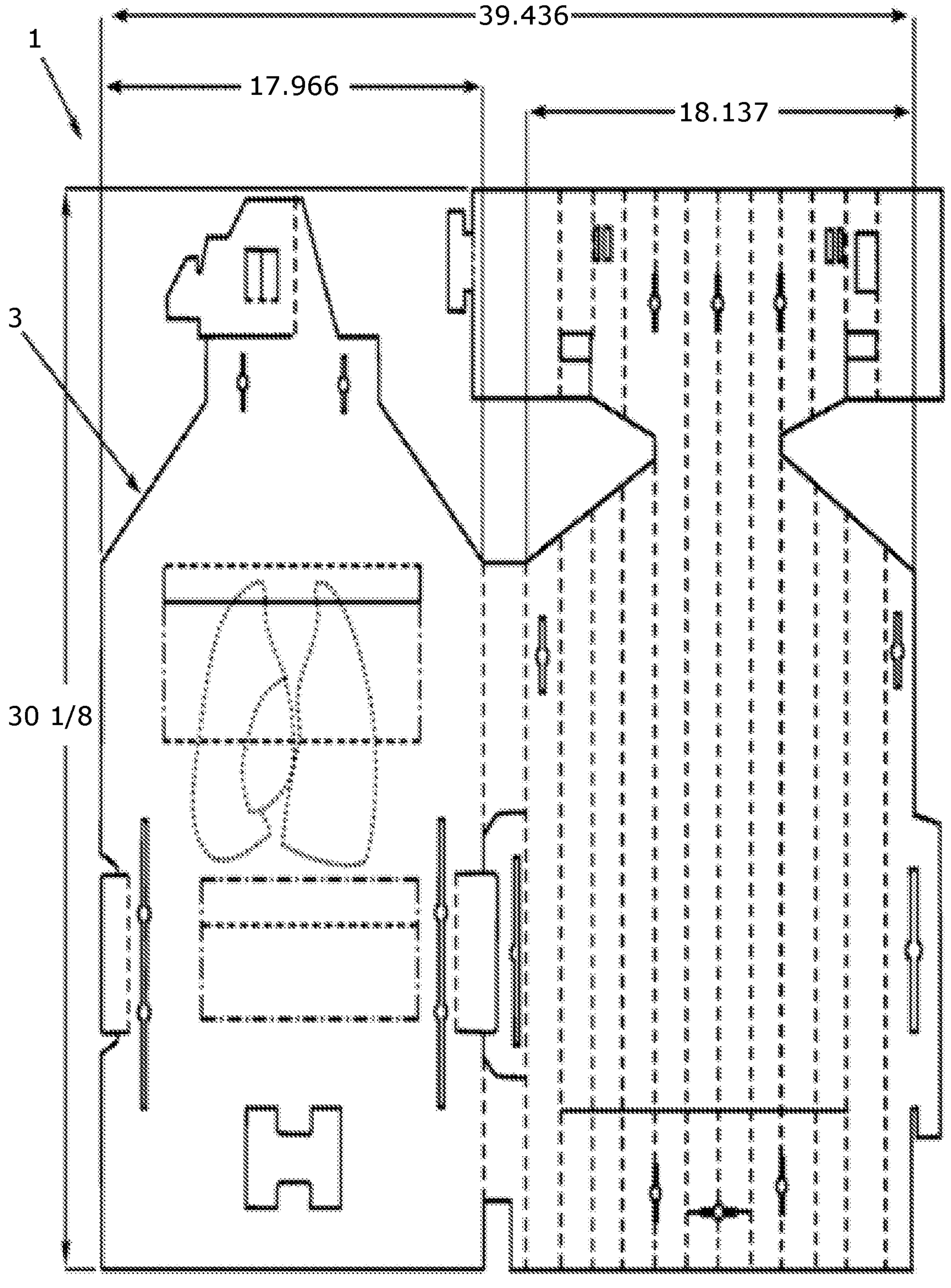
FIG. 1*g* is another elevation view of the kinetic target in a flat, unfolded state prior to configuration of the cardboard sheet for use as a target.

Referring to FIG. 1*f*, above and below the slot 32, upper and lower arms 93 and 94 of the C-shape 30 (i.e., horizontal segments not cut away from the cardboard 3), are positioned for bending along an interior vertical fold line 34 to provide a hinge-like arrangement to rotate the flap 29 out of the plane of the sheet of cardboard 3. The flap 29 is attached to the front panel 5 by both of the horizontal C-shape arms 93, 94 which bend along the vertical fold line 34 and vertical portion of flap 29 between fold line 34 and slot 32.

Prior to assembly, the flap 29 is rotated about the vertical fold line 34 to extend above the plane of the sheet of cardboard 3 (see FIGS. 1*b* and 1*f*). The angle of the flap 29 after rotation may be more or less than ninety degrees or perpendicular to the plane in which the majority of the cardboard sheet resides. With the flap 29 rotated out of the plane, the front panel 5 is folded along the vertical fold line 34 to create an interior ridge 45 when the flap 29 is inserted into the third torso slit 17. See FIG. 3. During assembly, after creation of the first torso joint 98, the flap 29 is inserted into the torso slot 17 to create the second torso joint 99, See FIG. 5. The flap 29 and second torso slit 17 are each in exemplary positions substantially the same vertical distance, e.g., within 0.125 inch (0.32 cm), above the horizontal bottom edge 2 of the torso section 16. With the slits extending the same vertical distances above the horizontal the flap 29 can be inserted into the third torso slot 17 without requiring elastic deformation of the front or back panels 5, 8. After creation of the second torso joint 99, the interior ridge 45 has an exemplary width of 5.715 cm (2.25 inches) that extends from the central fold line 4 to the interior fold line 34. See FIG. 3. The interior ridge 45 extends in the vertical direction from the top 110 of the interior ridge 45 to the bottom 111 of the interior ridge 45. Interior ridge 45 allows for increased structural rigidity of the kinetic target 1, centers the simulated torso section 16, and facilities the use of single piece of cardboard 3.

To summarize, the vertical lengths of the flap 9 and the first torso slit 25 are designed to be complementary for interlocking. Relative to the horizontal torso bottom edge 10 along the back body panel 8, the location of the lower end 26 of the slit 25 is at a location of about ½ to ¾ inch (1.3 to 1.9 cm) above the bottom position 19 of the flap 9. See FIGS. 1*b* and 1*c*. This facilitates placement of flap 9 within the slit 25 by requiring the elastic deformation of the front panel 5 or back body panel 8 with respect to one another. When the flap 9 is inserted into slit 25, the termination point 24 of the recess 41 comes to rest on the bottom 26 of the slit 25 when the front panel 5 or rear panel 8 relaxes from the elastic deformation required for assembly. See FIG. 5.

The rear body panel 8 has an exterior locking flap 40 along the fold line 43 and an interior locking flap 44 along the fold line 113. See, also, FIGS. 1*c* and 1*f*. Once the flap 9 has been inserted into the slit 25, the flap 9 can be locked in place with insertion of a projection in the form of the flap 40 through the slit 18 created in the flap 9 above the recess 41 and along the outer edge 7 of the torso section 16. See FIGS. 6*a-d*. Once the interior flap 29 has been inserted through the third torso slit 17, the flap 44 can be inserted through the interior vertical slot 32 to lock the front panel 5 in place and stabilize the shape of the torso section 16 as shown in FIGS. 3 and 5. See, also, FIGS. 6*b*-6*c*.

Figure 4A:
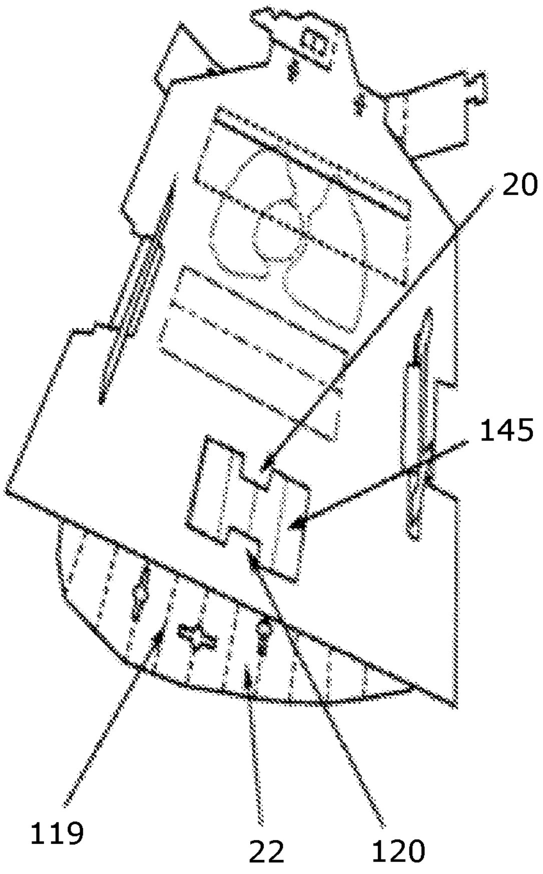
FIG. 4*a* is a perspective view showing a pelvic section of the kinetic target when partially configured.
Figure 4B:
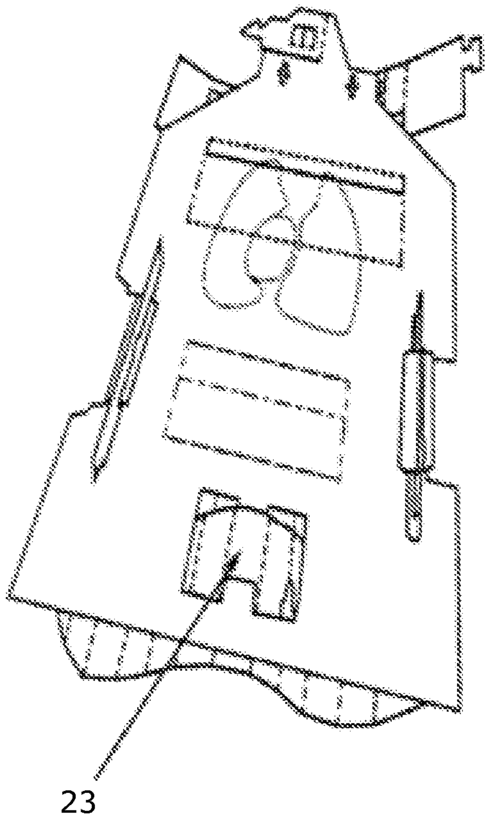
FIG. 4*b* is another perspective view of the pelvic section seen in FIG. 4*a* from above.
Figure 4C:
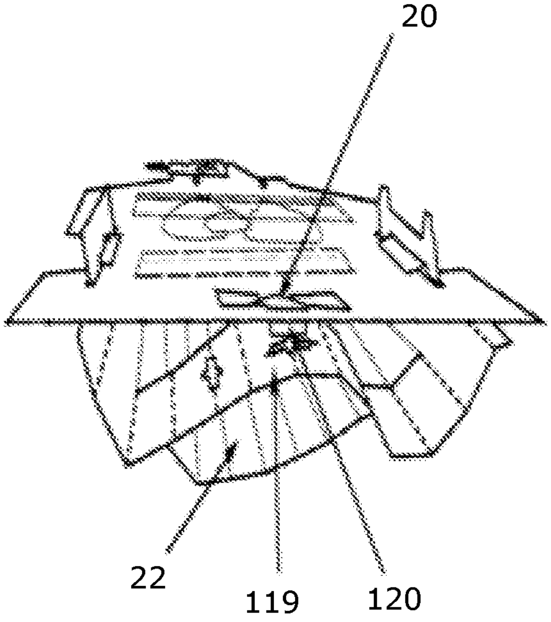
FIG. 4*c* is a perspective view showing a pelvic subsection of the kinetic target when partially converted from a substantially flat, horizontal position.
Figure 4D:
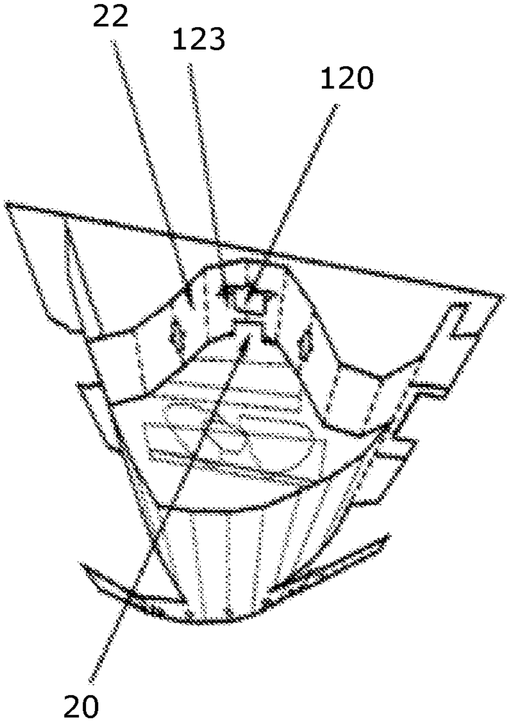
FIG. 4*d* is a perspective view from the underside of the kinetic target showing a pelvic section.

As seen in FIG. 1*b*, as seen along front panel 5, the torso section 16 includes a pelvic subsection 22. which extends below a horizontal cut 35 on the front panel 5, directly below which is positioned a horizontal slot 119. Along the rear body panel 8, from the torso bottom edge 10, a substantially rectangular cut-out 145 extends to the elevation of the horizontal cut 35, with a tab 20 extending downward from the elevation of the horizontal slot 35 and a mirror image tab 120 extending in the upward direction from the elevation of horizontal slot 119. During assembly the pelvic subsection 22, i.e., the portion of the cardboard sheet 3 beneath the horizontal cut 35, is elastically deformed and moved both in the direction of the rear body panel 8 and downward to pass under the tab 20, as seen in FIGS. 4*a* and 4*b* to capture the pelvic subsection 22 of the cardboard sheet 3 with the tab 20 as seen in FIG. 4*b*. The pelvic subsection 22 is moved toward the rear body panel 8 and the tab 120 is plastically deformed to allow for insertion of the tab 120 into the horizontal slot 119, thereby creating a pelvic interconnection 23. See also FIGS. 4*c* and 4*d*.

Referring to FIGS. 1*b* and 3, the head section 15 comprises two interconnectable subsections 15*a* and 15*b* formed along the horizontal top edge 3*t* of the sheet. Head subsection 15*a* is formed along an upper portion of the front body panel 5, above the neck and shoulder line 16*h*. Head subsection 15*b* is formed along an upper portion of the back body panel 8, also above the neck and shoulder line 16*h*. Embodiments of the head section 15 include an emulated nose, referred to as nose anchor 49, positionable after assembly in the general location at which a nose would be located on a human head. The nose anchor 49 is a forward-most portion of orientation flap 31 seen in FIG. 7.

The head subsections 15*a* and 15*b* are connectable via a series of mating tabs, or flaps, and slots or slits to form a contoured three-dimensional emulation of a human head. See FIG. 3. Advantageously, when the front panel 5 is rolled to produce the arc-like contour 48 for the torso section 16 (FIG. 2), the head subsection 15*a* is similarly and simultaneously rolled as shown in FIGS. 2*a* and 2*b*, to initially impart a contour similar to the contour 48 in the simulated torso section 16. This rolling action can impart creases or folds along individual corrugations along vertical lines shown in FIG. 8*a*. Then, based on insertions of flaps or tabs at predetermined locations through the sheet 3, the head section 15 can be further configured as a closed shape to impart a stabilized arc-like contour 48*a*, different than the contour 48, e.g., a smaller average radius of curvature when compared to the torso curvature 48 along the front panel 5. See FIGS. 9-14.

Features of the configured head section 15 differ from those of the torso section 16 in several ways. According to the illustrated embodiment the contour 48*a* is an adjustable curve-like shape that extends a full 360 degrees about the section 15 to emulate a head. Both the shape of the head emulation and the nose pointing direction are adjustable. The area and volume enclosed by the contour 48*a* of the head subsection 15*a* (see FIGS. 9-11), when measured in cross section (i.e., along a horizontal plane) is smaller than the enclosed area or volume of the underlying simulated torso section 16 having the fixed contour 48. See FIGS. 3 and 13. Notably, for the illustrated embodiment the torso section contour 48, created along the front panel 5, does not extend to the back body panel 8. Rather, the portion of the torso section 16 along the back panel exhibits a flat appearance. Thus, the target 1 may comprise a single sheet 3 out of which a three dimensional head emulation, having a contour having curvature along a 360 degree arc length, is secured above a three dimensional torso emulation comprising an arc-like feature providing a contour having curvature along front panel 5.

Figure 8A:
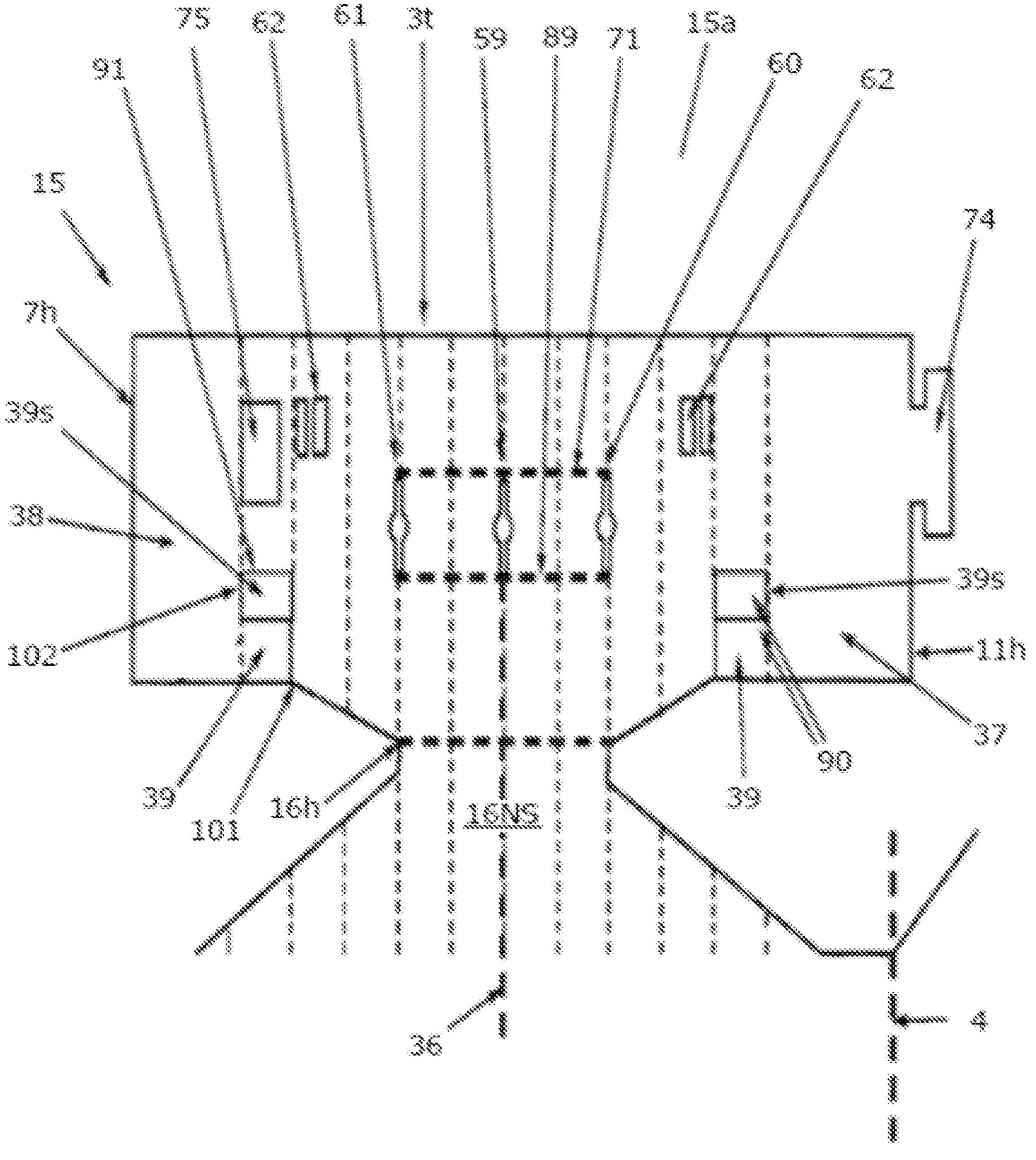
FIG. 8*a* is an enlarged front view of the head section of the kinetic target.

Referring to FIGS. 1*b* and 8*a*, when the kinetic target is formed from a unitary (i.e., single) sheet, providing a torso section and a head section, the illustrated head subsection 15*a* is a strip of the sheet 3 extending downward from the sheet top edge 3*t*, and approximately centered about a vertical line 36 which passes through a central region of the subsection 15*a*. The vertical line is referred to herein as central line 36. See FIGS. 1*b* and 8*a*. When the subsection 15*a* is configured to emulate a head, opposing end regions of the strip, referred to as first and second lap segments 37, 38, are lapped, one over the other, and locked to emulate a head shape. With the kinetic target formed from a single sheet providing a torso section and a head section, the illustrated subsection 15*a* extends in a first horizontal direction away from the central line 36 and toward the head subsection 15*b*, terminating at a first outer head section edge 11*h* along the first lap segment 37. With the edge 11*h* positioned along or adjacent the vertical fold line 4, a locking tab, in the form of a T-shaped anchor flap 74, extends beyond the edge 11*h* and toward the subsection 15*b*. The subsection 15*a* also extends in a second horizontal direction (opposite the first horizontal direction) from the central line 36 to terminate at a second outer head section edge 7*h*, providing a second lap segment 38.

The first lap segment 37 and the associated first outer head section edge 11*h*, are shown, in the example embodiment of FIG. 8*a*, to extend beyond the vertical fold line 4, but this arrangement is not necessary among several embodiments of the invention. For the disclosed embodiments, the lap segments 37, 38 extend sufficient distances in horizontal directions from the central line 36 to permit lapping with an interconnection between the segments using features formed exclusively from portions of the sheet 3.

A feature of the illustrated embodiment is application of multiple flaps, tabs, slots and/or slits formed in the sheet 3 to effect emulation of a head with the entire head section 15 having a stabilizing connection above the torso section 16. The target 1 provides a stable three dimensional emulation solely from creation of one or more cuts or folds in the single sheet 3, i.e., without use of fasteners or other mechanical components not fashioned in or from the sheet 3. For example, with lapping of the first segment 37 over and exterior to the second segment 38, the T-shaped anchor flap 74 can be inserted within a slot 75 formed within or adjacent the second lap segment 38. See FIG. 8*a*. The slot 75 may be a rectangular knock-out formed with four adjoining horizontal and vertical perforation cuts. In other embodiments such as illustrated in FIG. 8*a* of my provisional U.S. application Ser. No. 62/704,142, the slot 75 may have a shape complementary to the chosen shape of the anchor flap 74, which may be of still other shapes apparent to those skilled in the art. For embodiments with which the anchor flap 74 is T-shaped and the slot 75 is rectangular, the corresponding slot 75 may be of a smaller vertical dimension than the largest vertical dimension of the anchor flap 74 (e.g., along the edge of the T-shape). With this arrangement, and the sheet material having plastic properties, the T-shape may be bent in order to pass through the slot 75. In still other embodiments the horizontal dimension of the slot 75 may be reduced to the horizontal dimension of a vertical slit through which the flap 74 is inserted. The flap 74 can be locked in place with a second flap and slit pair analogous to the pair 40, 18 described for the torso section 16. That is, a second slit may be formed in the first flap 74 to receive a second flap or tab.

Figure 7:
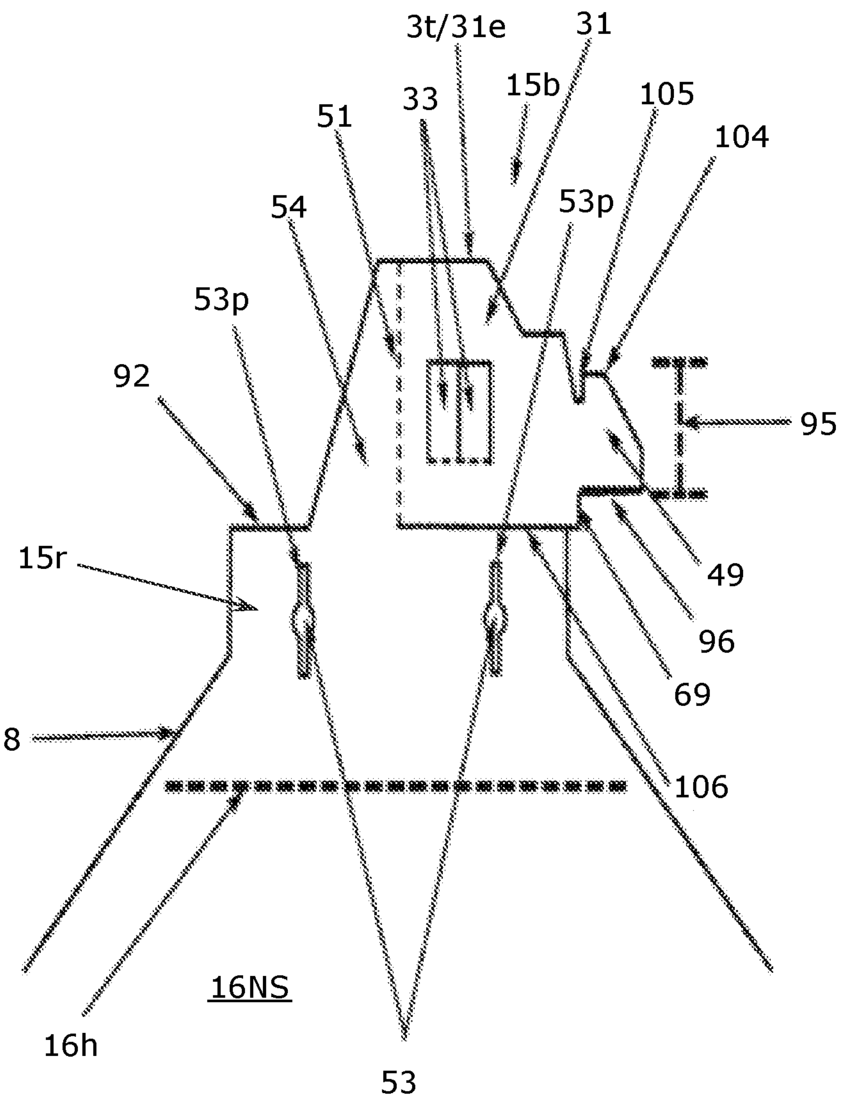
FIG. 7 is an enlarged partial view of a head subsection shown in FIG. 1*b*.

The head subsection 15*a* includes a pair of connecting tabs 39, each formed within or adjacent a different one of the lap segments 37, 38. The tabs 39 are flaps which fold out of the plane of the subsection (as shown in FIG. 8*a*) to provide connection to the head subsection 15*b* by insertion through one of two spaced-apart vertically oriented locking slots 53 to enhance a secure connection or stabilize connection between the head section 15 and the torso section 16. The locking slots 53 are formed in lower head region 15*r* of the head subsection 15*b* along a horizontal line (not shown) below the polygonal shaped support 54 and the orientation flap 31. The lower head region 15*r* extends from below the horizontal edge segment 92 and orientation flap 31 to border a neck-shoulder region along horizontal line 16*h*. As shown in FIG. 7, the exemplary slots 53 may be symmetrically spaced about the vertical fold line 51, for receiving the connecting tabs 39. With reference to FIG. 8*a*, the connecting tabs 39 are formed with cuts in the sheet 3 and removal of square or rectangular sections above each connecting tab 39 to create clearance spaces 39*s* which provide clearances to avoid interference between portions of the front and back panels, e.g., interference cause by sheet material in portions 53*p* of the subsection 15*b* above the two slots 53. This clearance avoids interference when forming the contour 48*a* into a closed shape. The tabs 39 and spaces 39*s* are defined with horizontal cuts 90 and vertical cuts 101 and 102.

Referring to FIGS. 7 and 8*a*, the kinetic target 1 includes an orientation feature in the head section 15 to emulate varied poses of a person presented at angled positions with respect to a viewer, instead of presenting only a direct head-on view. To this end, the head subsection 15*b* includes the orientation adjustment flap 31, formed on the back body panel 8, to provide an appearance that the head of a simulated person's body is turned with respect to the torso section 16.

A horizontal cut 106 enables the flap 31 to be creased and to swing about a vertical fold line 51. The fold line 51 is shown as approximately centrally positioned with respect to a lower head region 15*r* of the subsection 15*b*, underlying the flap 31 and the cut 106. The adjustment flap 31 includes nose anchor 49 which functions as an interlocking tab, having a suitable shape for a nose emulation. The nose anchor 49 is located along the right edge of the orientation adjustment flap 31 as referenced from the vertical fold line 51 and shown in FIG. 7. With the orientation adjustment flap 31 allowed to swing about the vertical fold line, the orientation adjustment flap 31 can be folded about the vertical fold line 51 and along an adjoining polygonal shaped support 54. This degree of freedom enables the orientation adjustment flap 31 to rotate about the fold line 51 after being severed, via the cut 106, from other portions of the head subsection 15*b*. Thus, the adjustment flap can be oriented to point in variable directions, e.g., approximately perpendicular to the back body panel 8 for a forward facing orientation. The nose anchor 49 is insertable through any of multiple orientation slots formed along the head subsection 15*a* to adjust the direction along which the entire head section 15 appears to face—based on location or pointing direction of this nose emulation.

Along a horizontal line below the flap 31, the head subsection 15 a includes a pair of spaced-apart vertically oriented slots 53, symmetrically spaced about the vertical fold line 51, for receiving the connecting tabs 39. Head subsection 15 a as shown in FIG. 8*a* includes three such exemplary orientation slots with a central orientation slot 59 formed along the central line 36 and slots 60 and 61 symmetrically spaced apart on different sides of the central line 36. Points at the uppermost extent of the three orientation slots are co-linear and points at the lowermost extent of the three orientation slots are also colinear. The top edge 3 *t* of the target 1 (also the top edge along the head section 15) extends along the polygonal shaped support 54 and the orientation adjustment flap 31 and includes the upper edge 31 *e* of the flap 31. The flap upper edge 31 *e* includes a cut pattern defining the nose anchor 49 and a notch 105 which serves to lock the flap 31 in place so that the nose anchor extends through one of the slots 59, 60 or 61.

Figure 9:
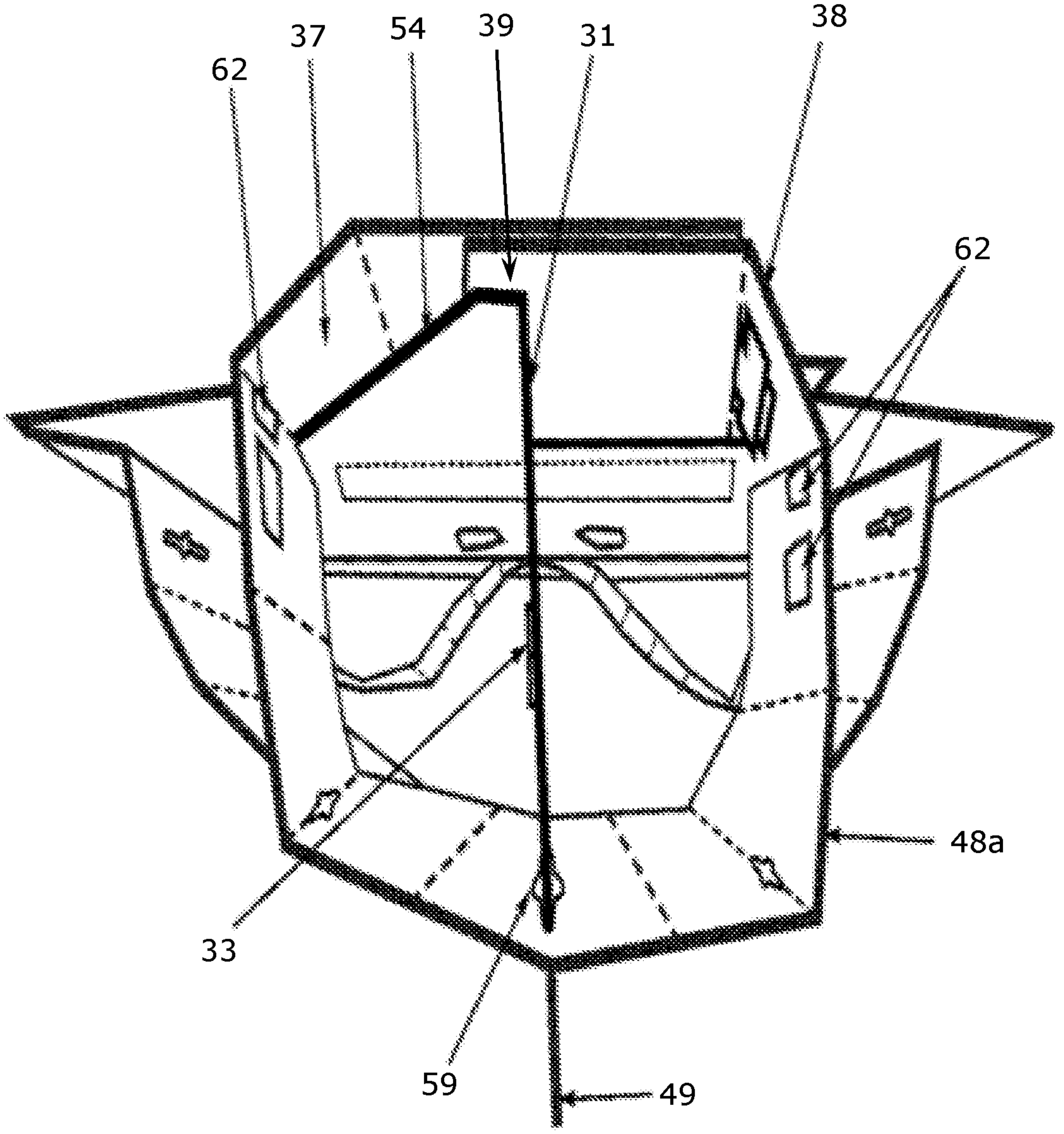
FIG. 9 is a perspective view, taken from above, of the head section with the kinetic target configured for presentation in a standard frontal orientation.
Figure 10:
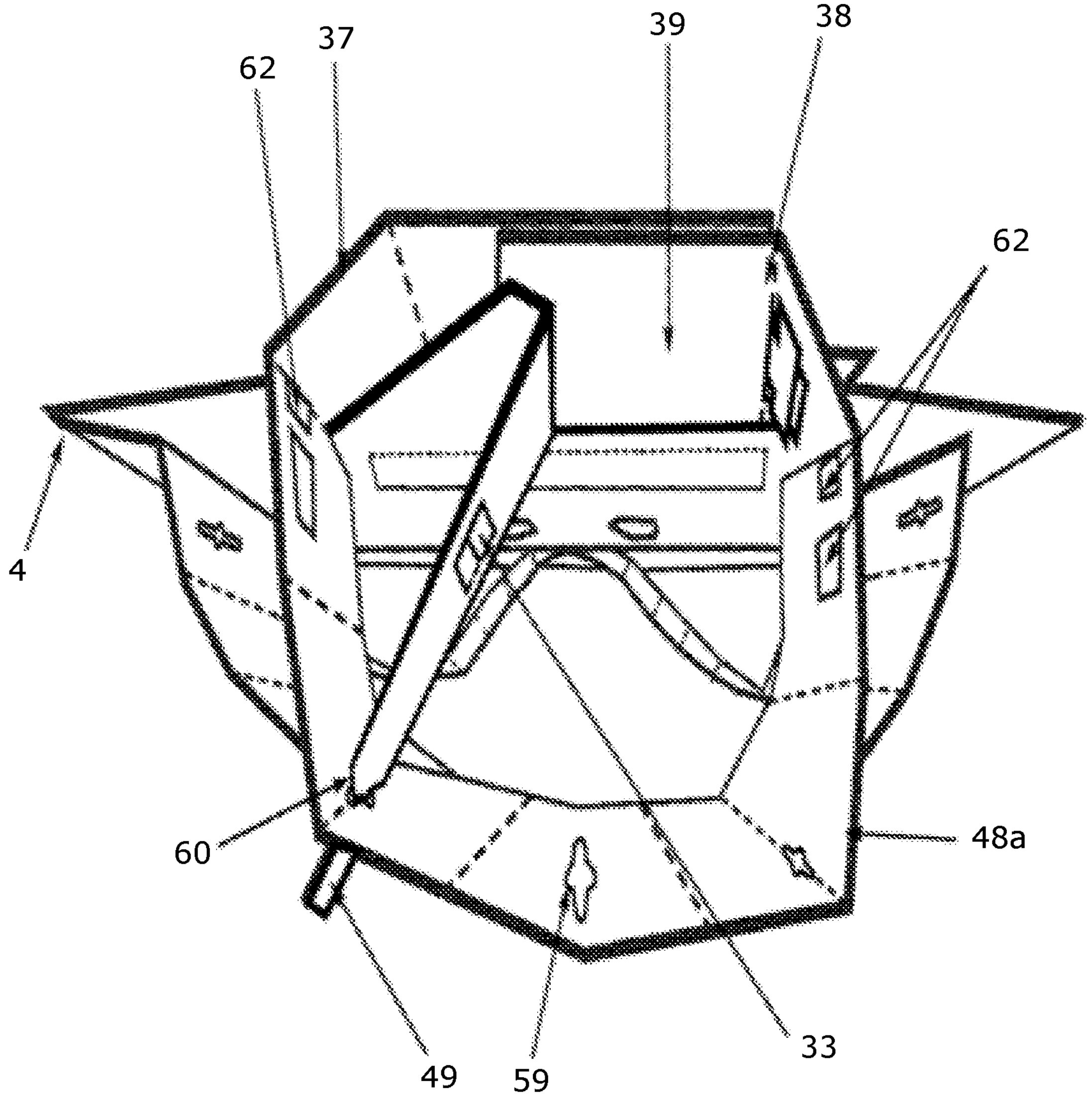
FIG. 10 is a perspective view taken from above of the head section when the kinetic target is configured for presentation in an orientation rotated clockwise relative to the orientation shown in FIG. 9.
Figure 11:
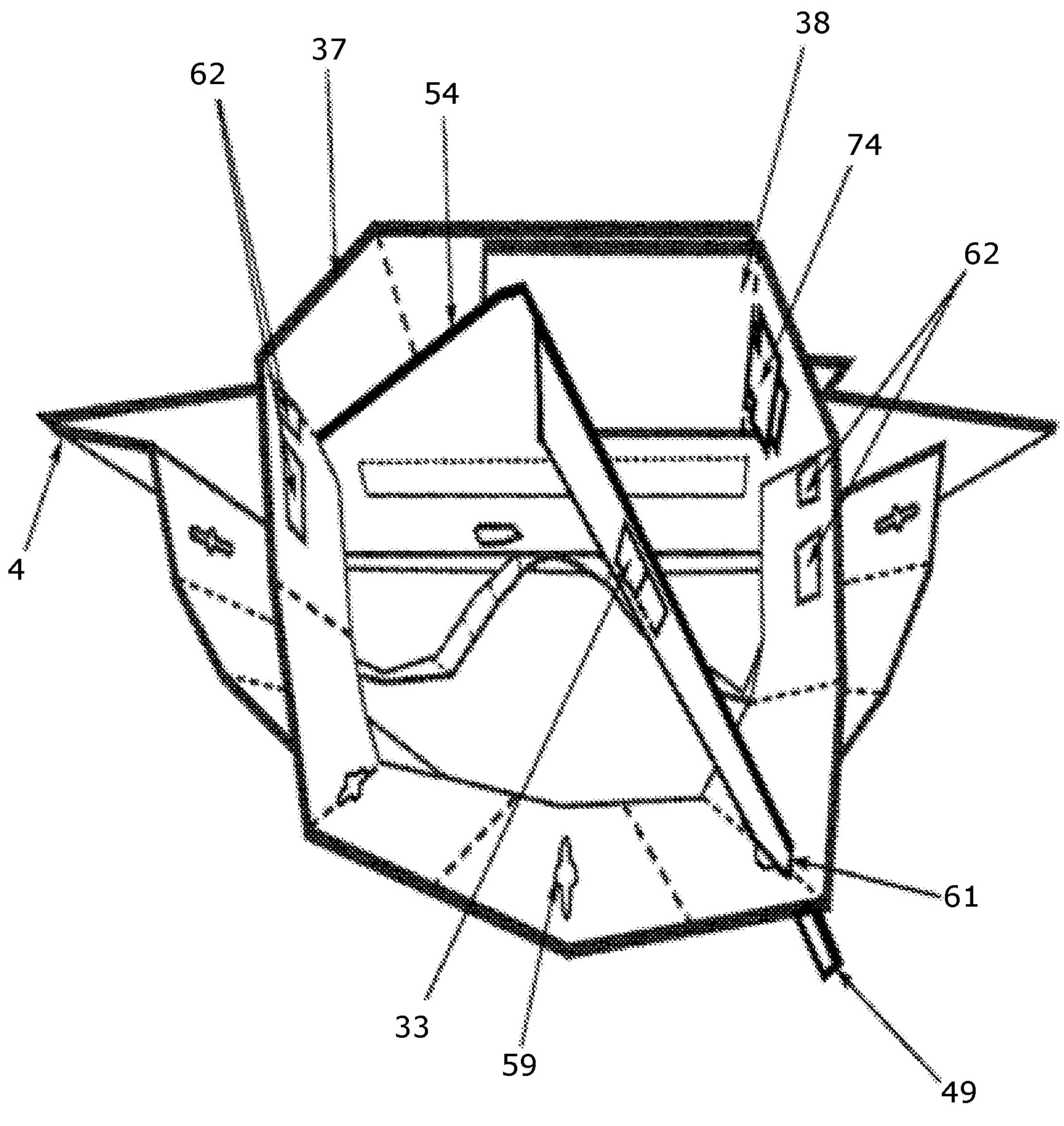
FIG. 11 is perspective view taken from above of the head section when the kinetic target is configured for presentation in an orientation rotated counter-clockwise relative to the orientation shown in FIG. 9.

When the central orientation slot 59 is mated with the nose anchor 49, the kinetic target 1 is set in a neutral or standard position, as seen in FIGS. 3 and 9. The nose anchor 49 is generally triangular in shape, so as to approximate a human nose as seen in profile. The nose anchor 49 has a height 95 that extends from the bottom edge 96 of the nose anchor 49 to the top 104 of the nose anchor 49. There is a cut out section that forms the interlocking notch 105 where the nose anchor 49 adjoins the flap 31. The interlocking notch 105 can be rectangular in shape or polygonal in shape and extends vertically from the top 104 of the nose anchor 49 to the bottom 88 of the interlocking section 105. As seen in FIG. 9, the nose anchor 49 has been passed through the central orientation slot 59, placing the head section 15 in the standard orientation. The tops of slots 59-61 are located on horizontal line 71 and the bottoms of slots 59-61 are located on horizontal line 89 which is located 0.25-0.5 inches (1.3 to 2.6 cm) below the horizontal location of the bottom edge 96 of the nose anchor 49. In order to allow for easier passage of the nose anchor 49 through the slots 59-61, the slots 59-61 can be oversized by 0.125 to 0.25 inches (0.32 to 0.63 cm) when compared to the height 95 of nose anchor 49. In order to pass through the slots 59-61 the head subsection 15*b* and or the orientation adjustment flap 31 may be elastically deformed to bring the bottom edge 96 of nose anchor 49 to the same horizontal location as horizontal line 89. Once passed through one of the slots 59-61 the interlocking section 105 of the nose anchor 49 will come to rest with the top of one of the slots 59-61, which are collinear with horizontal line 71. The elastic properties of the corrugated cardboard provide a stabilizing force that urges movement of the nose anchor 49 upward against the top edge of one of the slots 59-61. This feature is present among multiple connections to add stability to the three dimensional structure.

Figure 8B:
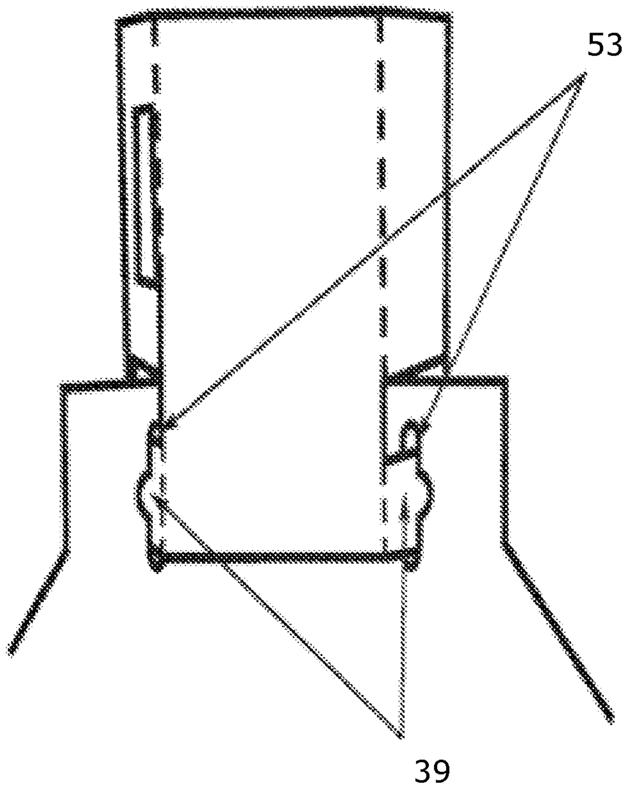
FIG. 8*b* is an enlarged rear view of the head section of the kinetic target.

After the nose anchor 49 has been locked in place within one of the slots 59-61, the now contoured interior and exterior lap segments 37 and 38 can be configured to give the head section 15 a three-dimensional configuration and structural support. As seen in FIG. 5, the second lap segment 38 can be rolled toward the first lap segment 37. The second lap segment 38 can then be plastically deformed along some of the vertical lines shown in FIG. 8*a* by creating folds to begin closing the strip into a circular/cylindrical-like head shape, with the connecting tabs 39 passing along the horizontal panel region 15 *r* of the head subsection 15 *b*. When the connecting tabs 39 reach the slits 53 the T-shaped anchor 74 of the first lap segment 37 can readily come into alignment with the second lap segment for insertion through the T-shaped slot 75; and each of the connecting tabs 39 can also be readily inserted into one of the corresponding locking slots 53 along the horizontal panel region 15 *r* of the head subsection 15 *b*. See FIG. 8*b*. The portions of the strip of sheet 3 adjoining the connecting tabs 39 prior to creating the vertical cut 101 are also brought into contact with interior portions of the back body panel 8. The connecting tabs 39 can be inserted into corresponding locking slots 53, from the exterior side of the back body panel 8 passing through to the interior side of back body panel 8. See again FIG. 8*b*. The top edge 91 of each cut out, creating the space 39 s above each connecting tab 39, adjoins or comes in physical contact with, e.g., resting on, the upper edge of the portion of the horizontal panel region 15 *r* created with the horizontal cut 106 defining the nose anchor 49. In a similar manner to the above-described movement of the second lap segment 38, in the process of configuring and stabilizing the contour 48 *a*, the first lap segment 37, is plastically deformed along some of the vertical lines shown in FIG. 8*a* by creating folds to begin closing the strip into a circular/cylindrical-like head shape, with the connecting tab 39 passing along the horizontal panel region 15 *r* of the head subsection 15 *b*; and the second lap segment extends over edge segment 92 with the top edge 91 of the cut out creating the space 39 s above of the connecting tab 39 adjoining or coming in physical contact with, e.g. resting on, the edge segment 92 of back body panel 8. The corresponding locking connecting tab 39 is then mated with the corresponding locking slot 53. See FIG. 5. The connecting tab 39 on or adjacent the first lap segment 37 has also been inserted into the corresponding locking slot 53 by passing from the exterior side of the back body panel 8 passing through to the interior side of back body panel 8. The first lap segment 37 and the second lap segment 38 can each be locked by connecting the T-shaped anchor flap 74 on the first lap segment 37 within the rectangular slot 75 located on the second lap segment 38 thereby creating a head joint.

Within the approximate center of the orientation adjustment flap 31, a pair of knockout pass-through tabs 33, formed in the adjustment flap, allow for a support string or cord to be threaded through the orientation flap 31 to suspend the entire kinetic target 1 in air for use as a hanging target, e.g., on a movable track. The pass-through tabs 33 can be perforated or precut such that they can be individually or jointly pressed or folded out of the carboard 3, or "knocked out" entirely, to create an opening in the orientation adjustment flap 31. Along a horizontal line below the flap 31 (not shown), the head subsection 15*b* includes a pair of spaced-apart vertically oriented slots 53, symmetrically spaced about the vertical fold line 51, for receiving the connecting tabs 39. The fold line 51 is shown as approximately centrally positioned with respect to the neck and shoulder section 16NS underlying the flap 31.

The kinetic target 1 may be hung with a cord threaded through a pair of temple slots 62 formed with cuts along head temple areas in or adjacent each of the first and second lap segments 37, 38 and one or both of the pass-through tabs 33. When the orientation flap 31 is in the standard orientation, the kinetic target 1 will hang in the standard orientation. As seen in FIG. 9, the temple slots 62 and the pass-through tabs 33 are, substantially, horizontally aligned, which would cause the kinetic target 1 to hang in the standard orientation when supported by a cord that passes through the temple slots 62 and pass-through tabs 33. This arrangement restricts results from the absence of rotational movement on the cord by the orientation tab 49, because the orientation flap 31 is centered between the temple slots 62. When the orientation flap 31 is in the interior orientation slot 60, the head section 15 will be rotated approximately 45° in the direction of the central fold 4, or clockwise as viewed in FIG. 10. This is due to a counter clockwise rotational element of 45° imparted by the orientation flap 31 on a cord that passes through the temple slots 62 and through tabs 33 such that the orientation flap 31 will be in the same position as when hung in standard orientation but the rest of the kinetic target 1 will be rotated counter clockwise by 45°. When the orientation flap 31 is in the exterior orientation slot 61 the head section 15 will be rotated approximately 45° in the direction away from the central fold 4, or anti-clockwise as viewed in FIG. 11. When hung with a cord threaded through the temple slots 62 and pass through tabs 33 the kinetic target 1 will hang in an orientation that is rotated 45° clockwise versus the standard orientation. This is due to a clockwise rotational element of 45° imparted by the orientation flap 31 on a cord that passes through the temple slots 62 and pass through tabs 33 such that the orientation flap 31 will be in the same position as when hung in standard orientation but the rest of the kinetic target 1 will be rotated clockwise by 45°.

Figure 12:
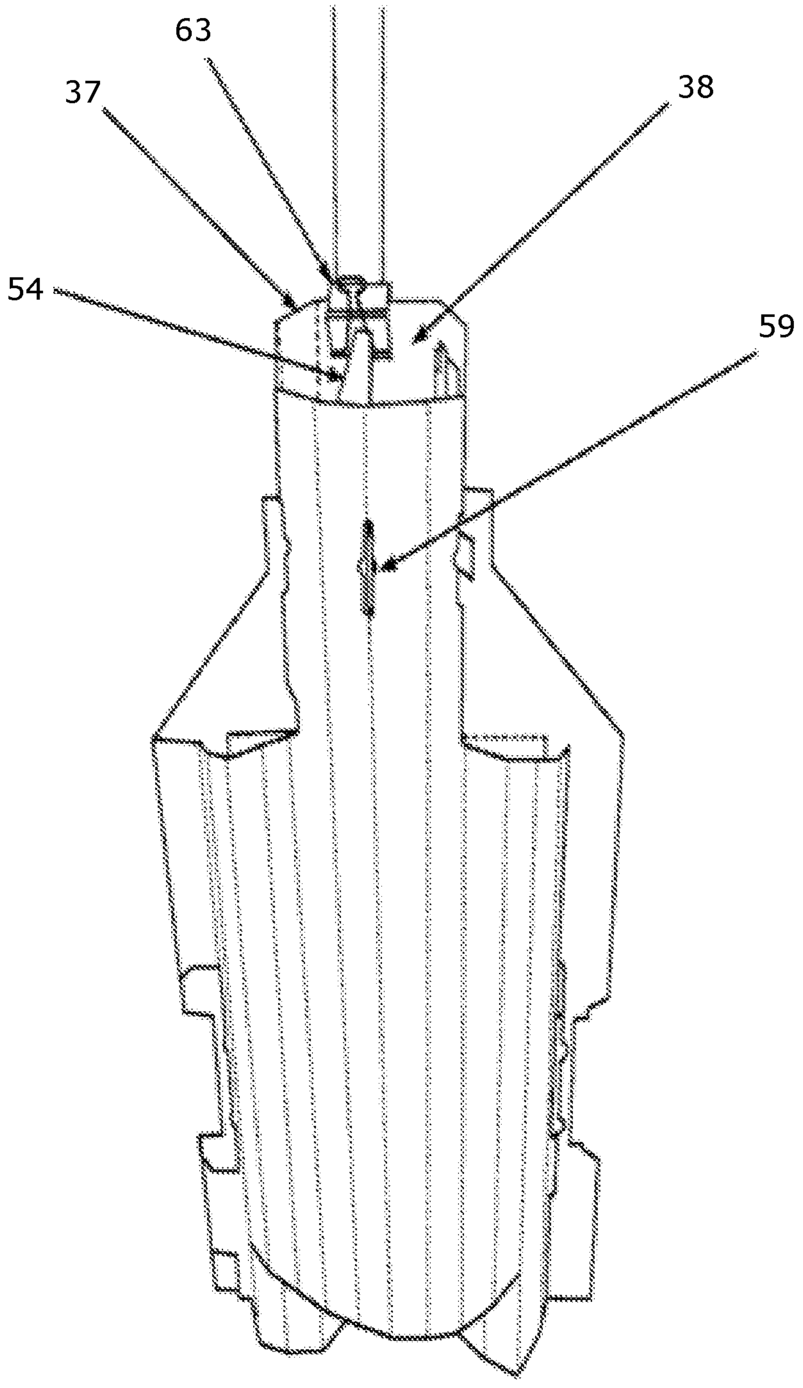
FIG. 12 is a perspective view of the head section of a kinetic target configured for presentation in an upright standard orientation while supported from above by a clip system.
Figure 12C:
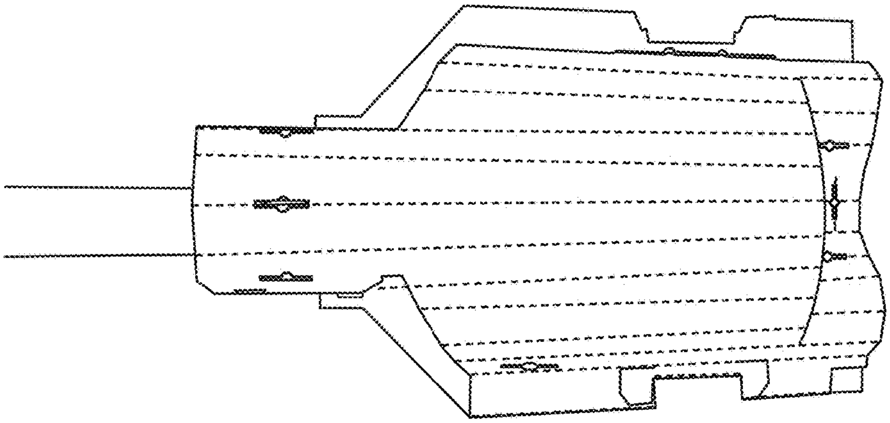
FIG. 12*c* is a front perspective view of the head section of a kinetic target presented in an upright standard orientation and hung from a cardboard hanger.
Figure 12B:
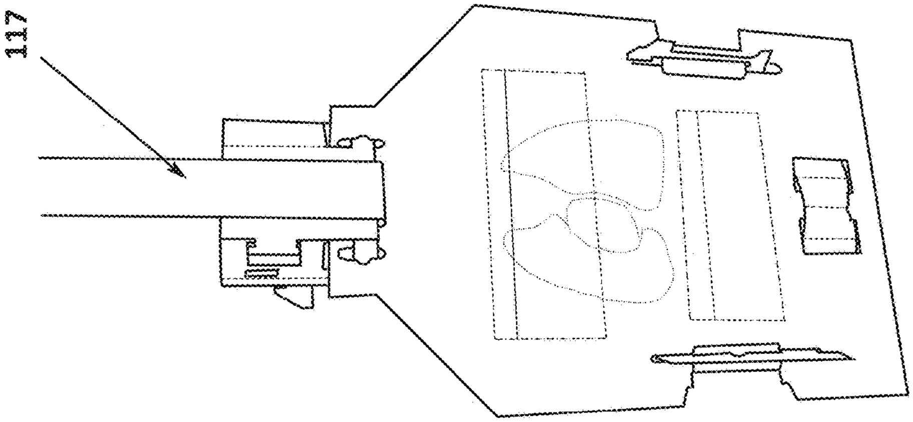
FIG. 12*b* is a rear perspective view of the head section of the akinetic target configured for presentation in an upright standard orientation and hung from a cardboard hanger.
Figure 12A:
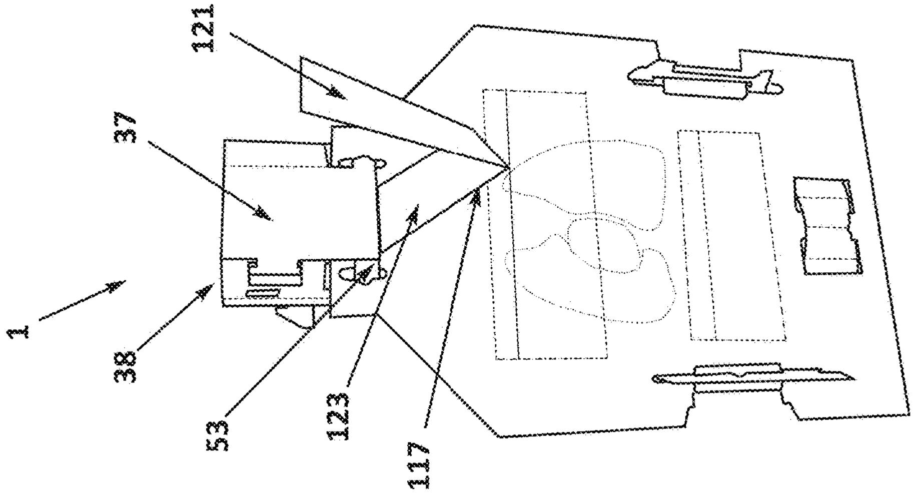
FIG. 12*a* is a rear perspective view of the head section of a kinetic target in an upright standard orientation partially configured to be supported from above by a cardboard hanger.

When the kinetic target 1 is hung using a single clip system, of the type used in shooting ranges, the clip 63 can attach to the interlocked the first and second lap segments 37 and 38 for standard orientation, or can attach to the orientation flap 31 for non-standard orientations. See FIGS. 12-14. When the orientation flap 31 is in the standard orientation the kinetic target 1 will have the clip 63 attached to the interlocked first and second lap segments 37 and 38. See FIG. 12. The kinetic target can be mounted via alternative methods. One such method, shown detailed in FIGS. 12*a*-12*c*, uses a rectangular piece of cardboard in the configuration of a cardboard hook 117. As seen in FIG. 12*a*, the width of cardboard hook 117 is sized to fit between the interlocking slots 53. The cardboard hook 117 is substantially rectangular in shape with a fold 121 positioned to produce an engagement section 123 angled with respect to a major portion of the hook. The engagement section 123 is positioned at roughly the same vertical height of the first and second lap segments 37 and 38. The cardboard hook 117 is inserted between the back body panel 8 and the lapped pair of the first and second lap segments 37 and 38 of the configured kinetic target 1. See FIG. 12*a*. When installed in this configuration, the kinetic target 1 will hang in the standard orientation as seen in FIGS. 12*b* and 12*c*.

Figures 12D, 12E, 12F:
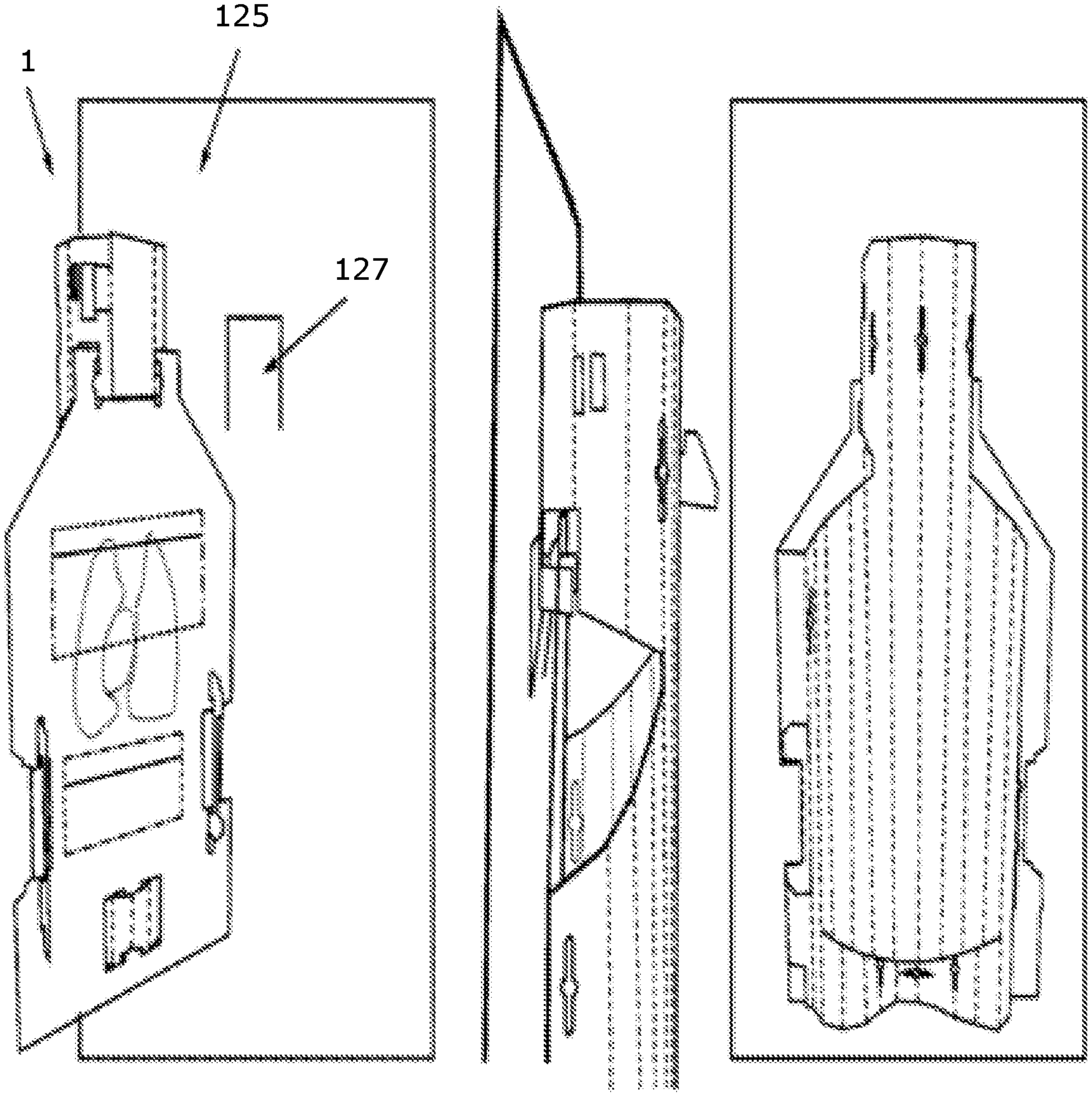
FIG. 12*d* is a rear perspective view of the head section of a kinetic target presented in an upright standard orientation, partially configured to hang from a cardboard sheet.
FIG. 12*e* is a side perspective view of the head section of a kinetic target presented in an upright standard orientation and configured to hang from a cardboard sheet.
FIG. 12*f* is a front perspective view of the head section of a kinetic target configured to hang from a cardboard sheet.

Another series of methods for mounting the kinetic target 1 employs attachment of the target to a wall via a flat cardboard sheet 125 which may be corrugated like the sheet 3. In one embodiment the target is attached to the sheet 125 in the standard orientation where the sheet 125 includes a tab 127 positioned for connection at the vertical height of the head section 15 of the kinetic target 1. See FIG. 12*d*. The tab 127 operates as a flap, being formed with two equal-length vertical cuts which each extend to intersect an overlying horizontal cut thereby creating a rectangular shaped flap which folds out of the cardboard sheet in a vertically downward direction, i.e., extending out of the plane of the cardboard. The tab 127 is sized to fit between the locking slots 53 and has a vertical height roughly co-extensive with the vertical height of the first and second lap segments 37 and 38 of the configured kinetic target 1. To configure the kinetic target 1 for use via this method, the tab 127 is pulled away from the cardboard sheet 125 and inserted between the back body panel 8 and the overlapped first and second lap segments 37 and 38. See FIG. 12*e*. Once configured, the kinetic target 1 will hang in the standard orientation from the cardboard sheet 125. See FIG. 12*f*.

Figure 13:
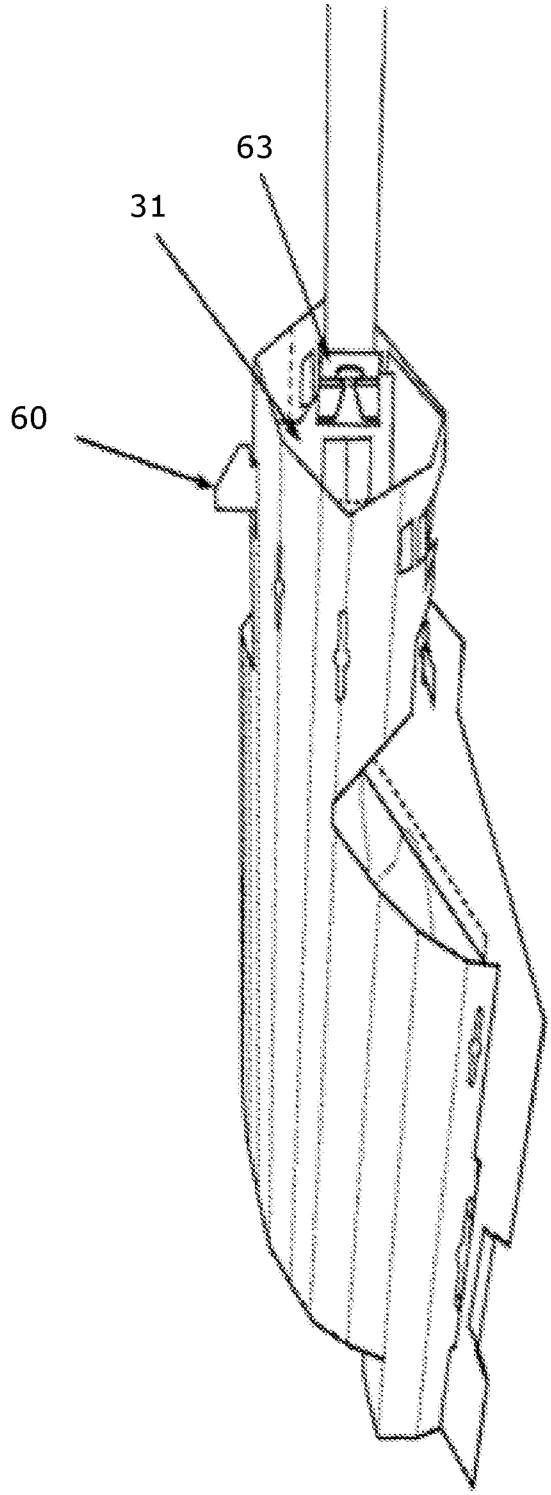
FIG. 13 is a perspective view of the head section of a kinetic target configured for presentation in a clockwise orientation relative to the orientation shown in FIG. 12 while supportable by a clip system.
Figure 13A:
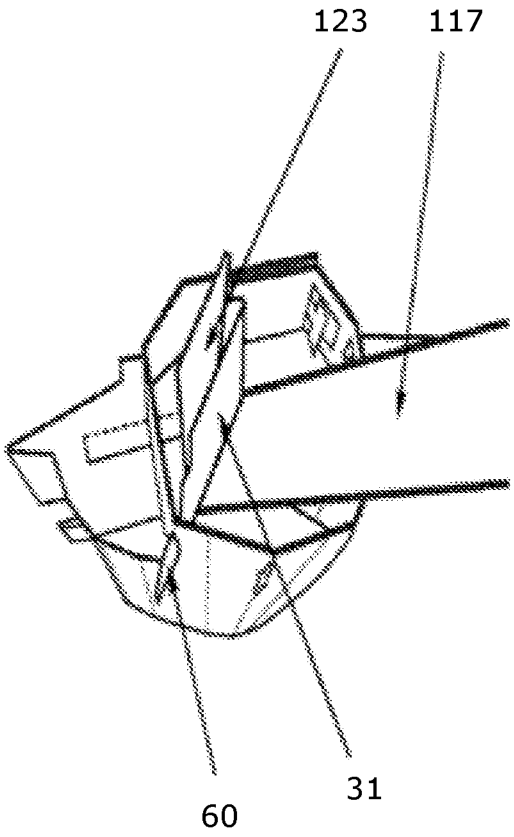
FIG. 13*a* is an overhead perspective view of the head section of a kinetic target configured for presentation in a clockwise orientation relative to the orientation shown in FIG. 12 while supported by a cardboard hanger.
Figure 13B:
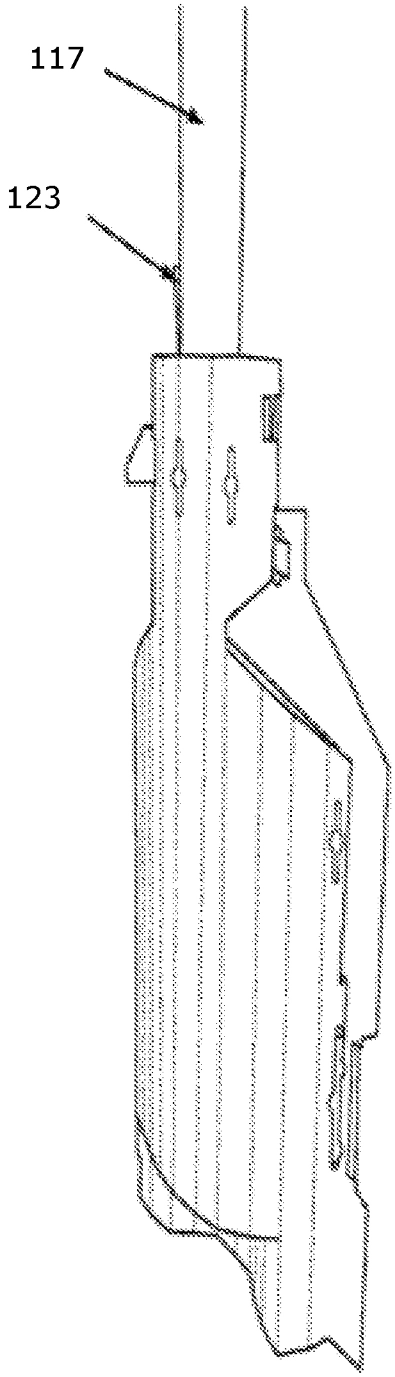
FIG. 13*b* is a front perspective view of the head section of a kinetic target configured for presentation in a counter-clockwise orientation relative to the orientation shown in FIG. 12 while supported by a cardboard hanger.
Figure 14:
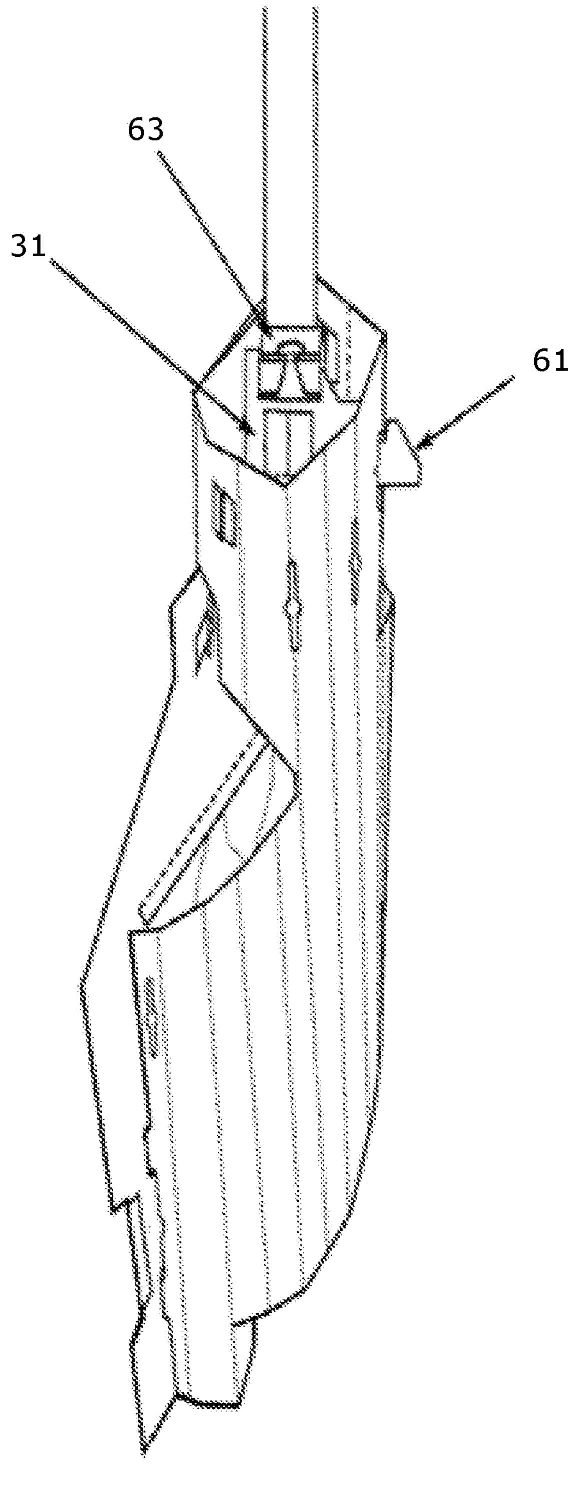
FIG. 14 is a perspective view of the head section of a configured kinetic target configured for presentation in a counter-clockwise orientation relative to the orientation shown in FIG. 12 while supportable by a clip system.
Figure 14A:
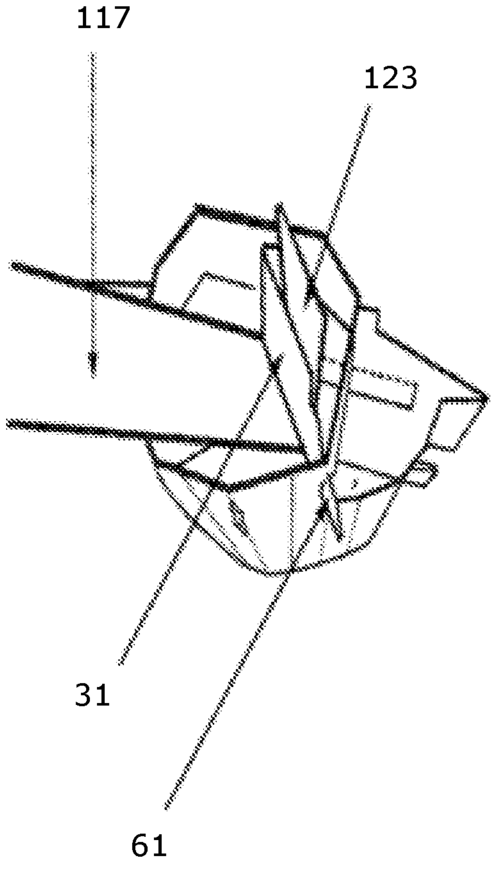
FIG. 14*a* is an overhead perspective view of the head section of a kinetic target configured for presentation in a counter-clockwise orientation relative to the orientation shown in FIG. 12 while supported by a cardboard hanger.
Figure 14B:
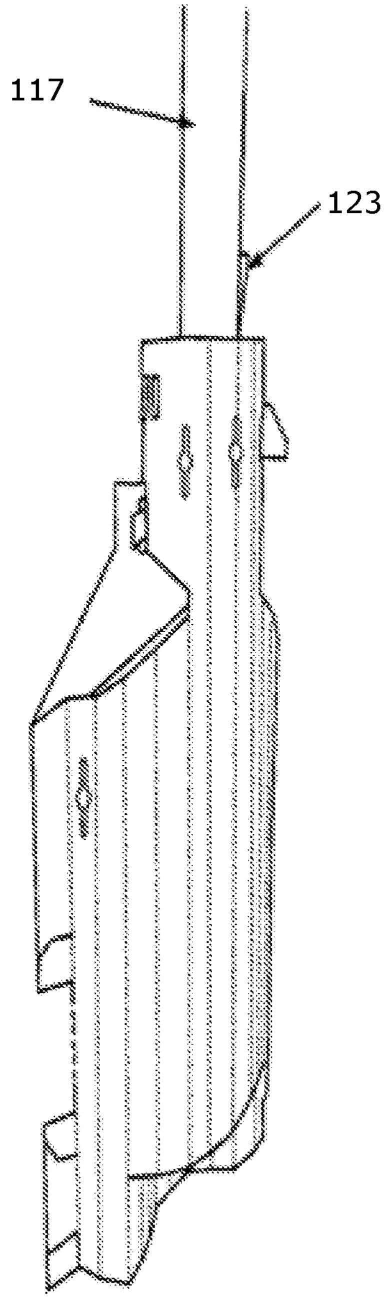
FIG. 14*b* is a front perspective view of the head section of a kinetic target configured for presentation in a counter-clockwise orientation relative to the orientation shown in FIG. 12 while supported by a cardboard hanger.

When the orientation flap 31 is in the interior orientation slot 60, the head section 15 is rotated approximately 45° in the direction of the central fold 4, or clockwise as viewed in FIG. 13. When hung from a clip 63 attached to the orientation flap 31, the kinetic target 1 will hang in an orientation that is rotated 45° clockwise relative to the standard orientation. According to another embodiment, a cardboard hook 117 can be used to hang the kinetic target 1. As seen in FIG. 13*a*, with the orientation flap installed in orientation slot 60, the cardboard hook 117 is hooked around the orientation flap 31. That is, the engagement section 123 may be sized to be equal to or greater in vertical height than the head section of the kinetic target 1. With this arrangement the kinetic target 1 will hang in a clockwise orientation. See FIG. 13*b*. The engagement section 123 will inherently resist plastic deformation from the weight of the kinetic target 1, helping to keep the kinetic target 1 hanging in the clockwise position. When the orientation flap 31 is in the exterior orientation slot 61, the head section 15 will be rotated approximately 45° in the direction away from the central fold 4, or counter-clockwise relative to the standard orientation as viewed in FIG. 14. When hung from a clip 63 attached to the orientation flap 31, the kinetic target 1 will hang in an orientation that is rotated 45° anti-clockwise versus the standard orientation. Alternatively, a cardboard hook 117 can be used to hang the kinetic target 1. As seen in FIG. 14*a*, the cardboard hook 117 is hooked around the orientation flap 31, with the flap 31 installed in orientation slot 61, and with the engagement section 123 sized to be equal to or greater in vertical height than the head section of the kinetic target 1, in this fashion the kinetic target 1 will hang in anti-clockwise orientation by the frictional forces between the engagement section 123 and the internal cavity section 86 of the head section. See FIG. 14*b*. Additionally, the engagement section 123 will inherently resist plastic deformation from the weight of the kinetic target 1, helping to keep the kinetic target 1 hanging in the anti-clockwise position.

Figure 14C:
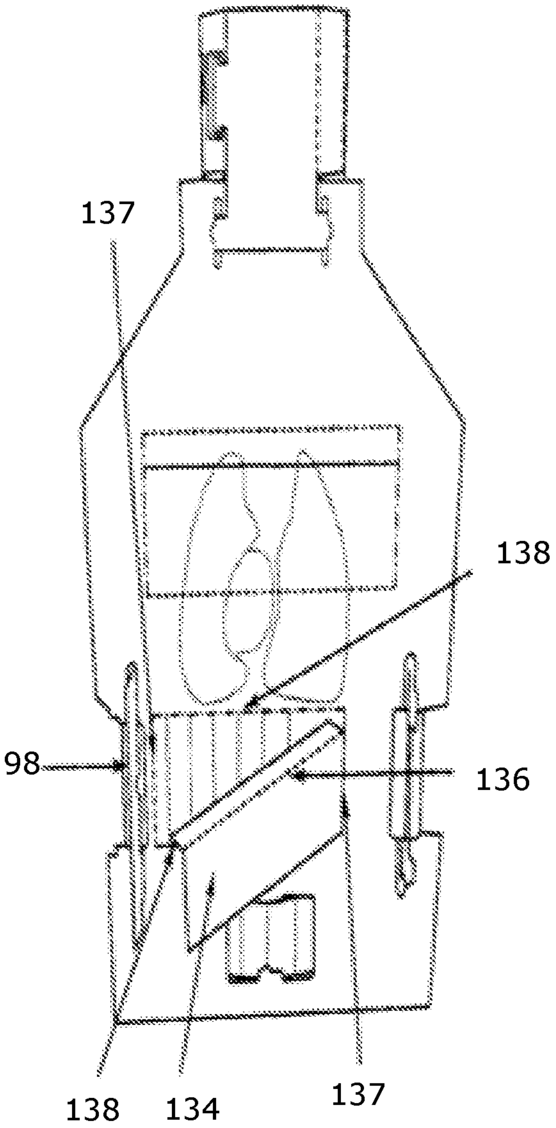
FIG. 14*c* is a rear perspective view of a kinetic target partially configured for presentation while supported by a cardboard sheet.
Figure 14D:
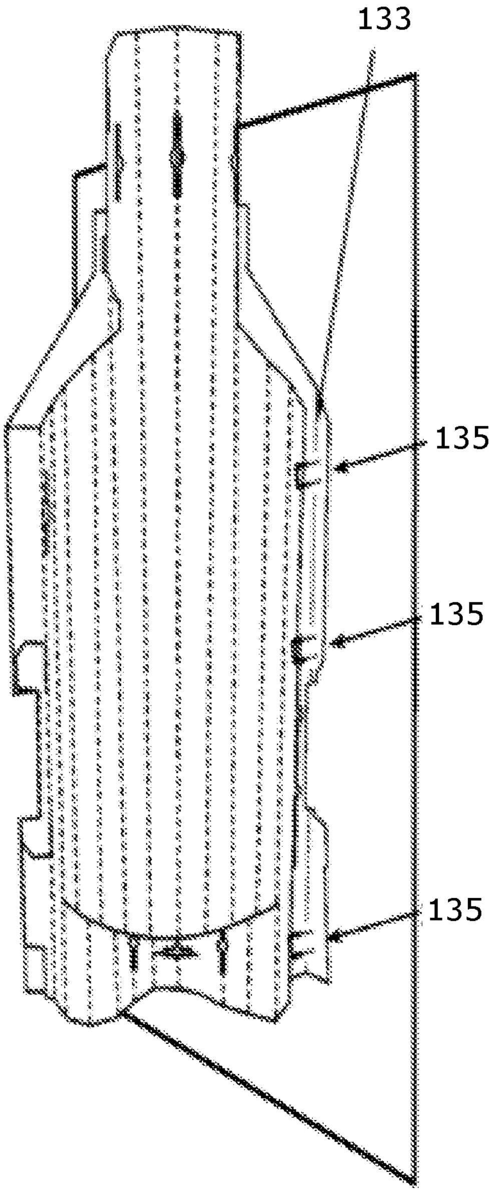
FIG. 14*d* is a front perspective view of a kinetic target that is partially configured for presentation while supported by a cardboard sheet.
Figure 14E:
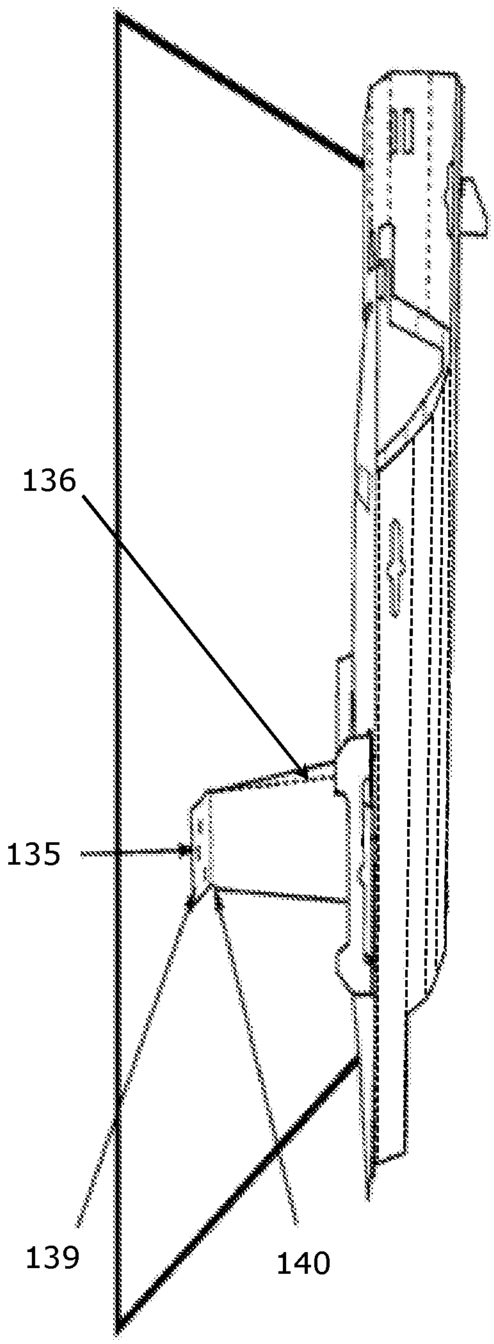
FIG. 14*e* is a side perspective view of a configured kinetic target configured for presentation while supported by a cardboard sheet.
Figure 14F:
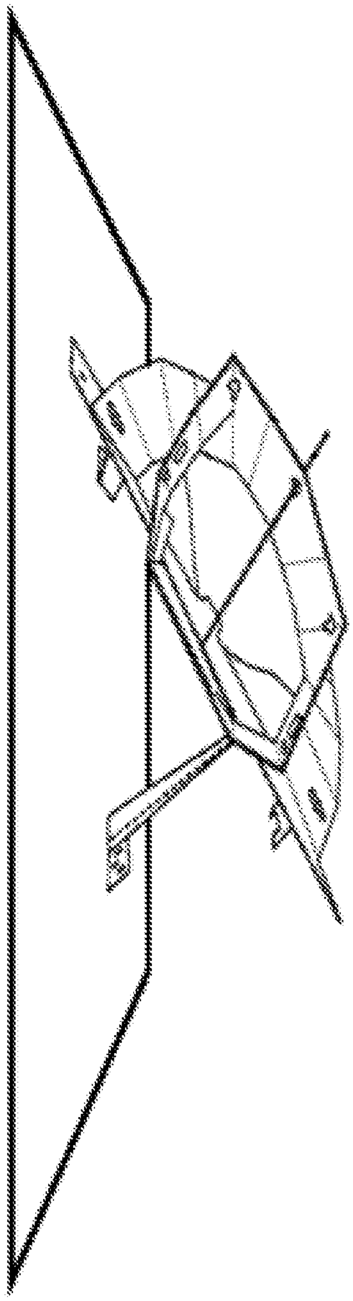
FIG. 14*f* is an overhead perspective view of a kinetic target configured for presentation while supported by a cardboard sheet.

In another method, illustrated in FIGS. 14*c*-14*f*, the kinetic target 1 is mounted at an angle relative to the cardboard sheet 125. Back body panel 8 has cut therein a horizontally positioned angle flap 134 with a fold line 136 to configure the flap in an "L" shape. See FIGS. 1*b* and 14*c* . The angle flap 134 is rectangular in shape and defined by a series of vertical cuts or perforations 137 and horizontal perforations or cuts 138. See FIG. 14*c*. Angle flap 134 can be offset from the vertical fold line 51 of the back body panel 8 or it can be centered. As seen in FIG. 14*c*, the flap 134 has been pulled away from the back body panel 8 along the vertical cut or perforation 137 near first torso joint 98 and along the horizontal cuts or perforations 138 by using the end opposite the vertical cut or perforation 137 near first torso joint 98 as a fold for a hinge instead of as a vertical cut or perforation 137. To facilitate this method, the side of the kinetic target 1 that has the vertical line 137 detached, in this embodiment the side closest to the first torso joint 98, is stapled or otherwise attached to the cardboard sheet 125. In this embodiment the exterior torso ridge 133 is fastened to the cardboard sheet 125 via a series of staples 135 along a vertical line to provide a vertex about which the target can be rotated, as seen in FIG. 14*d*. The angle flap is folded along the fold line 136 to create the "L" shape and thereby increase structural rigidity, creating a generally "L" shaped profile. See FIG. 14*c*. The side of the angle flap 134 that was pulled away from the back body panel 8 is then folded along a user specified fold line 140 to create a tab 139 which adjusts to a desired angle between the kinetic target 1 and the cardboard sheet about the vertex line defined with the staples 135. See FIGS. 14*e* and 14*f*. The tab 139, created by folding the angle tab 134 along the user specified fold line 140, is then stapled or attached to the cardboard sheet 125 such that the bottom edge 2 of the torso section retains a horizontal orientation. See FIGS. 14*d* -14 *e*.

The neutral or standard position is possible when the kinetic target 1 is used with a stand or is placed on top of a flat surface, as seen in FIG. 3. In order to increase the stability of kinetic target 1 when used with a stand or flat surface, stabilizers can be inserted into the pelvic subsection 22 along the lower-most portion of the torso section 16 of the assembled kinetic target 1. When the pelvic subsection 22 is interlocked with the tabs 20 and 120 and slot 119 a set of base loops 64 are created. See FIGS. 15*a* and 15*b*. The base loops 64 act as the base for the kinetic target 1 when placed on a surface. In one embodiment, the base loops 64 act as a weighted base and are sized to frictionally lock in standard diameter water bottles, 62 mm (2.45 in), in place as stabilizers 65. The water bottles or stabilizers can be inserted in base loops 64 by aligning the water bottles with base loops 64 and pressing the kinetic target 1 down to frictionally insert the stabilizers. See FIG. 15*b*. The base loops 64 have the ability to elastically deform and larger objects, e.g., of diameters ranging from 50.8 mm to 127 mm (2 inches to 5 inches), can be used as stabilizers 65. The use of water bottles, or any liquid containers, as the stabilizers 65 has the added benefit of indicating a positive hit in the pelvic region, i.e., by the leaking of liquid on to the cardboard of the kinetic target 1.

The kinetic target 1 can be used to realistically simulate the location of human organs, during firearm training by the use of the vital organ analogs 122 or a targeting insert 46. See FIGS. 16*a* and 16*b*. In embodiments where the kinetic target 1 has the vital organ analogs 122 formed as perforations in the back body panel 8, the end user does not need a separate and additional targeting insert 46 in order to immediately use the kinetic target 1 or to trace bullet paths through the kinetic target 1 and into vital organ locations. The useful life of the kinetic target 1 can be increased because design features incorporated in the back body panel 8 enable replacement of vital organ analogs between uses. In one embodiment, the back body panel 8 includes a multi-purpose rectangular flap 47 providing access to the torso cavity. See FIG. 16*a*. Rectangular flap 47 is made by cutting a horizontal segment 50 and two vertical segments 70 to create an elongate flap in the back panel 8. A second lower flap 132 is located below rectangular flap 47 to facilitate use of a three-dimensional organ analog or a balloon insertion for drop target usage described below. To provide the options of both flaps 47 and 132, the vertical cuts or perforations 70 extend from the horizontal fold line or perforations 52 to horizontal fold line or perforations 126. The rectangular flap 47 can be folded toward the interior of kinetic target 1, along fold line 52. See FIG. 16*a*. To use flap 47 with a conventional targeting insert 46, beginning at the horizontal cut or perforation 50, the flap 47 is pushed toward from the back body panel 8 and folded along horizontal fold line or perforation 52, separating perforation 50 and the two vertical segments 70 away from the back body panel 8. See FIG. 16*a*. The rectangular flap 47 can be folded toward the interior of kinetic target 1, along fold line 52. See, again, FIG. 16*a*. In this embodiment the horizontal segment 50 is at least 30.48 cm (12 inches) in length. The targeting insert 46 can be inserted into the kinetic target 1 via the opening created by the rectangular flap 47. See FIG. 16*c*. Once fully inserted within the opening created by folding rectangular flap 47 about the targeting slot fold 52, the targeting insert 46 may rest on the base loops 64. If stabilizers 65 are used, the targeting insert 46 may be inserted in-between the back body panel 8 and the stabilizers 65. See FIG. 15. When resting on the base loops 64 a portion of the targeting insert 46 will be left protruding in the space created by the folding in of the rectangular flap 47, this facilitating removal and replacement of the targeting insert 46. The targeting insert 46 can be replaced to provide a clean target without the need for replacing the kinetic target 1.

Figure 15A:
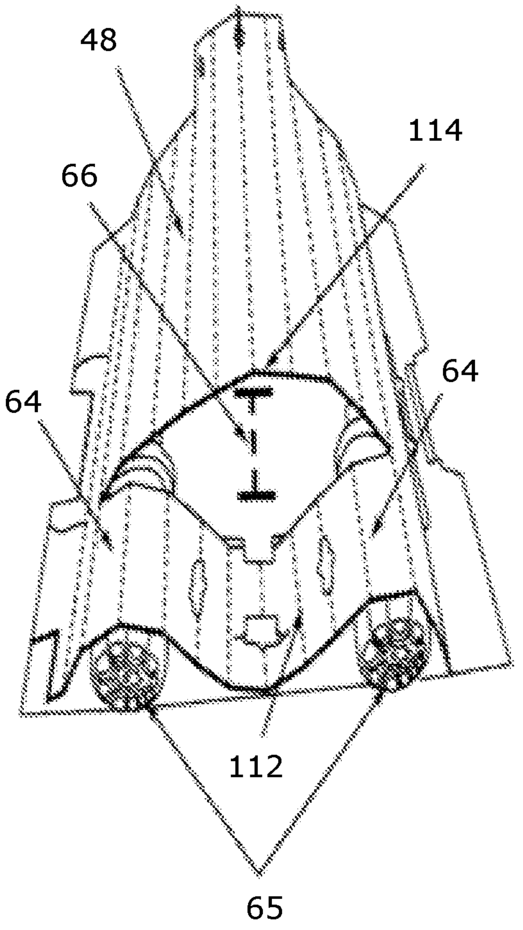
FIG. 15*a* is a perspective view of the pelvic subsection of a fully configured kinetic target fitted with stabilizers.
Figure 15B:
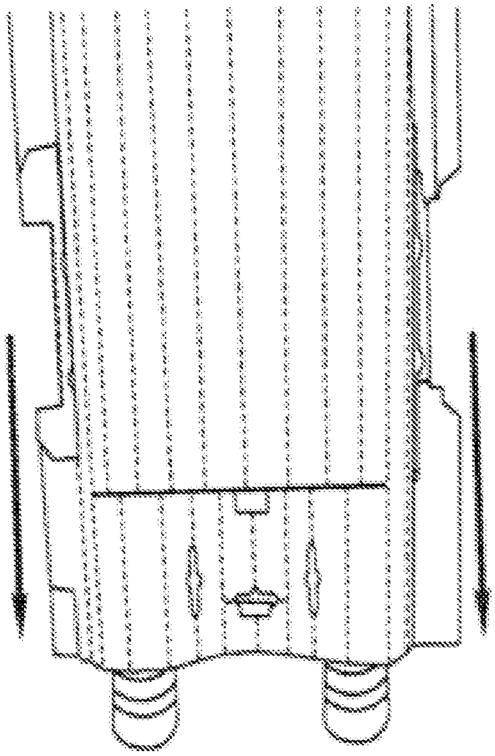
FIG. 15*b* is another perspective view of the pelvic subsection of a fully configured kinetic target fitted with the stabilizers seen in FIG. 15*a*.
Figure 16A:
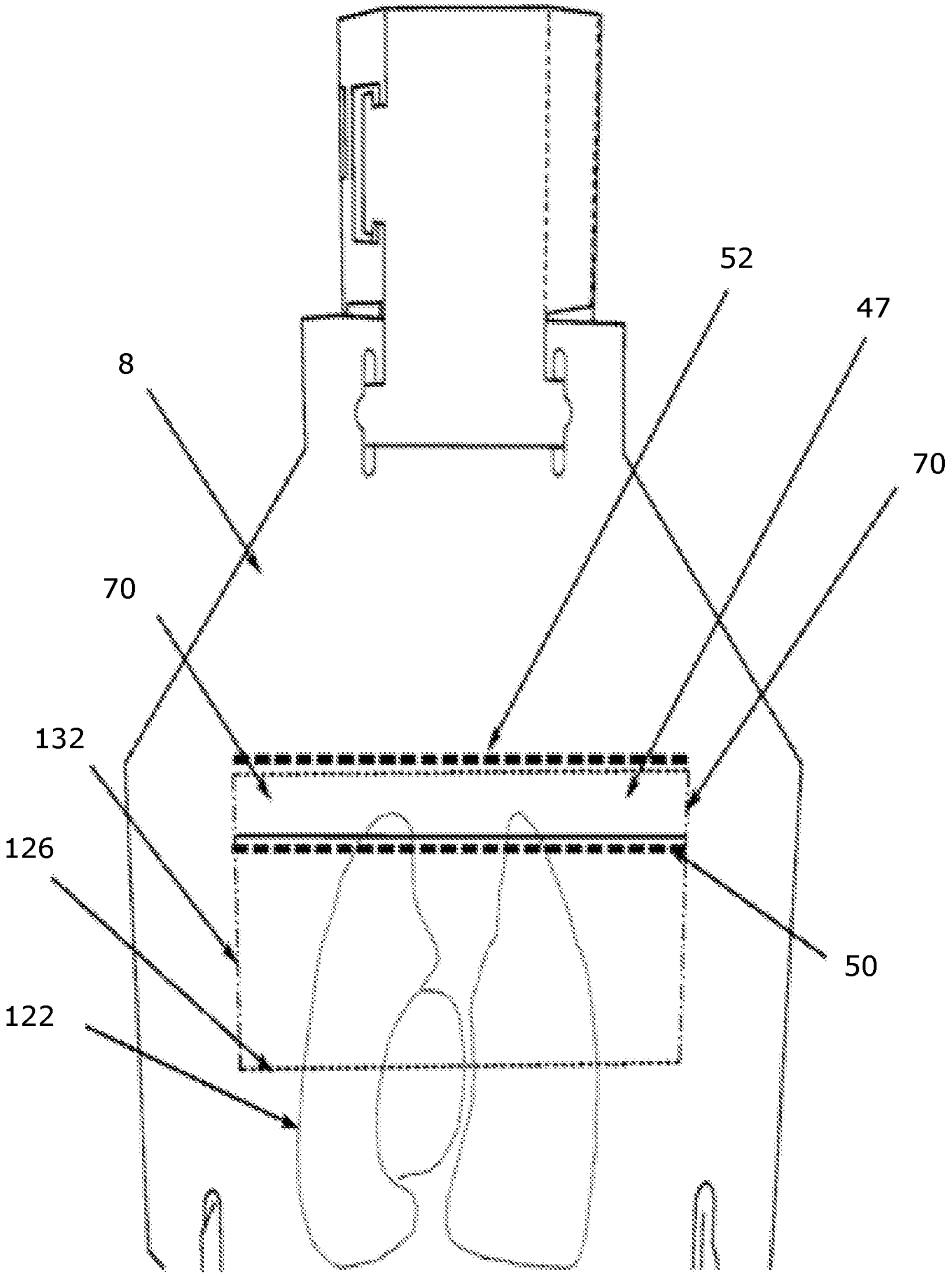
FIG. 16*a* is an enlarged rear elevation view of a configured kinetic target.

As seen in FIG. 15*a*, the simulated torso 48 is created by the arc-like contour 48 along the front panel 5 created when the target is configured, as described above. The contour 48 of simulated torso section 16 has an apex 114 located at the center of the assembled kinetic target 1 which, in the example embodiment, is the location of maximum width of the simulated torso section 16, i.e., the torso width 66 at apex 114. For the exemplary embodiment, the torso width at apex 66 is at least 10.16 cm (4 inches) but can easily extend up to at least 5 inches (12.7 cm).

Conventional targets are flat sheets of paper or cardboard with a bull's eye or human silhouette printed on them. When shot or hit by bullets a conventional target can only result in a single entry/exit point, or reference, for each shot, located at the two-dimensional representation that is printed on the conventional target. The kinetic target 1 enables two points of reference per shot, e.g. a point of entry and a point of exit, with the shot separately striking the simulated torso in the contour 48 and in the back body panel 8. This may, for example, be effected by a projectile passing through the simulated torso section 16 and continuing on a trajectory, creating a second reference. The projectile may create a third reference when it passes through the targeting insert 46, before exiting through the back body panel 8.

Figure 16B:
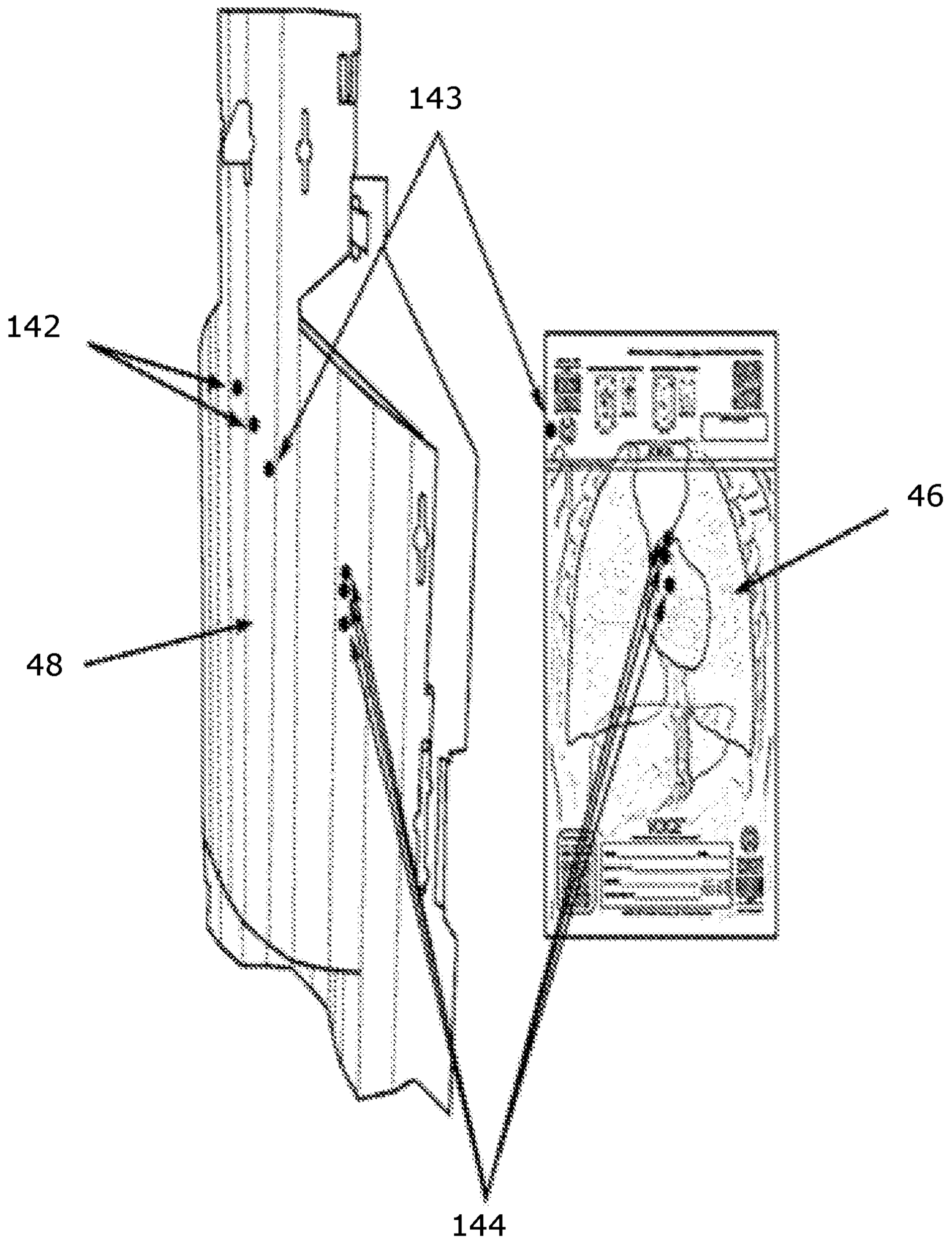
FIG. 16*b* is a side elevation view of a fully configured kinetic target placed along side a target card insertable within the kinetic target.
Figure 16C:
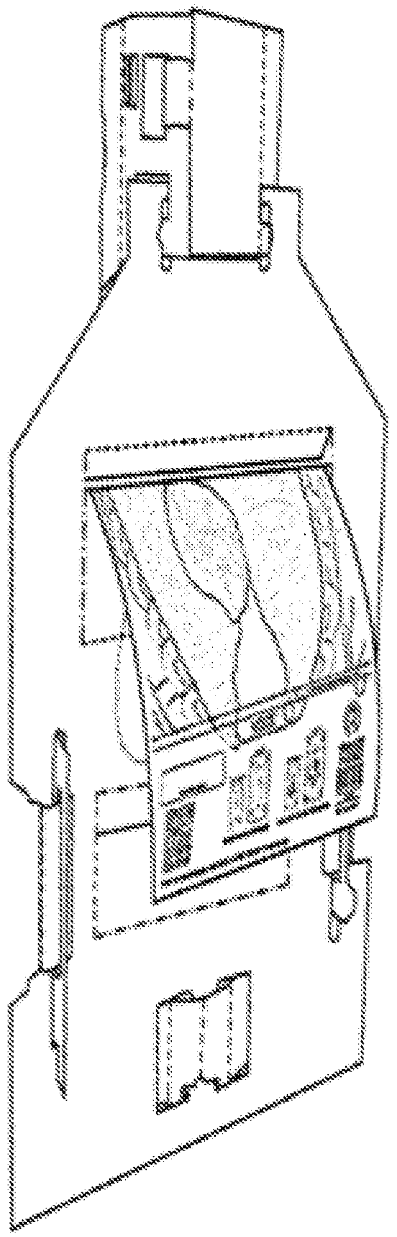
FIG. 16*c* is a rear elevation view of a kinetic target showing the target card partially inserted within a slot of the kinetic target during installation.

By way of example, bullets that enter the traditional "center of mass", such as the bullet paths 142 seen in FIG. 16*b*, will not necessarily hit or "register" a hit on the targeting insert 46 or vital organ analogs 122. Some "center of mass" bullet paths, like bullet path 143 can enter via the "center of mass" of the simulated torso 48 but only marginally hit the outer edges of the targeting insert 46, See, again, FIG. 16*b*. The kinetic target 1 allows for shots that follow a path through the "center of exposure," to "register" on the targeting insert 46. As seen in FIG. 16*b*, shots 144 enter on the right side of the kinetic target 1 and continue through to the "center of mass" of the targeting insert 46 as perfect vital organ hits.

Figure 17A:
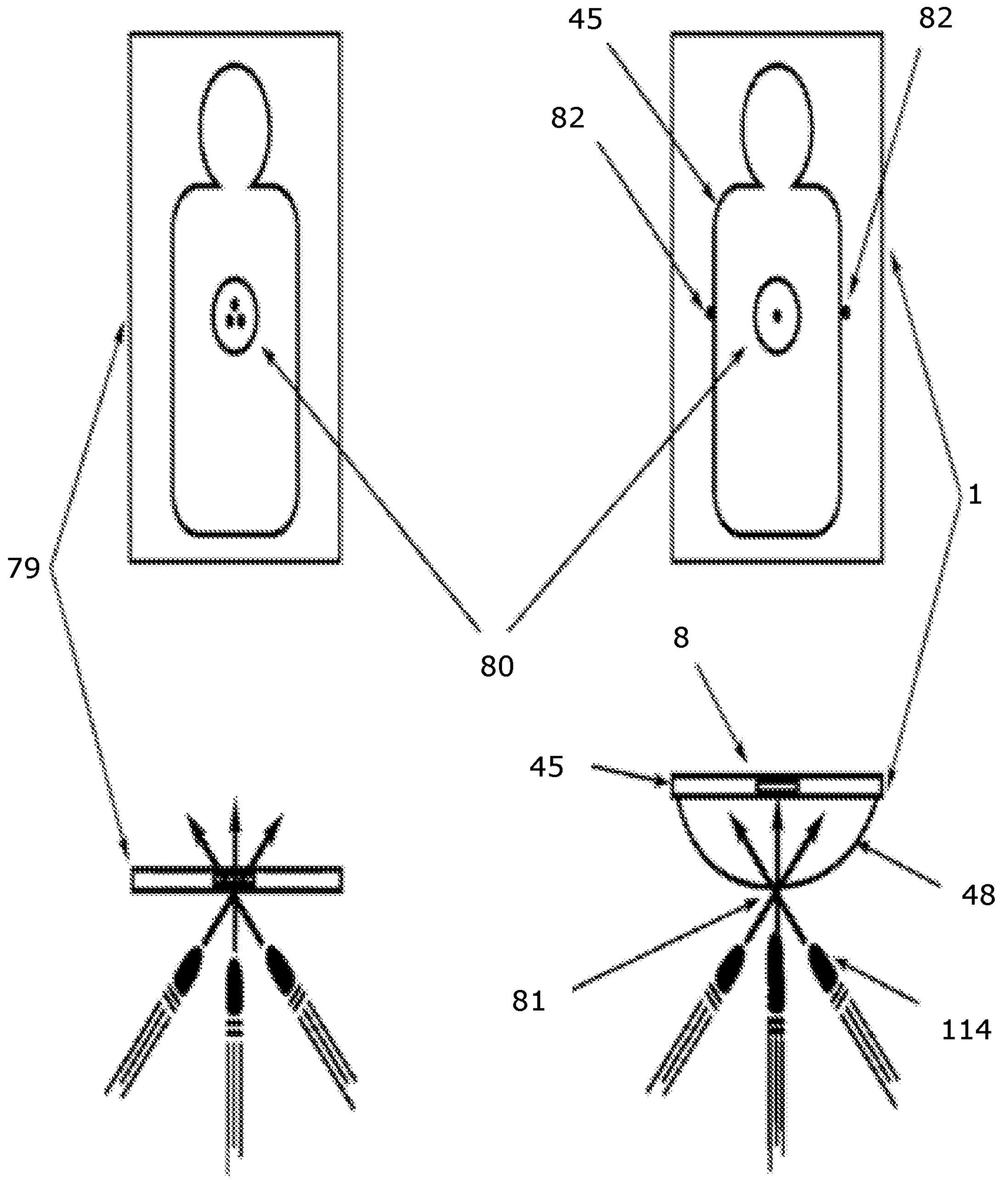
FIG. 17*a* is a side-by-side presentation of a 2-dimensional representation of a conventional target (left) and the kinetic target (right) in upright standard orientation as viewed from the front and from above.
Figure 17B:
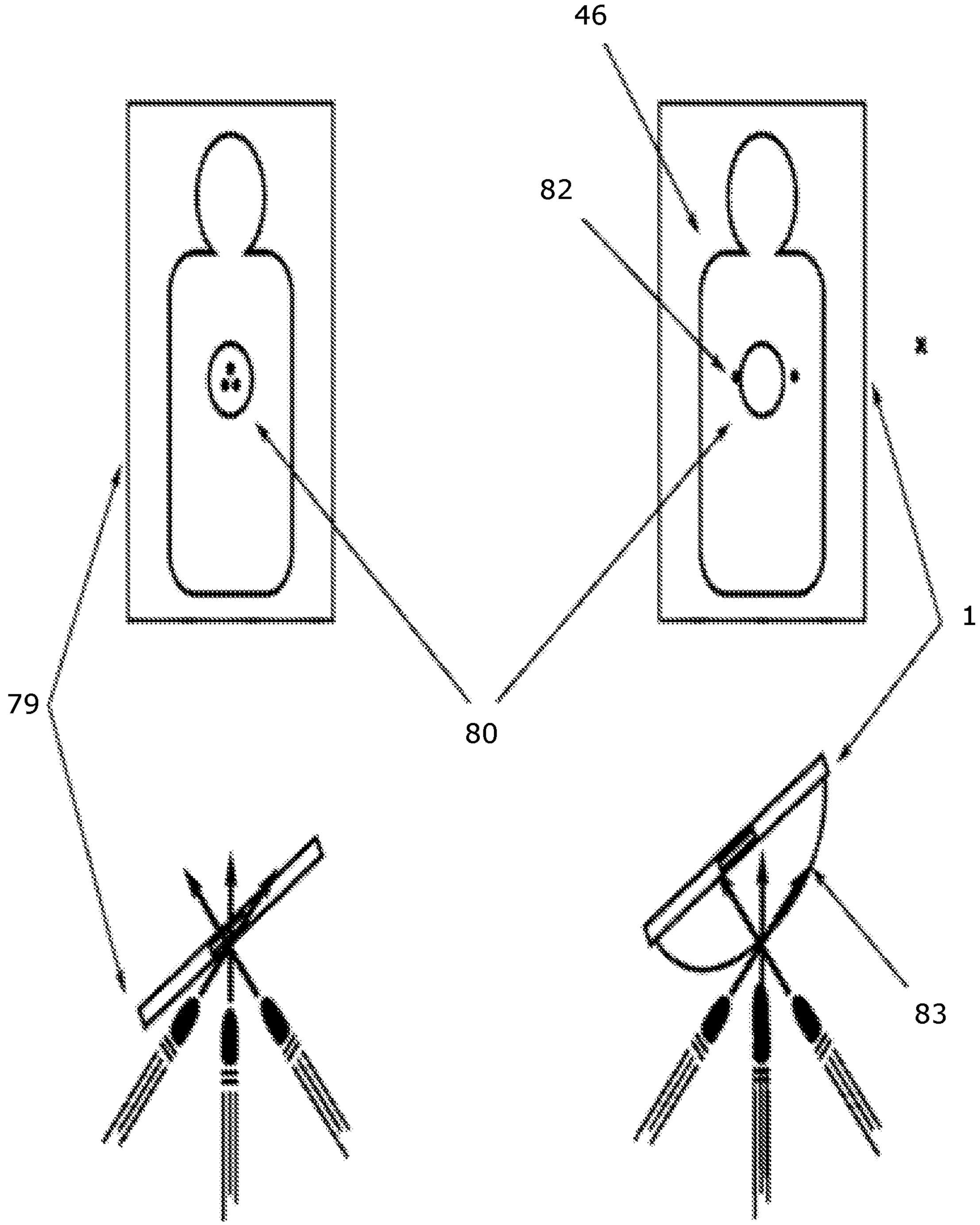
FIG. 17*b* is another is a side-by-side presentation of a 2-dimensional representation of a conventional target (left) and the kinetic target (right) in an orientation rotated counter-clockwise relative to the standard orientation of FIG. 17*a* as viewed from the front and from above.

The kinetic target 1 has the ability to simulate a bullet path through a human torso. As seen in FIG. 17*a*, a conventional target 79 or silhouette has three bullet holes in what is commonly referred to as the "center of mass" 80 of a human target. When the conventional target 79 is viewed in the front or standard view, the three bullet holes appear to have the same trajectory and are located within the center of mass 80. When the conventional target 79 is observed from the over-head view, the three bullet paths 81 all appear to have different origination points and subsequent trajectories. When the same bullet paths 81 are seen to impact the apex 114 of the kinetic target 1, the trajectories taken through the kinetic target 1 are substantially different than what is preserved from conventional target 79. Only the perpendicular bullet hit the center of mass 80 on the targeting insert 46 located against the back body panel 8 of the kinetic insert 1, even though all three bullets entered the apex 114 of the simulated torso 48 at the equivalent of the center of mass 80 of a conventional target 79. The other two bullet paths hit non-vital organ locations 82. A person undergoing firearm training with a conventional target 79 could incorrectly conclude that injuries resulting at the non-vital organ 82 locations 82 would/could incapacitate a human target. The inability of a conventional target 79 to simulate a bullet path through a torso is further illustrated in the example seen in FIG. 17*b* . In FIG. 17*b* , the targets have been rotated 45° to simulate a situation where a target would not be directly facing a person undergoing firearm training. Again, what appear to be three incapacitating vital organ hits on the center of mass 80 of a conventional target 79, turn out to be strikes at non-vital organ locations 82, i.e., one center of mass 80 hit and a grazing shot 83.

Figure 18:
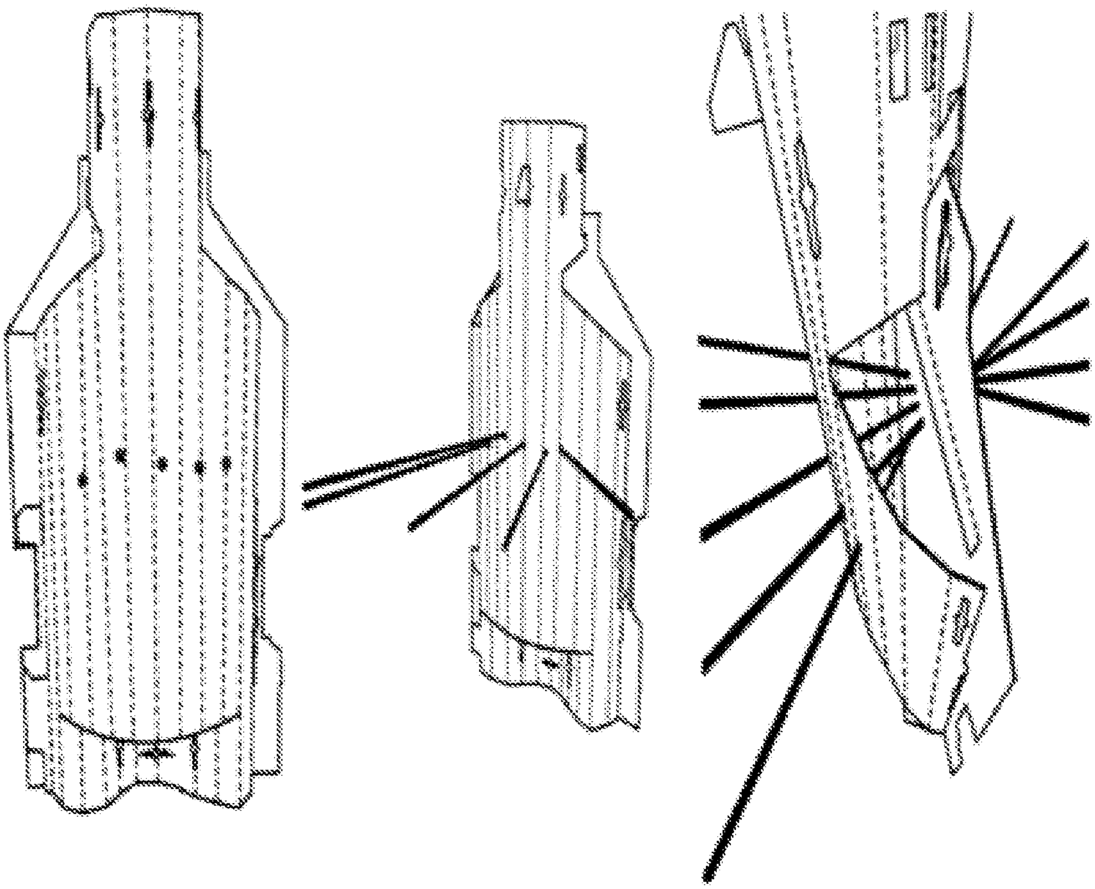
FIG. 18 shows several views of a fully configured kinetic target used to trace a trajectory using insertable rods.

The kinetic target 1 allows for the analysis of the trajectories of the bullets that have passed through the simulated torso 48, targeting insert 46 and back body panel 8. After shooting has been completed or paused, rods (represented by sold black cylinders) can be inserted into the bullet holes on the simulated torso 48, pass through the kinetic target 1 and out the second bullet hole (made by the same bullet) in the targeting insert 46/back body panel 8. See FIG. 18. In this manner the directional path of the bullet through the kinetic target 1 can be determined. The effectiveness of a bullet can be determined by bullet path analysis. For example, what would not be considered a center of mass hit 80 on a conventional target 79 could continue through a kinetic target 1 and impact a vital organ on the targeting insert 46.

Figure 19A:
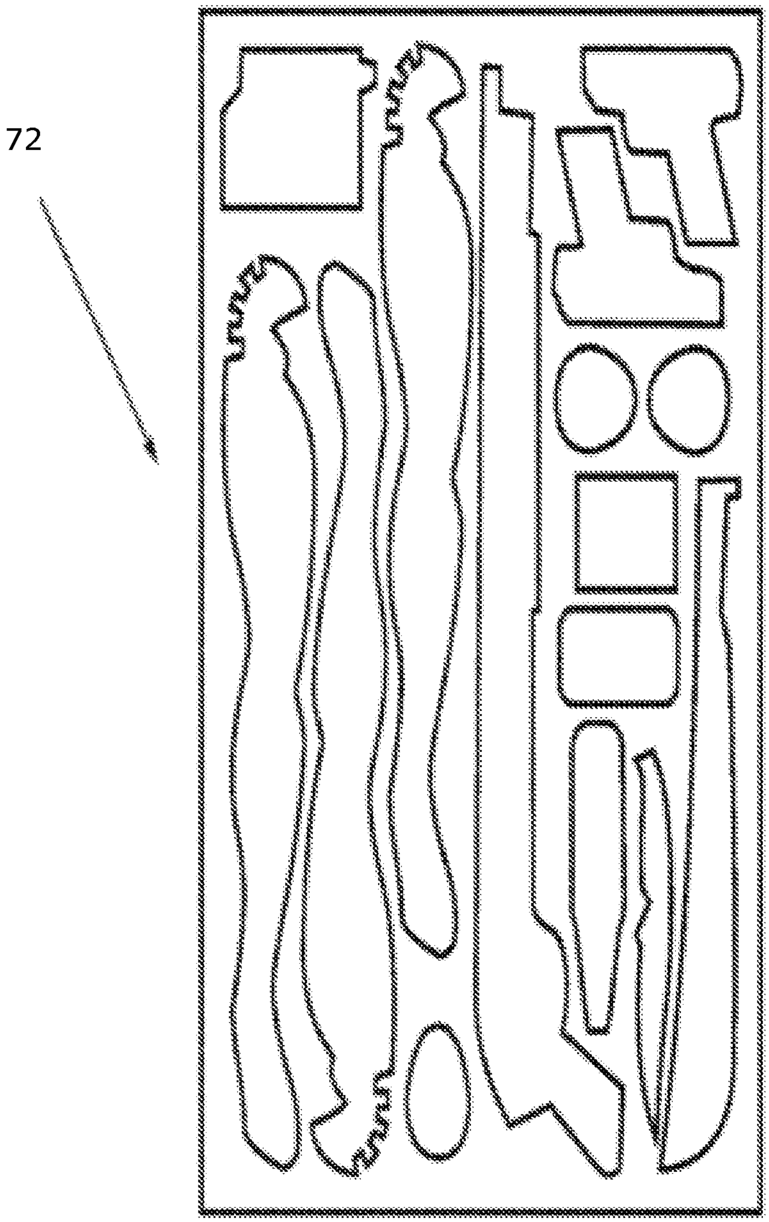
FIG. 19*a* is an elevation view of an accessory board for use with embodiments of the kinetic target.
Figure 20:
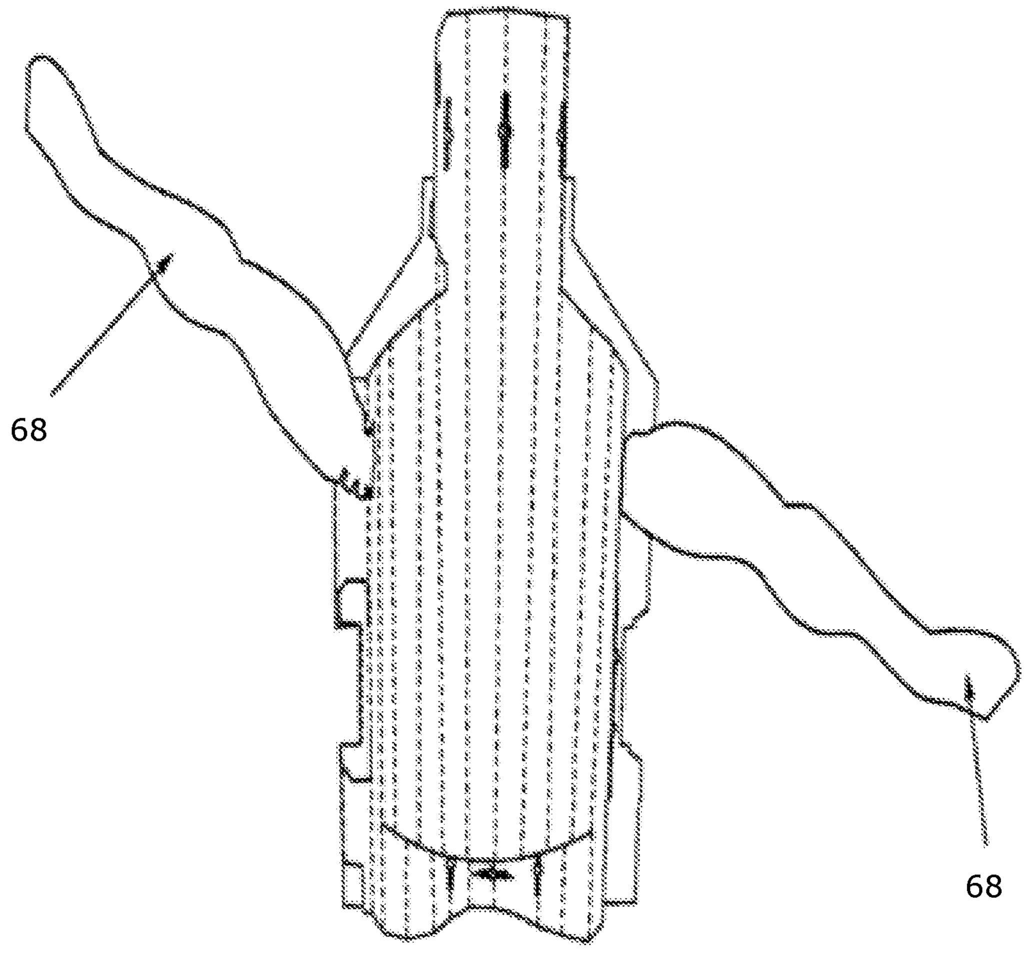
FIG. 20 is another elevation view of the kinetic target with simulated arms installed.
Figure 21:
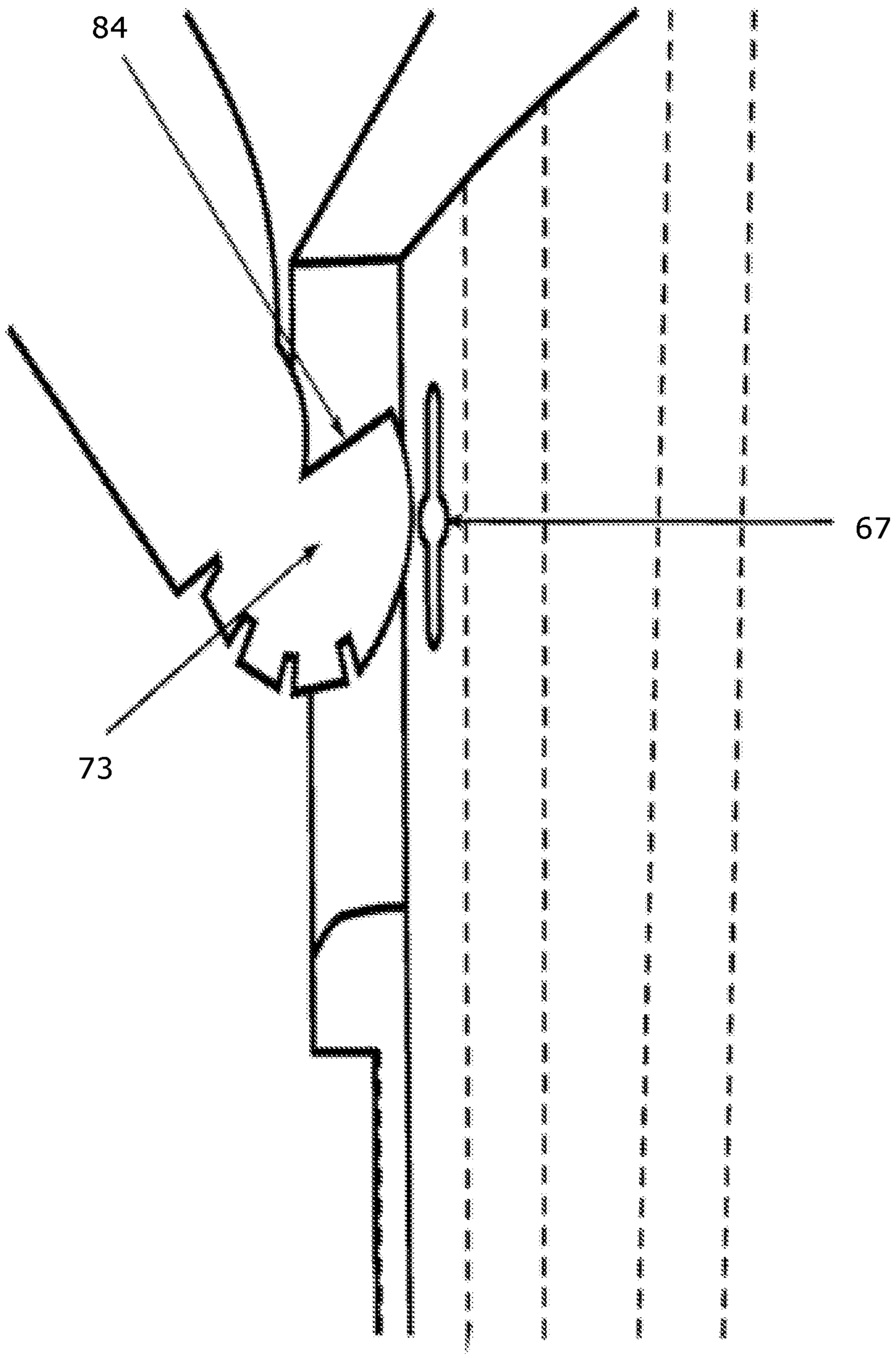
FIG. 21 is a partial perspective view of the kinetic target in the process of installing a simulated arm.
Figures 22A, 22B, 22C, 22D:
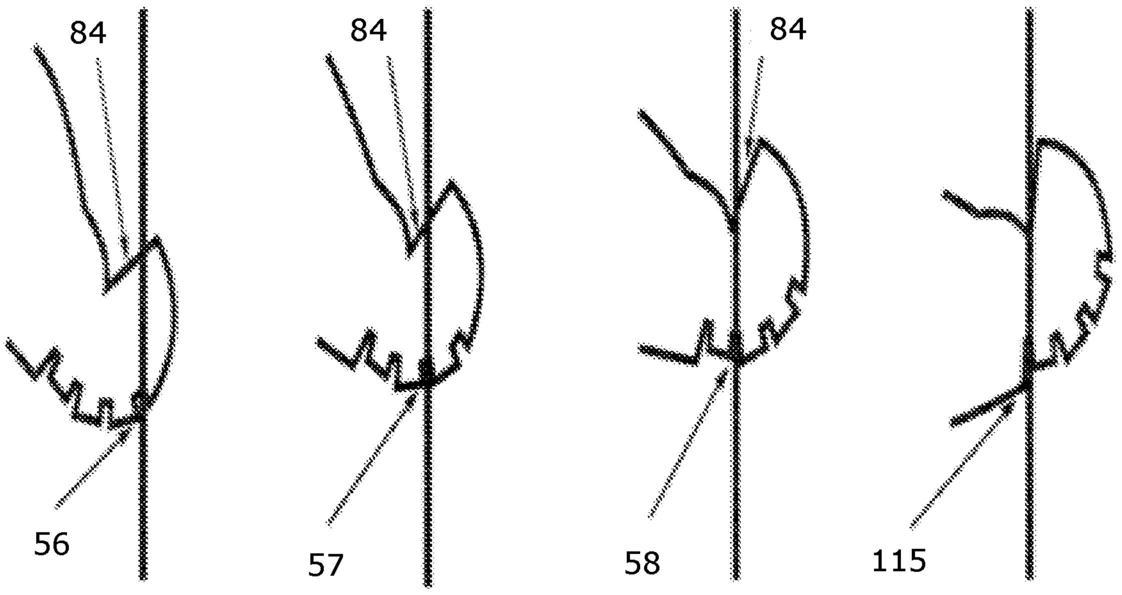
FIG. 22*a* is a partial view of the kinetic target showing a thumbs up simulated arm in the raised configuration.
FIG. 22*b* is a partial view of the kinetic target showing a thumbs up simulated arm in a horizontal configuration.
FIG. 22*c* is a partial view of the kinetic target showing a thumbs up simulated arm in a relaxed configuration.
FIG. 22*d* is a partial view of the kinetic target showing a thumbs up simulated arm in a lowered configuration.
Figures 22E, 22F, 22G, 22H:
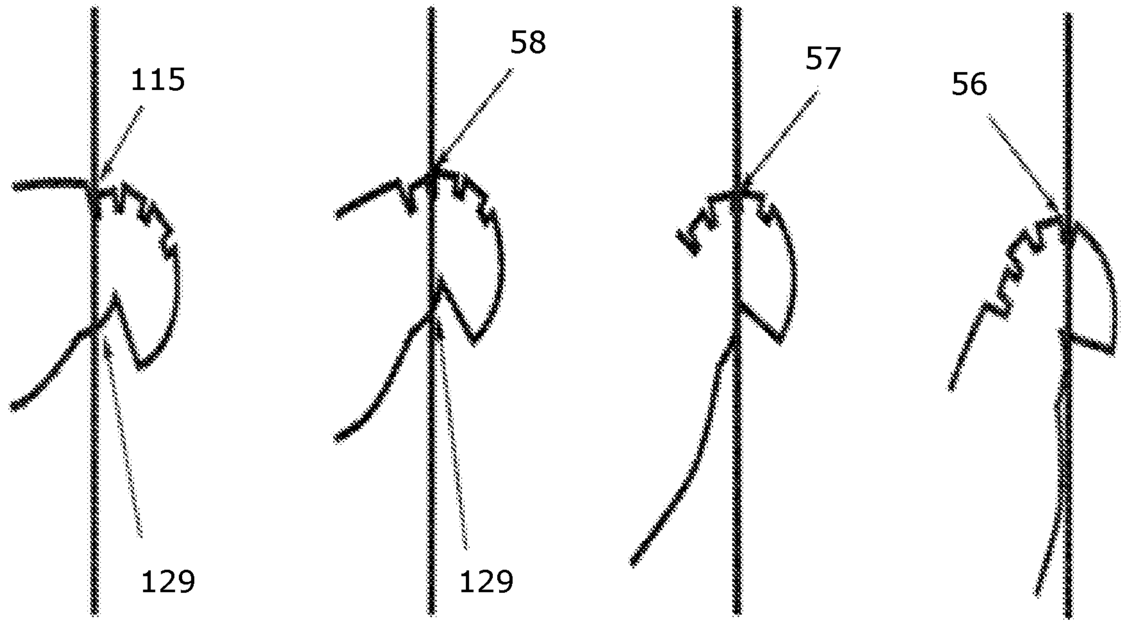
FIG. 22*e* is a partial view of the kinetic target showing a thumbs down simulated arm in a lowered configuration.
FIG. 22*f* is a partial view of the kinetic target showing a thumbs down simulated arm in a relaxed configuration.
FIG. 22*g* is a partial view of the kinetic target showing a thumbs down simulated arm in a horizontal configuration.
FIG. 22*h* is a partial view of the kinetic target showing a thumbs down simulated arm in the raised configuration.

Embodiments of the kinetic target 1 include arm emulations of a human target. See FIG. 20. The front panel 5 has a pair of rotator cuff slots 67, symmetrically spaced about central line 36. See FIG. 1*d*. In one embodiment, arm simulations 68 are precut or perforated pieces of cardboard contained in an accessory board 72. See FIG. 19*a*. Each arm emulation 68 comprises a shoulder emulation 73 that includes multiple positioning slots 55 e.g., inner arm 129, a fist 128 and a thumb 130. See FIG. 19*b*. The simulated shoulder 73 is substantially shaped like a semi-circle 85 with a support ledge 84 defining the free end of the semi-circle 85. See FIG. 19*b*. The support ledge 84 of the simulated shoulder 73 of the simulated arm 68 is inserted into the rotator cuff slot 67 of simulated torso 48. See FIG. 21. Exemplary renderings of the positioning slots 55 interlocked within the rotator cuff slot 67 can be seen in FIGS. 22*a-h*.

Figure 19B:
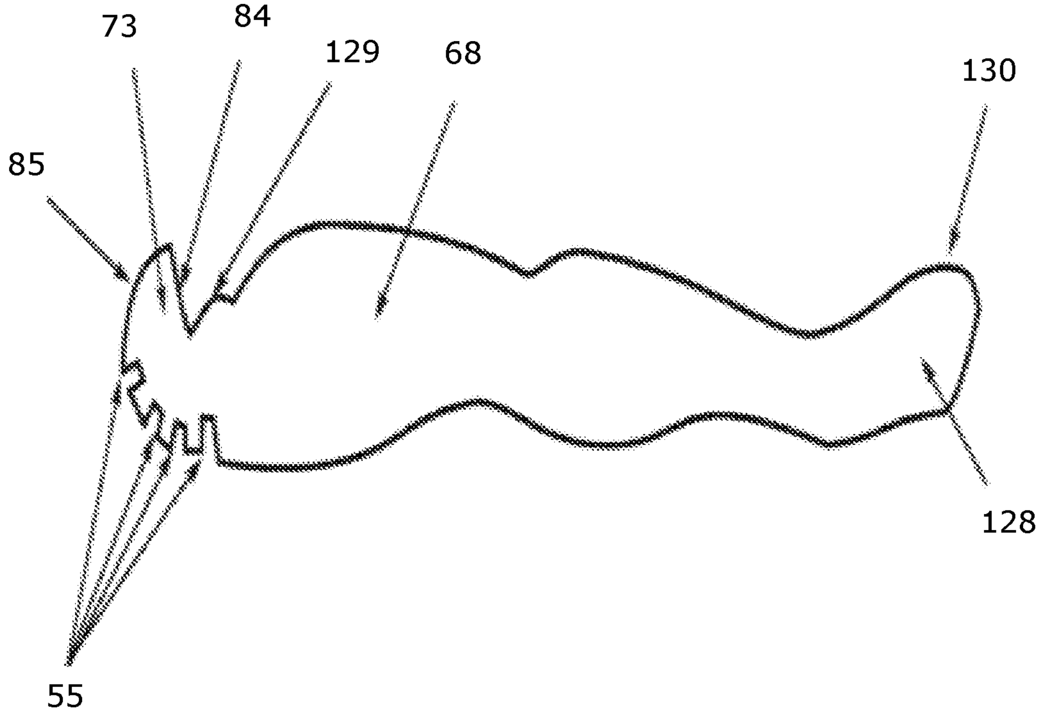
FIG. 19*b* is a view of a simulated arm for use with embodiments of the kinetic target.
Figure 23:
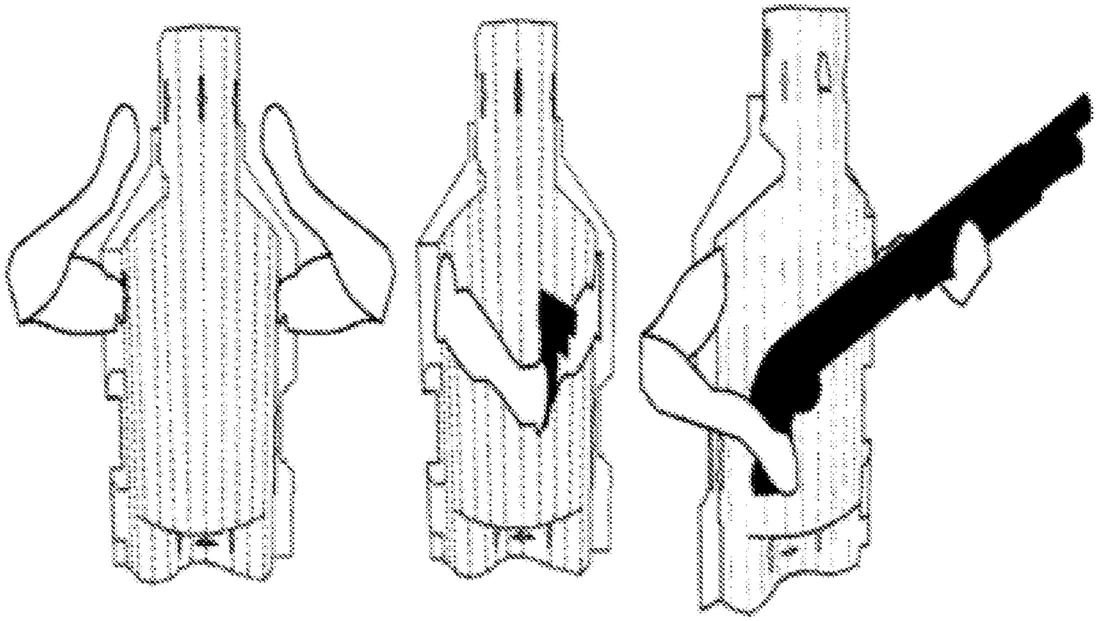
FIG. 23 provides an elevation view of the kinetic target in standard orientation with simulated arms installed incorporating accessories.

FIGS. 22*a*-22*d* depict the simulated arm 68 in the thumbs up position. That is, the thumb 130 of the fist 128 is positioned as seen in FIG. 19*b*. When the raised position slot 56 of the simulated shoulder 73 is interlocked with the bottom of the rotator cuff slot 67 the support ledge 84 is in positive contact with upper portion of the rotator cuff slot 67. See FIG. 22*a*. When the horizontal position slot 57 of the simulated shoulder 73 is interlocked with the bottom of the rotator cuff slot 67 the support ledge 84 is in positive contact with upper portion of the rotator cuff slot 67. See FIG. 22*b*. When the relaxed position slot 58 of the simulated shoulder 73 is interlocked with the bottom of the rotator cuff slot 67 the support ledge 84 is in positive contact with upper portion of the rotator cuff slot 67. See FIG. 22*c*. When the lowered position slot 115 of the simulated shoulder 73 is interlocked with the bottom of the rotator cuff slot 67 the support ledge 84 is in positive contact with the inside of the simulated torso 48 of the front panel 5. See FIG. 22*d*. The arm simulations 68 can be bent or shaped to simulate various actions by a human target. Some of the simulated actions include, but are not limited to, raising arms in surrender, holding a pistol, and holding a shot gun. See FIG. 23. The accessories seen in FIG. 23 can be included in the accessory board 72 as precut or perforated pop outs.

FIGS. 22*e*-22*h* depict the simulated arm 68 in the thumbs down position. That is, the thumb 130 of the fist 128 is positioned in the mirror image to what is seen in FIG. 19*b*. When the lowered position slot 115 of the simulated shoulder 73 is interlocked with the top of the rotator cuff slot 67 the inner shoulder 129 is in positive contact with the lower portion of rotator cuff slot 67. See FIG. 22*e*. When the relaxed position slot 58 of the simulated shoulder 73 is interlocked with the top of the rotator cuff slot 67, the inner shoulder 129 is in positive contact with lower portion of the rotator cuff slot 67. See FIG. 22*f*. When the horizontal position slot 57 of the simulated shoulder 73 is interlocked with the top of the rotator cuff slot 67, the inner shoulder 129 is in positive contact with the outside of simulated torso 48. See FIG. 22*g*. When the raised position slot 56 of the simulated shoulder 73 is interlocked with the top of the rotator cuff slot 67, the inner shoulder 129 is in positive contact with the outside of simulated torso 48. See FIG. 22*h*.

Figure 24A:
FIG. 24*a* depicts an attired kinetic target in standard orientation.
Figure 24B:
FIG. 24*b* depicts an attired kinetic target in standard orientation with headgear.
Figure 25A:
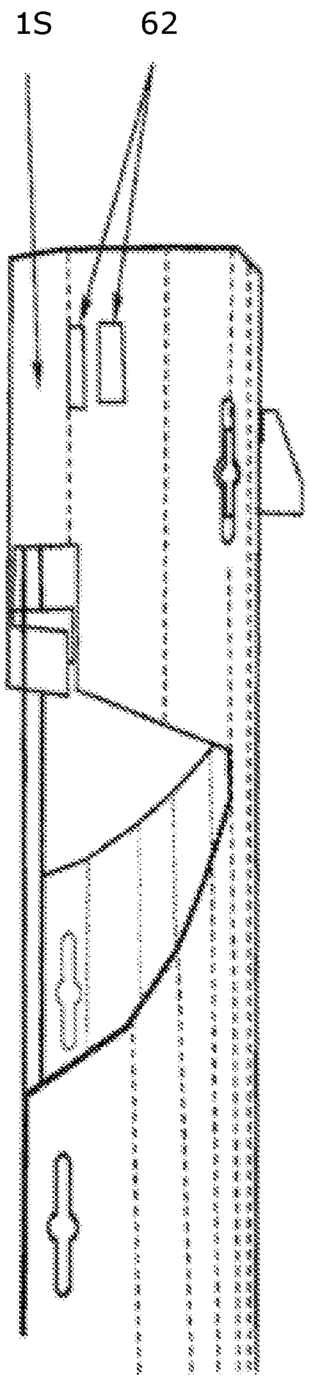
FIG. 25*a* is an enlarged side perspective view of the head section of the kinetic target.
Figure 25B:
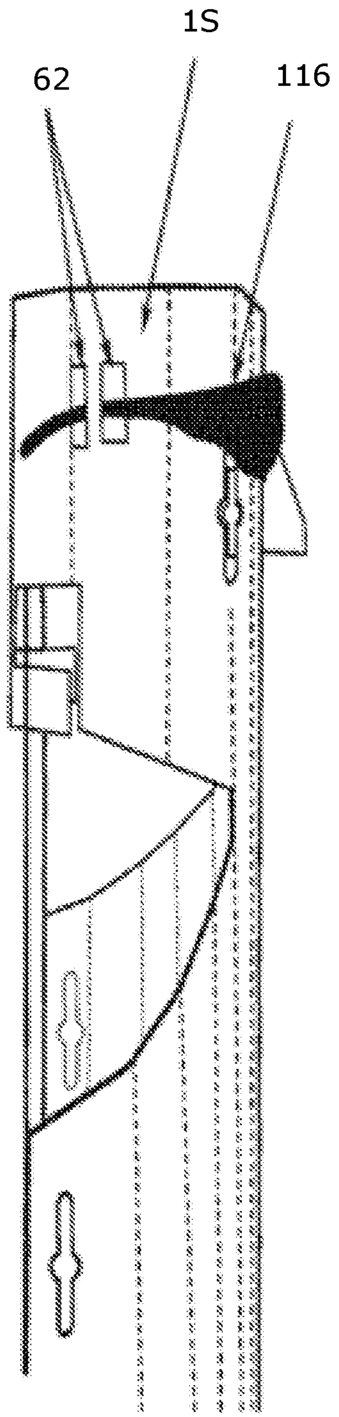
FIG. 25*b* is an enlarged side perspective view of the head section of a kinetic target with glasses installed.
Figure 25C:
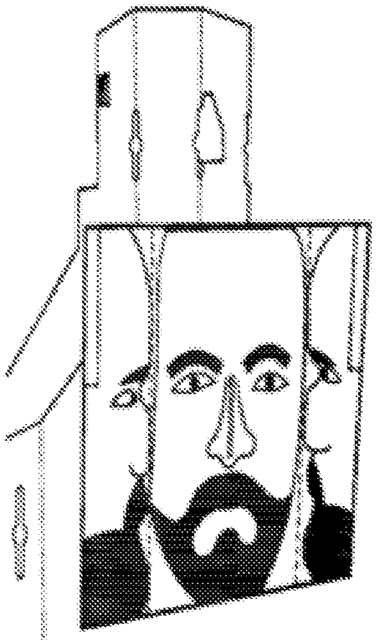
FIGS. 25*c*-25*e* are partial perspective views of a kinetic target illustrating usage of a mask over the contoured portion of a head subsection.
Figure 25D:
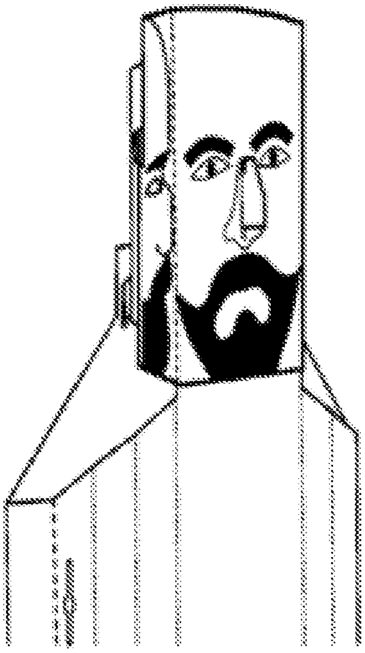
Figure 25E:
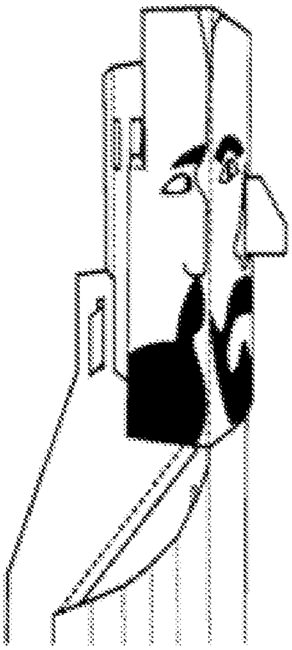

The kinetic target 1 has a three-dimensional aspect that is provided by the simulated torso 48 and head section 15. See FIG. 3. The kinetic target 1 can also be dressed to further increase the realistic appearance of the target during firearm training. See FIG. 24*a*. The kinetic target 1 can be dressed in a shirt with or without the use of the arm simulations 68. See FIGS. 24*a* and 24*b*. The head section 15 has a set of temple slots 62 that are used for hanging the kinetic target 1 via a cord. The temple slots 62 can be a single slot per side of the head section 15 or a set of at least 2 slots that allow for the insertion and locking of the stem of a set of eyewear 116, which then rest on the nose anchor 49. See FIGS. 25*a* and 25*b*. The head section 15 may also be fitted with a headdress or hat, as seen in FIG. 24 *b*.

Figure 26A:
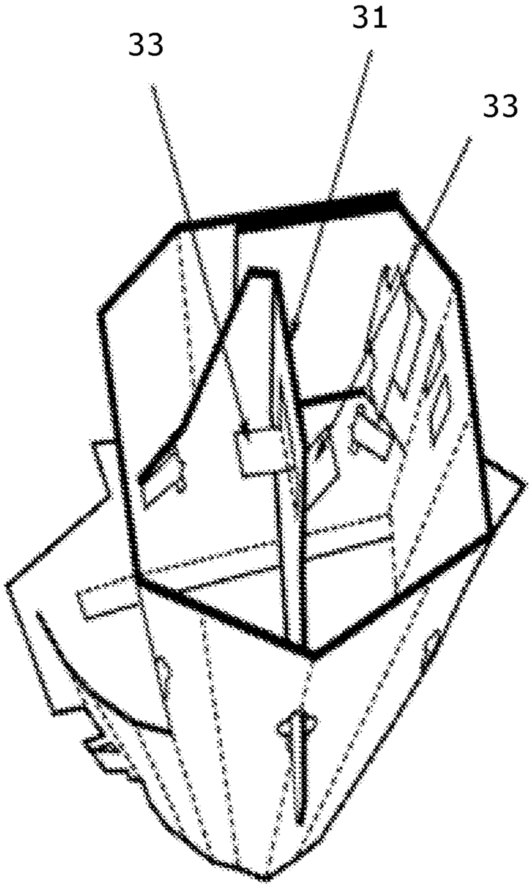
FIG. 26*a* is an enlarged front perspective view of the head section of the kinetic target without cups installed therein.
Figure 26B:
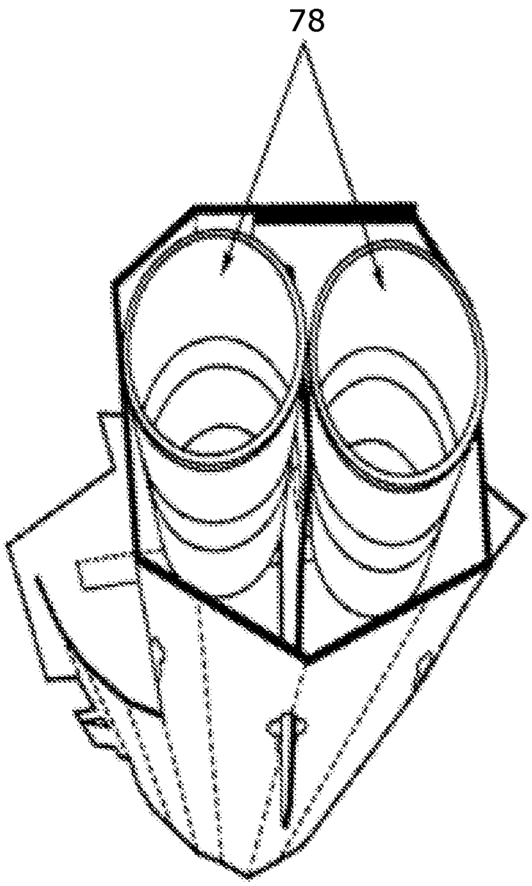
FIG. 26*b* is an enlarged rear perspective view of the head section of the kinetic target with cups installed therein.

The kinetic target 1 has ability to increase the reactive effect of a simulated central nervous system wound. This is accomplished in a manner similar to the pelvis shot water indication discussed above. The internal portion of the head section 15 is divisible in half when in the standard orientation by the orientation flap 31 when inserted in orientation slot 59 as shown in FIG. 9. The empty spaces on either side of the orientation flap 31 are sized to frictionally lock a 16-ounce disposable cup 78. See FIG. 26*b*. The 16-ounce cups 78 can be filled with water or any suitable liquid to saturate the head section 15 or any part of the kinetic target 1 when shot, to indicate a central nervous system hit during firearm training. The pass through tabs 33 can be folded to opposite sides of the orientation flap 31 to serve as ledges for any appropriately sized container used to hold a liquid or powder as a positive shot indicator. See FIG. 26*a*.

Figure 27A:
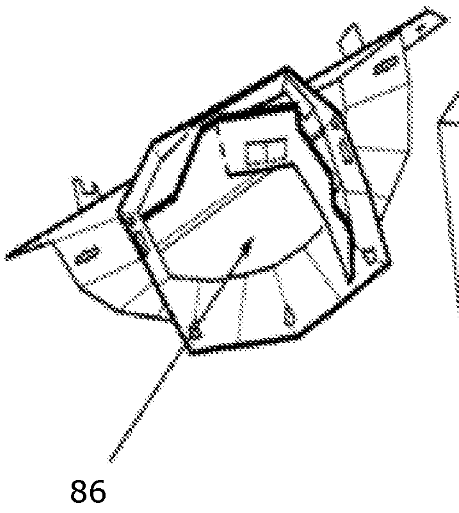
FIG. 27*a* is an overhead perspective view of the head section of the kinetic target configured for use as a drop target.
Figure 27B:
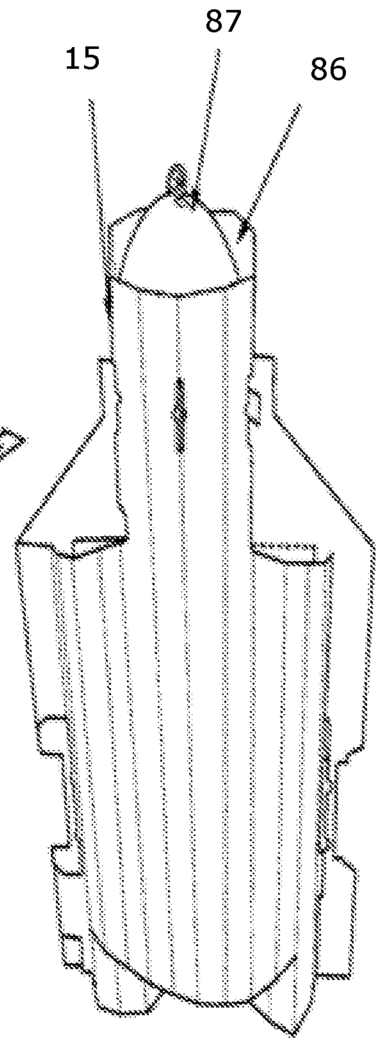
FIG. 27*b* is a front perspective view of the head section of the kinetic target configured for use as a drop target.
Figure 27C:
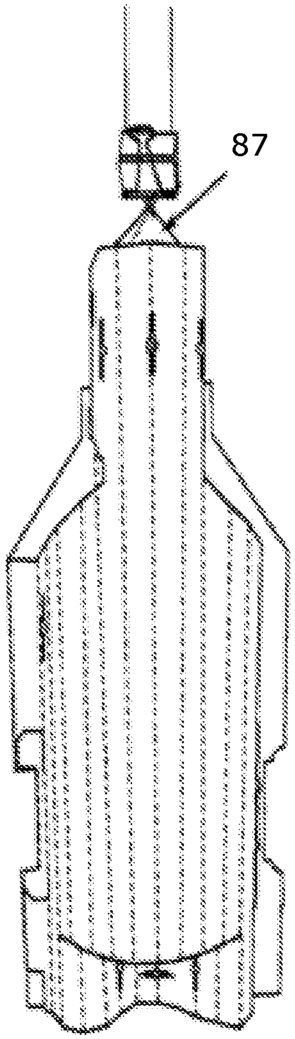
FIG. 27*c* is a front perspective view of the head section of the kinetic target configured for use as a drop target with a clip system.

The kinetic target 1 can also be used as a “drop” target. In the firearm training field, a “drop” target is a target that falls or collapses after being hit by a bullet. The kinetic target 1 has the ability to “drop” from various configurations. In one embodiment, the head section 15 is assembled without inserting the nose anchor 49 into any of the orientation slots on the head section 15. See FIGS. 27*a* and 27*b*. In the configuration shown in FIG. 27*a*, the orientation flap 31 and nose anchor 49 are pressed to one side of the interior cavity 86 of the head section 15. When the nose anchor 49 is not used, the interior cavity 86 of the head section 15 is substantially cylindrical. See FIG. 27*a*. A balloon 87 can be inflated within the internal cavity 86, of the head section 15, such that it will be held in place with sufficient frictional force to support the weight of the kinetic target 1 when the balloon 87 is attached to a cord or clip. See FIG. 27*c*. When in this configuration, the kinetic target 1 will “drop” or fall to the ground when a head shot is received by the head section 15.

Figures 28A, 28B, 28C:
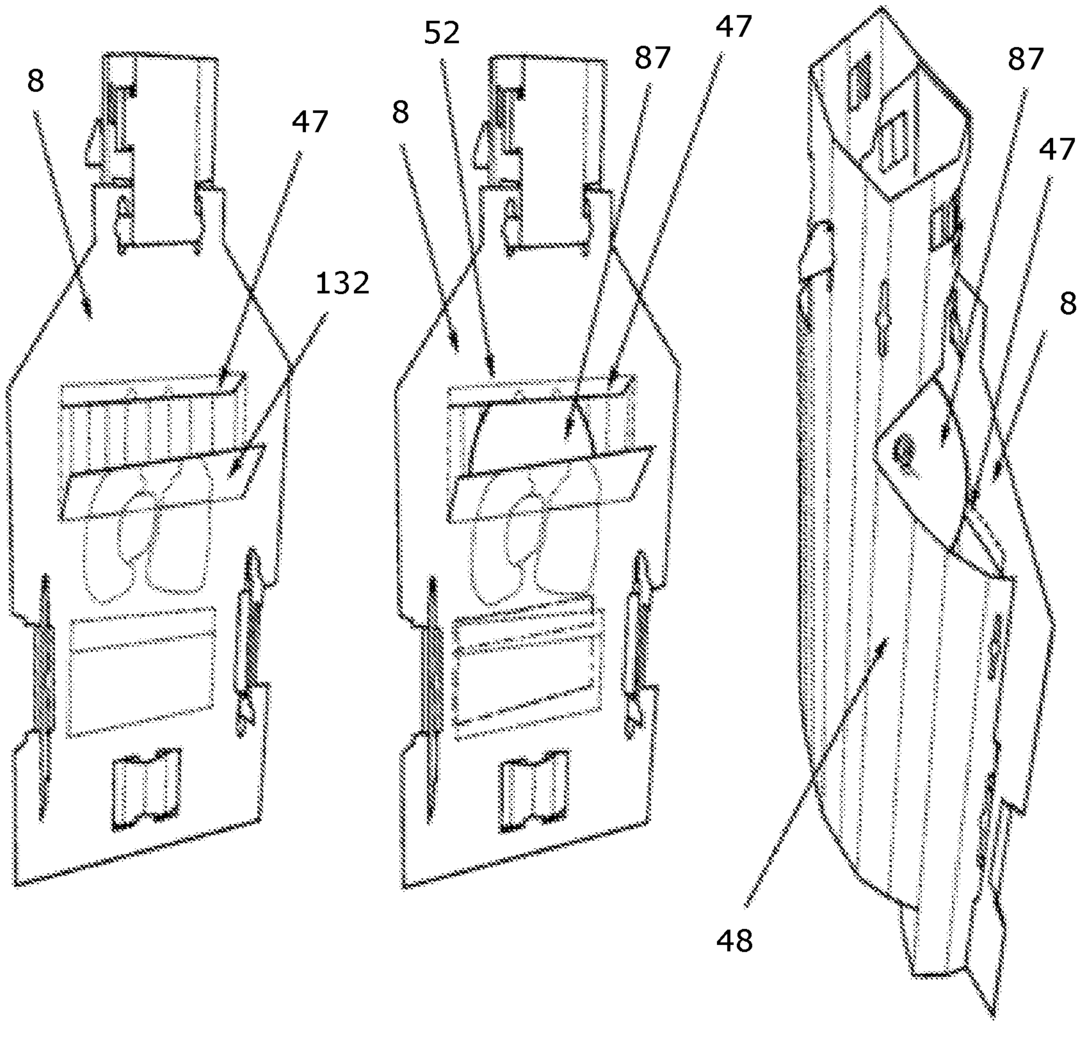
FIG. 28*a* is an enlarged rear perspective view of the kinetic target configured for use as a drop target.
FIG. 28*b* is another enlarged rear perspective view of the kinetic target configured for use as a drop target.
FIG. 28*c* is an enlarged partial perspective side view of the kinetic target configurated for use as a drop target.
Figure 29A:
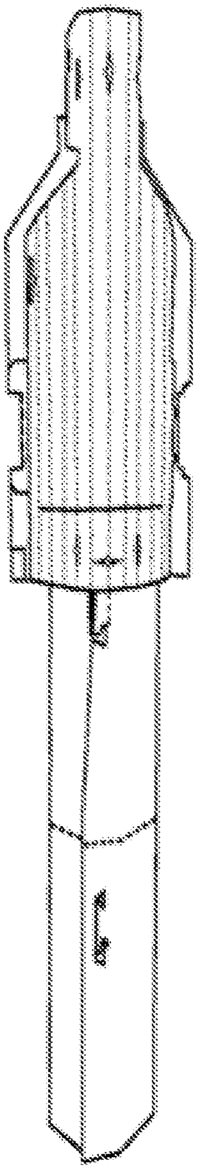
FIG. 29*a* is a front view of the kinetic target in an alternate configuration for use a drop target having a balloon installed in the simulated torso.
Figure 29B:
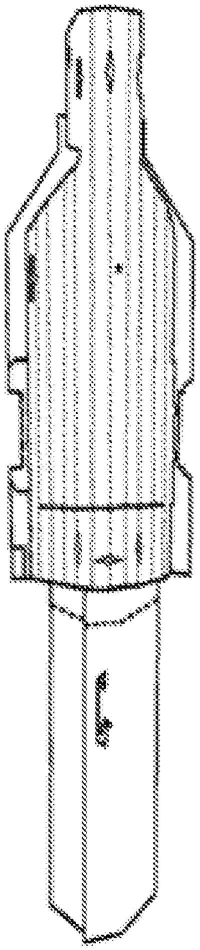
FIG. 29*b* is another front view of the kinetic target in the alternate configuration for use a drop target after popping the installed balloon.

In another embodiment, the kinetic target 1 can be used as a drop target that falls or collapses from a shot that hits the simulated torso 48. Referring to FIG. 28*a*, the flap 47 can be split into a lower flap 132 and upper flap 47. This is accomplished by pressing the flap 47 into the kinetic target 1 and pulling lower flap 132 away from the kinetic target 1. This creates an opening large enough to allow an inflated balloon 87 to be inserted or to inflate a balloon placed in-between the simulated torso 48 and back body panel 8. See FIGS. 28*a*-28*c*. A balloon 87 can be inserted in-between the simulated torso 48 and the back body panel 8 such that the larger diameter portions of the balloon 87 are located below the rectangular flap 47. See FIG. 28*b*. The elastic properties of the cardboard 3 and the targeting slot fold 52 prevent the balloon 87 from moving above the rectangular flap 47 of the kinetic target 1 when the balloon 87 is supporting the weight of the kinetic target 1. In this configuration, the kinetic target 1 can be suspended by the balloon 87 and will drop when the balloon 87 is popped by a shot to the simulated torso 48. In another embodiment, the kinetic target 1 can be supported by a balloon 87 that rests on top of a support. When using this configuration, the pelvic interconnection 23 is undone or not used to allow the pelvic fold 22 to follow the same curvature as the simulated torso 48, thereby allowing for a support structure to enter the gap between the back body panel 8 and simulated torso 48. With a balloon 87 inserted into the kinetic target 1 (FIG. 29*a*), the rectangular slot 47 is pressed into the balloon 87 by the weight of the kinetic target 1. This keeps the balloon 87 in place, in-between the simulated torso 48 and back body panel 8, constrained by the rectangular flap 47. The balloon 87 inside of the kinetic target 1 is then placed on top of a support structure. See FIG. 29*a* . In this configuration, the kinetic target 1 will drop onto the support structure, below the balloon 87, when the balloon 87 in the simulated torso 48 is popped. See FIGS. 29*a* and 29*b* . This configuration is useful when conducting firearm training in an outdoor environment where hanging targets are not possible.

According to embodiments of the invention the sheets with which the kinetic target is configured may advantageously comprise material having elastic deformation properties resulting in the afore described spring-like forces. Generally, elastic deformation properties, although inherently present in varies industrial uses of corrugated cardboard, provide a unique added value in three dimensional constructs assembled with mating flaps and slits. The exemplary sheets of corrugated cardboard, being orthotropic, impart unique elastic attributes to the kinetic target, e.g., along directions in which the vertically oriented corrugations extend. For a discussion on the elastic properties, see Aboura, et al., Elastic behavior of corrugated cardboard: Experiments and Modeling, *Composite Structures*, Elsevier, 2004, 63 (1), pp. 53-62. For embodiments of the sheet 3 comprising other materials, the elastic properties may be exhibited in multiple orthogonal directions and may even be isotropic. More generally, a laminate sheet formed of corrugated material, or formed of other material designs, may include a layer providing elastic deformation properties. The layer may be a polymer and when the sheet, patterned as Kinetic Target 1, undergoes folding and insertions of flaps or tabs into slits or slots, spring-like forces developed in vertical directions will act on flaps or tabs or projections (e.g., like projection 12) in relation to recesses like recess 41—in a manner similar to what has been described herein for the flap 9 and Slit 25 of torso joint 98 as well as torso joint 99 and other disclosed mating pairs of flaps or tabs and slits or slats.

In the case of corrugated cardboard it is found that, with the slits extending in vertical directions as shown in the figures, e.g., slit 25, and with the major dimension of the mating flap also oriented along a vertical direction for insertion, assembly to configure the target includes, while inserting the mating flap, urging the flap in a vertically upward direction against a modest spring-like resistant force, so that the lower portion can be inserted to place the recess in line with the slit and allowing the spring-like force to cause urge positioning the recess to extend downward and about the projection, and thereby allow the entire length of the flap to pass into the slit. Thus a mating engagement is created in which the spring-like force helps urge the bottom of the flap (e.g., position 19 of flap 9) against the projection underlying the slit. That is, after insertion, the flap is allowed to move vertically downward, diminishing the spring force and displacing the recess in the downward direction, causing the recess to extend about the projection. With this downward movement the termination point of the recess comes against the projection; and the apex of the upper edge of the flap (e.g., edge 118 of flap 9) may come into contact with the uppermost end of the vertical slit 25, but this upper edge need not remain in contact with the uppermost end of the vertical slit when the length of the slit is greater than the length of the flap. See FIG. 5. Generally, as described for the flap 9, mating flaps may include sloped upper edges along the horizontal direction. The combination of both the recess and the sloped upper edge along the flap can facilitate ease of assembling a joint and can minimize clearance between the flap and the slit after the flap is fully inserted to better lock the slit in place. This results in limited movement between component portions of the target within the flap/slit joint and holds the front and back panels 5, 8 more tightly fixed in place.

While only certain features of the invention have been illustrated and described herein, many modifications and changes will occur to those skilled in the art. It is, therefore, to be understood that the appended claims are intended to cover all such modifications and changes as fall within the true spirit of the invention.

The claimed invention is:

1. A target, the target comprising:

a unitary sheet, the sheet being of suitable structural stiffness to define folds therein and convert the sheet into a self-supporting three dimensional simulated torso section of a human-like figure, wherein when folded along one or more fold lines the sheet, defines an arched front body panel and a rear body panel, the arched front body panel and the rear body panel each positioned on a different side of a first vertical fold line which is formed along a midsection of the sheet, wherein the sheet includes first and second torso joints that facilitate assembly of, or impart improved stabilization of the shape to, the torso section, each torso joint extending between the front and rear body panels when assembled;

wherein the first torso joint comprises, in the arched front body panel, an interior flap alongside the first vertical fold line and, in the rear body panel (i) a first vertical slit for receiving the interior flap and (ii) a first locking flap to be inserted into a first vertical slot disposed on the interior flap, and wherein the rear body panel further comprises an angle flap for mounting the target at an angle relative to a vertical support surface;

wherein the second torso joint comprises a second vertical slot and an outer flap both disposed on an opposite side of the arched front body panel from the first vertical slot, and a second vertical slit and a second locking flap both disposed on the rear body panel, wherein the second vertical slit is configured to receive the outer flap and the second vertical slot is configured to receive the second locking flap, wherein (i) the first vertical slit is longer than the first vertical slot or the second vertical slot and (ii) the second vertical slit is longer than the first vertical slot or the second vertical slot; and wherein the arched front body panel comprises a first vertical rotator cuff slot disposed between the first vertical slot and a head portion of the arched front body panel and a second vertical rotator cuff slot disposed between the second vertical slot and a head portion of the arched front body panel, where the first vertical rotator cuff slot and the second vertical rotator cuff slot are shorter than the first vertical slot and the second vertical slot.

2. The target of claim 1 where the sheet comprises a corrugated cardboard product having a series of corrugations.

3. The target of claim 2 where the series of corrugations extend in the vertical direction and the first vertical fold line which extends in the vertical direction along a corrugation.

4. The target of claim 1 where the sheet consists of cardboard.

5. The target of claim 1 where the front and rear body panels further include a head emulation section positioned vertically above the simulated torso section and positioned in a portion of the sheet extending (i) horizontally along the front panel and (ii) horizontally along the rear panel.

6. The target of claim 5 comprising a simulated nose extending away from the head emulation section and providing an indication of a direction along which the head emulation section faces.

7. The target of claim 5 where, when the target is converted into the self supporting three dimensional emulation, the head emulation section has a shape having a three dimensional first arc-like contour, defining a space partly or fully surrounded by the three dimensional first arc-like contour.

8. The target of claim 7, where a first trajectory path through the first arc-like contour can be determined based on movement of a projectile through the first arc-like contour.

9. The target of claim 8 where the first trajectory path is determinable based on passage of a projectile through the first arc-like contour when the projectile creates evidence of a first entry point into the first arc-like contour and evidence of a first exit point out through the first arc-like contour, the evidence defining the first trajectory path through the space within the first arc-like contour.

10. The target of claim 9 where the first arc-like contour extends 360 degrees about the space defined by the three dimensional first arc-like contour.

11. The target of claim 10 wherein the simulated torso section, when assembled, includes a space intermediate the front and rear panels, the intermediate space also extending between the first and second torso joints.

12. The target of claim 11 where, with the front and rear panels having the intermediate space therebetween, a first trajectory path through the two panels can be determined for a projectile which has passed through the target.

13. The target of claim 12 where the trajectory path is traceable based on passage of a projectile through the front and rear panels which projectile creates a first entry point and a first exit point defining the first trajectory path through the intermediate space of the target.

14. The target of claim 1, where the angle flap is rectangular in shape and comprises a series of vertical perforations.

15. The target of claim 1, where the angle flap is rectangular in shape and comprises a series of horizontal perforations.

16. The target of claim 1, where the angle flap is rectangular in shape and comprises a series of vertical perforations and horizontal perforations.

17. The target of claim 1, where the angle flap is offset from a vertical fold line of the back rear body panel.

18. The target of claim 1, where a side of the angle flap that is pulled away from the rear body panel is folded along a user specified fold line for creating a tab that adjusts to a desired angle.

* * * * *